US007156217B2

(12) United States Patent
Raber

(10) Patent No.: US 7,156,217 B2
(45) Date of Patent: *Jan. 2, 2007

(54) MOTION TRANSMITTING APPARATUS

(75) Inventor: Christoph Raber, Ottweiler (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 543 days.

This patent is subject to a terminal disclaimer.

(21) Appl. No.: 10/040,771

(22) Filed: Jan. 9, 2002

(65) Prior Publication Data

US 2002/0065171 A1     May 30, 2002

Related U.S. Application Data

(63) Continuation of application No. PCT/DE00/02275, filed on Jul. 7, 2000.

(30) Foreign Application Priority Data

| Jul. 12, 1999 | (DE) | ................... 199 32 505 |
| Dec. 27, 1999 | (DE) | ................... 199 63 238 |
| Mar. 27, 2000 | (DE) | ................... 100 15 205 |

(51) Int. Cl.
*F16H 25/18* (2006.01)
*F16D 23/12* (2006.01)

(52) U.S. Cl. ............................. 192/84.6; 74/89; 192/94
(58) Field of Classification Search ................. 74/567, 74/569, 568 FS, 89, 424.5; 269/233, 196; 474/8; 192/84.6, 90, 94
See application file for complete search history.

(56) References Cited

U.S. PATENT DOCUMENTS 1,907,819 A * 5/1933 Hutchings ................ 116/277

| 2,573,638 | A | * | 10/1951 | Bryant | .................. 74/568 FS |
| 3,167,671 | A | | 1/1965 | Staak | ........................ 310/83 |
| 3,174,354 | A | * | 3/1965 | Kuehnle | .................. 74/424.5 |
| 3,353,416 | A | * | 11/1967 | Flint et al. | ................. 74/89 |
| 3,369,414 | A | * | 2/1968 | Helck | .......................... 74/89 |
| 3,980,325 | A | * | 9/1976 | Robertson | ................. 285/249 |
| 4,534,748 | A | * | 8/1985 | Stieg et al. | .................. 474/8 |

(Continued)

FOREIGN PATENT DOCUMENTS

| CH | 511384 | 8/1971 |
| DE | 2311500 | 8/1974 |
| DE | 2821153 | 11/1979 |
| FR | 2383362 | 10/1978 |
| JP | 6-42603 A * | 2/1994 |

OTHER PUBLICATIONS

Search Report in PCT/DE00/02275 indicating relevance of documents cited.

*Primary Examiner*—Rodney H. Bonck
(74) *Attorney, Agent, or Firm*—Alfred J. Mangels

(57) ABSTRACT

A motion transmitting apparatus wherein an electric motor, an engine or another prime mover rotates an axially fixed first part relative to a coaxial axially movable non-rotatable second part. The structure which serves to move the second part axially in response to clockwise or counterclockwise rotation of the first part includes a follower borne by the first part and a helical spring having end convolutions affixed to the first part. The follower extends between two intermediate convolutions of the helical spring. If the apparatus is utilized in the power train of a motor vehicle, the axially movable part can serve to engage or disengage or change the extent of engagement of the friction clutch between the output element of the engine and the input element of the change-speed transmission.

107 Claims, 17 Drawing Sheets

U.S. PATENT DOCUMENTS

| | | | | |
|---|---|---|---|---|
| 4,760,907 A | * | 8/1988 | Avny | 74/569 |
| 5,450,934 A | | 9/1995 | Maucher | 192/70.25 |
| 5,711,730 A | | 1/1998 | Friedmann et al. | 474/18 |
| 5,980,386 A | | 11/1999 | Friedmann et al. | 464/24 |
| 6,886,675 B1 | * | 5/2005 | Raber | 192/84.6 |
| 2003/0089572 A1 | * | 5/2003 | Aschoff et al. | 192/84.6 |

* cited by examiner

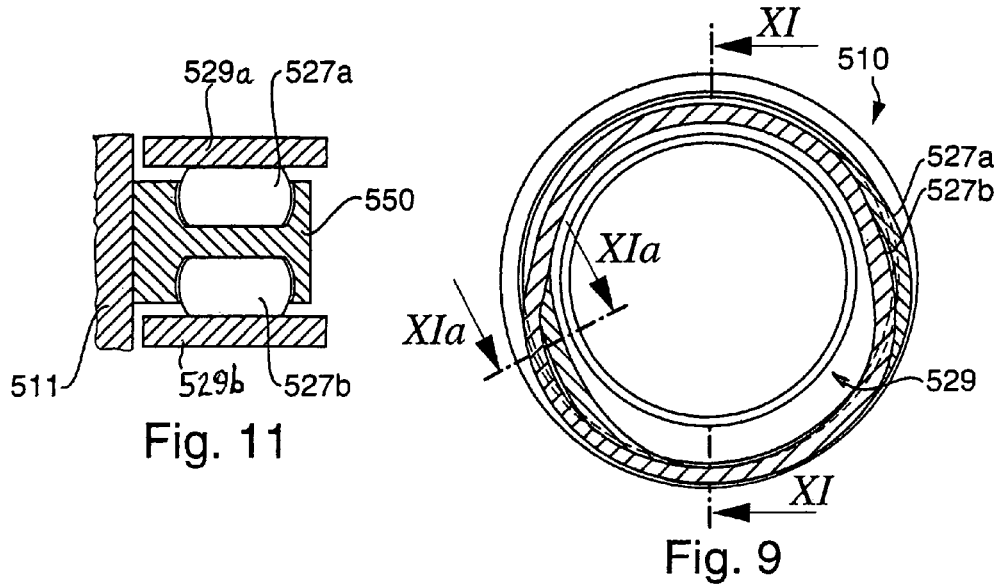
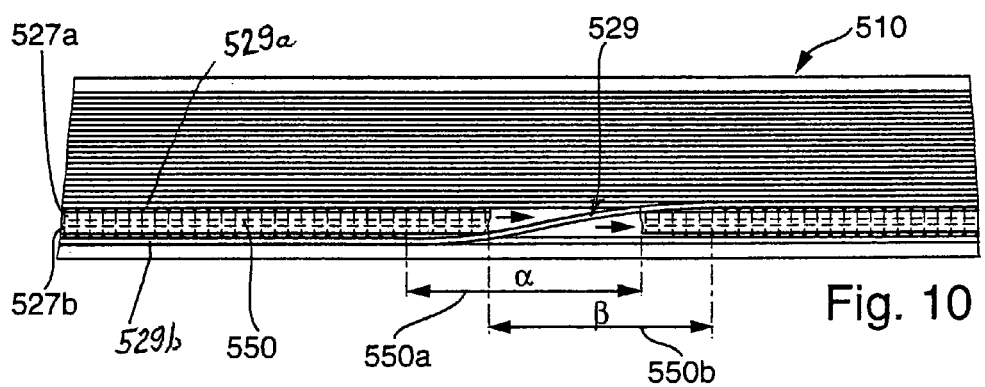
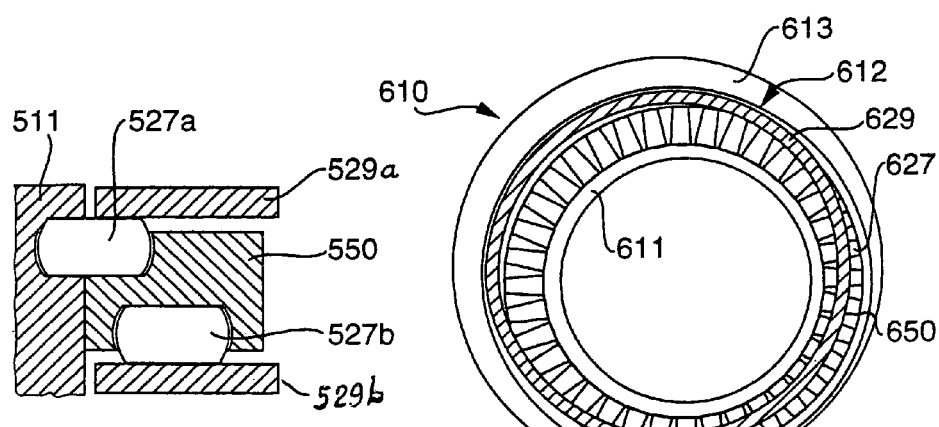

MOTION TRANSMITTING APPARATUS

CROSS-REFERENCE TO RELATED CASES

The present application claims the priorities of German patent application Serial No. 199 32 505.7filed Jul. 12, 1999, of German patent application Serial No. 199 63 238.8 filed Dec. 27, 1999, and German patent application Serial No. 100 15 205.8 filed Mar. 27, 2000, and is a continuation of International patent application Serial No. PCT/DE00/02275 filed Jul. 7, 2000.

BACKGROUND OF THE INVENTION

The present invention relates to improvements in motion transmitting apparatus in general, and more particularly to improvements in apparatus wherein rotary movements of a first part initiate axial and/or other movements of a second part and/or of the first part.

Motion transmitting apparatus of the type to which the present invention pertains include so-called axial drives or axial transmissions, also called spindle drives, wherein an externally threaded rotary shaft-like member spindle or feed screw mates with an internally threaded part so that rotation of the spindle relative to the internally threaded part results in axial movement of the internally threaded part and/or vice versa. The externally threaded part can be rotated by a suitable prime mover (e.g., by an electric motor) or by hand. Spindle drives of the just outlined character are utilized, for example, in so-called screw presses.

The extent of axial movement of the externally threaded part relative to the internally threaded part of a standard spindle drive depends upon the lead or pitch of the mating internal and external threads as well as upon the number of revolutions of the driven part. Furthermore, the pitch or lead of the mating threads determines the ratio of the spindle drive, namely the extent of axial movement of the internally threaded part or the externally threaded part per revolution.

Conventional spindle drives can also serve to effect radial movements of one of the cooperating parts relative to the other part, e.g., of the internally threaded part relative to the externally threaded part. Furthermore, motion transmitting apparatus employing mating internal and external threads can be utilized to effect radial displacements of the two mating parts; drives of such nature are known as chucks or collets and can serve to maintain certain devices in predetermined fixed positions.

It has been found that the ratio of conventional spindle drives, chucks, collets and analogous apparatus (i.e., a ratio which depends upon the lead or pitch of the mating threads and/or upon the root diameter of the external thread) is often too small, even if the means for rotating one of the mating parts includes a rapidly rotating electric motor or an analogous prime mover. This holds true irrespective of the output of the prime mover (such as an electric motor) which supplies torque for rotation of one of the mating parts.

Another drawback of conventional drives or apparatus of the above outlined character is their relatively high cost, not only the initial cost (which includes the cutting or rolling of internal and external threads) but also the maintenance cost. Thus, in the absence of repeated and intensive lubrication, a conventional spindle drive is bound to require increased quantities of energy due to increased friction between the mating internal and external threads.

OBJECTS OF THE INVENTION

An object of the present invention is to provide a novel and improved spindle drive or an analogous drive which is simpler, more versatile and less expensive than heretofore known apparatus of such character.

Another object of the invention is to provide a motion transmitting apparatus which can be put to use in lieu of spindle drives but need not be provided with an internal and/or external thread.

A further object of the invention is to provide a motion transmitting drive or apparatus having a transmission ratio which is much more satisfactory (especially higher than) the ratios of heretofore known spindle drives and analogous apparatus.

An additional object of the invention is to provide an apparatus which requires less servicing than conventional apparatus.

Still another object of the invention is to provide a motion transmitting apparatus which can be operated for long periods of time in a simple and reliable manner.

A further object of the invention is to provide a novel and improved method of assembling, installing and operating a motion transmitting apparatus of the above outlined character.

Another object of the invention is to provide a novel and improved combination of simple parts which can perform the functions of mating internal and external threads.

An additional object of the invention is to provide a versatile apparatus which can be put to use as a superior (such as longer-lasting) substitute for conventional spindle drives or the like.

Still another object of the invention is to provide a motion transmitting apparatus which can be utilized as a superior substitute for presently known clutch engaging and disengaging assemblies, e.g., in the power trains of motor vehicles.

A further object of the invention is to provide novel and improved combinations of parts which can be put to use for the purpose of centering the components of the above outlined apparatus relative to each other.

SUMMARY OF THE INVENTION

One feature of the present invention resides in the provision of an apparatus for effecting relative (such as radial and/or axial) movements of two parts which are turnable relative to each other. The improved apparatus comprises at least one tracking device (such as a pin-shaped or cylindrical follower or at least one group or array of such followers) which is fixed relative to the first part, and a helix which is non-rotatably associated with the second part and has a plurality of convolutions. The tracking device has a portion which extends between at least two convolutions of the helix, and the improved apparatus further comprises means for rotating one of the parts relative to the other part.

The convolutions of the helix can include at least one package or stack or group of abutting or closely (such as immediately) adjacent neighboring convolutions.

The means for rotating the one part relative to the other part can comprise a reversible electric motor, two electromagnets or any other suitable prime mover means which is capable of rotating the one part in clockwise and counterclockwise directions.

The axis of the helix can intersect the axis of the second part within the second part. Alternatively, the axis of the second part can coincide with the axis of the helix.

The first part is or can be coaxial with the second part.

At least one of the two end convolutions of the helix can be non-rotatably secured to the second part. Furthermore, the apparatus can comprise an axial abutment provided on or constituting a portion of the second part and serving to hold one end convolution of the helix against movement in the axial and/or radial direction of the helix.

At least one follower or the single follower of the tracking device abuts or can abut at least one of the at least two convolutions of the helix in one or more directions such as radially and/or axially of the helix.

The convolutions of the helix can be distributed in such a way that they include or form first and second packages or groups or stacks of convolutions. The first package includes one and the second package includes the other of the aforementioned at least two convolutions. Each package can consist, at least in part, of abutting or closely (such as very closely) adjacent convolutions.

The helix can include a convoluted round wire or a convoluted band or strip. Thus, the helix can have a substantially circular (including oval) or a polygonal (such as at least substantially rectangular) cross-sectional outline. All convolutions of the helix have (or can have) a common axis. If the helix has a rectangular outline, the thickness (as measured in the axial direction of the helix) is less than the width (as measured radially of the helix) of the cross-sectional outline. For example, the width can be between about three and sixty times the thickness.

The thickness of the convolutions (as measured in the axial direction of the helix) can be less than 5 mm, preferably less than 2 mm.

The helix, the tracking device and the rotating means can form part of or can constitute an axial drive; in such apparatus, the outer diameter of the helix can be up to 100 times the width of a convolution (as measured radially of the helix); a presently preferred ratio is between 30:1 and 5:1.

If the helix, the tracking device and the rotating means form part of or constitute an axial drive, the ratio of the outer diameter of the helix to the thickness of its convolutions (as measured axially of the helix) can be between 700:1 and 25:1, preferably between 200:1 and 40:1.

The helix can be made of a resilient material such as spring steel, an elastic plastic substance or a ceramic substance.

The number of convolutions of the helix can vary within a wide range, e.g., between 3 and 300, preferably between 5 and 50.

The helix and the tracking device can cooperate to move at least one of the first and second parts axially of the other of these parts in response to turning (rotation) of the one (first or second) part relative to the other part.

The tracking device is or can be arranged to track the helix by contacting successive increments of successive convolutions of the plurality of convolutions in response to rotation of the one part relative to the other part. Such tracking can involve rotation of the helix relative to the stationary tracking device and/or vice versa.

The rotating or turning means can comprise means for rotating the one part clockwise and counterclockwise, and the tracking device of such apparatus can include at least one first follower which is arranged to track the convolutions of the helix in response to clockwise rotation of the one part, and at least one second follower which is arranged to track the convolutions of the helix in response to counterclockwise rotation of the one part.

If the tracking device comprises at least one first follower and at least one second follower, a portion of the helix is or can be disposed between the first and second followers. A first follower of the tracking device can be spaced apart from a second follower, as seen in the axial direction of the helix; as already mentioned hereinbefore, a portion of the helix can be disposed between such first and second followers. At least under certain circumstances of use of the improved apparatus, the helix can be in simultaneous contact with the first and second followers of the tracking device. The first and second followers can be spaced apart from each other (as seen in the axial direction of the helix) by a distance matching or approximating the thickness of convolutions (again as measured in the axial direction of the helix, i.e., in the direction of the common axis of the convolutions). That portion of the helix which contacts the followers divides the helix into first and second packages of convolutions; the number of convolutions in one of the packages increases and the number of convolutions in the other package decreases in response to rotation (turning) of the one part of the apparatus relative to the other part.

If the turning or rotating means comprises means for selectively rotating the one part clockwise or counterclockwise, a first set of followers of the tracking device can track the helix in response to clockwise rotation of the one part, and a second set of followers can track the helix in response to counterclockwise rotation of the one part.

The tracking device can comprise a plurality of substantially pin-shaped followers which are spaced apart from each other (a) in the direction of the common axis of the convolutions and (b) circumferentially of the helix.

The tracking device can comprise between 3 and 12 followers. The followers can extend across the width of the at least two convolutions (as seen radially of the common axis of the convolutions).

Irrespective of the number of the followers which constitute or form part of the tracking device, each follower can include or constitute a bearing which contacts the at least two convolutions of the helix. The tracking device can include one or more friction bearings and/or roller (antifriction) bearings. It is also possible to employ a tracking device having one or more pin-shaped followers rotatably mounted in the first part; each such follower can be rotated about its axis in or with a bearing mounted in the one part. Thus, each follower can include a bearing which contacts the convolutions of the helix and/or a bearing which rotatably mounts the follower in the one part.

One of the first and second parts can rotatably surround the other of these parts; for example, the second part can be surrounded by the first part.

The helix can be at least partially surrounded by one of the first and second parts and can at least partially surround the other part.

The tracking device can comprise at least one ramp which is provided in or on the first part and extends circumferentially of the helix. The at least one ramp can be provided with a recess for a portion of the helix. The lead of the helix can equal or approximate the lead of the at least one ramp.

The second part of the improved apparatus can be provided with at least one segment-shaped or circumferentially complete recess, and the at least one tracking device can comprise a plurality of rolling elements which are disposed in the recess. The recess has an end portion at which the rolling elements are introduced into a starting point of the recess, preferably into the starting point of a thread-shaped recess. Such thread-shaped recess can further comprise a starting portion and the rolling elements can be guided—in the region of transition from the starting and end portions—into a path which extends radially outwardly of the radius of the helix. The paths of the helix and the recess can cross each other. Furthermore, at least one of the rolling elements can be a barrel-shaped element. The peripheral surfaces of the rolling elements can be in rolling contact with the helix or with a surface surrounding the recess.

The first and second parts of the improved apparatus can have a common axis, and such apparatus can comprise means for biasing the first and second parts axially against each other.

It is often advisable to provide means for biasing the first and second parts in the direction of action of the improved apparatus.

Furthermore, it can be advisable to provide the improved apparatus with energy storing means which is arranged to bias the first and second parts in at least one of the directions including axially and radially of their common axis; the parts can be prestressed counter to the direction of bias of such energy storing means.

The energy storing means which is utilized to bias one of the first and second parts relative to the other of these parts can comprise a helix.

That helix which is non-rotatably associated with the second part can cooperate with the tracking device to move one of the first and second parts axially in response to turning of the one part; such helix can be installed in prestressed condition and can be affixed to the first and second parts; the tracking device can divide the convolutions of this helix into first and second packages of abutting convolutions.

The helix which is non-rotatably associated with the second part can cooperate with the tracking device to move one of the first and second parts axially in response to turning of the one part, and such apparatus can further comprise a plurality of energy storing elements which are arranged to bias the first and second parts relative to each other. Each such energy storing element can include a leaf spring having a first end portion connected to one of the parts and a second end portion connected to the other part, and the leaf springs are or can be spaced apart from each other in a circumferential direction of the helix which is non-rotatably associated with the second part.

The improved apparatus can also comprise at least one coil spring which is arranged to bias one of the first and second parts axially of the other of such parts. The coil spring is or can be self-centering in the direction of its longitudinal axis.

The helix, the turning device and the means for turning the one part relative to the other part can be arranged to move one of the first and second parts, and the helix of such apparatus can have an axial profile, e.g., an at least substantially V-shaped profile. Such profile can exhibit a ridge which faces counter to the direction of action of the helix.

The turning means of the improved apparatus can cooperate with the helix and with the tracking device to effect an angular displacement of the first and second parts relative to each other.

Furthermore, the turning means can comprise means for rotating the one part relative to the other part.

The apparatus can further comprise a housing having a third part which is stationary relative to the one (turnable) part.

The turning means can include or constitute means for rotating the one part about the axis of such one part.

It is often preferred or advisable to employ turning means which comprises or constitutes an electric motor.

Alternatively, the turning means can comprise a turbine, such as a compressed air turbine.

The radial dimension of the one part can exceed the radial dimension of the turning means.

The arrangement can be such that one of the parts is disposed radially inwardly of (i.e., within) the other part, and the turning: means can be disposed within the radially outer part. The one part is or can be one of the radially inner and radially outer parts.

The second part can be installed for movements to and from at least one end position, an the improved apparatus can further comprise an abutment which is arranged to arrest the second part in the at least one end position. The abutment can include at least one cushion which is effective in at least one of a plurality of directions including axially and circumferentially of the second part.

The apparatus can further comprise at least one stop which is arranged to limit the extent of turnability of the one part relative to the other part. If the turning means comprises an electric motor, the at least one stop can form part of such motor.

Still further, the improved apparatus can comprise at least one sensor which is arranged to monitor the extent of axial displacement of one of the first and second parts. The at least one sensor can constitute an incremental sensor and it can be arranged to monitor the maximum extent of axial movement of the monitored part.

As already mentioned hereinbefore, the first part can be surrounded by the second part and can be provided with a central opening for a shaft which mounts the turning means.

If the turning means includes a rotary shaft, such turning means can be non-rotatably associated with the shaft and the one part of the apparatus can be braked by a stationary housing.

It is further within the purview of the invention to force-lockingly connect the one part of the improved apparatus with a rotary element and to force-lockingly connect the other part with a fixed housing.

The shaft which is connectable with the one part of the improved apparatus can be arranged to rotate in a single direction.

In accordance with a further presently preferred embodiment, the apparatus can be actuated in a first axial direction by braking the one part against a housing and by non-rotatably affixing the other part to a shaft; if such apparatus is to be actuated in a second axial direction, the one part is non-rotatably affixed to the shaft and the other part is braked against the housing. The just mentioned affixing and/or braking can be effected by resorting to at least one electromagnet and/or to at least one fluid-operated (i.e., hydraulic or pneumatic) slave cylinder which is associated with a source of pressurized fluid.

If the means for turning the one part has a central opening, the improved apparatus can further comprise a shaft which extends through the opening and is associated with one of the first and second parts.

If the means for turning comprises a rotor, one of the first and second parts of the improved apparatus can be integrated into the rotor; the other part can be integrated into a housing of the turning means. The means for turning can be rotatably or non-rotatably mounted on a shaft.

The one part can be mounted against movement in the direction of its axis and can be arranged to impart an angular movement, at a plurality of speeds, to a component which is to be moved in the direction of the aforementioned axis at a plurality of different speeds. Such apparatus preferably further comprises an antifriction bearing which is interposed between the one part and the aforementioned component. The antifriction bearing can be mounted on the one part.

The apparatus can further comprise first and second machine components and at least one of its first and second parts can be arranged to move one of the components relative to the other component in at least one of the directions including (a) in the direction of the axis of one of the parts and (b) at least substantially radially of such axis.

A collet chuck can be arranged to radially clamp workpieces and to receive motion from at least one of the first and second parts of the improved apparatus.

It is also possible to employ the improved apparatus in conjunction with an infinitely variable speed transmission wherein first and second pulleys are non-rotatably mounted on first and second shafts. At least one of the pulleys has a variable diameter and at least one of the first and second parts of the improved apparatus can be arranged to vary the diameter of the at least one pulley. Such apparatus can further comprise means for varying the effective length of a variable-length endless flexible element (such as a belt or band) which is trained over the pulleys.

The improved apparatus can form part of or can include an engageable and disengageable friction clutch in the power train of a motor vehicle. Such friction clutch can include a first rotary shaft which is coaxial with the first and second parts of the apparatus, first and second pressure plates which are non-rotatably mounted on the first shaft in such a way that one of the pressure plates is movable axially of the shaft, a second rotary shaft which is coaxial with the first shaft, a clutch disc which is disposed between the two pressure plates, and adjustable resilient means (such as a diaphragm spring) carried by the second shaft and arranged to bias the one pressure plate against the clutch disc to thus bias the clutch disc against the other pressure plate. One of the first and second parts of the improved apparatus is arranged to adjust the resilient means to thus select the extent of engagement of the friction clutch.

The improved apparatus can be installed in a motor vehicle wherein the prime mover is or can be an internal combustion engine having a rotary output shaft, wherein a second shaft (such as the input shaft of a change-speed transmission) is coaxial with the output shaft, and an engageable/disengageable friction clutch is mounted between the two shafts. The friction clutch is coaxial with the first and second parts of the improved apparatus and can include a component which is movable in the direction of the common axis of the shafts by at least one of the first and second parts to thus change the extent of engagement or disengagement of the friction clutch. The parts of the improved apparatus can be mounted on the second shaft.

Still further, the environment in which the improved apparatus can be put to use can include a first rotary shaft, a prime mover which is arranged to drive the first shaft about its axis, a split flywheel including a first flywheel mounted on the first shaft, a second flywheel coaxial with and rotatable relative to as well as jointly with the first flywheel, means (such as one or more coil springs) for yieldably opposing rotation of the first and/or second flywheel relative to the other of these flywheels, a second shaft which is coaxial with the first shaft, and an engageable/disengageable friction clutch between the second flywheel and the second shaft. One of the first and second parts of the improved apparatus is arranged to change the extent of engagement of the friction clutch.

The improved apparatus can further comprise or cooperate with control means for the turning means. Such control means can include at least one sensor which is arranged to transmit signals and means for adjusting the turning means in response to such signals. For example, the at least one sensor can be arranged to transmit signals in response to changes of at least one of a plurality of parameters including (a) the RPM of a rotary component (e.g., in the power train of a motor vehicle), (b) a distance which is covered by a rotary component (e.g., the driven or non-driven wheel of a motor vehicle), (c) changes of the speed of a rotary component, (d) a change of force, and (e) at least one further parameter derivable from at least one of the afore-enumerated parameters (a) to (d).

The improved apparatus can cooperate with an automated friction clutch which is installed in a motor vehicle and with a control system for such friction clutch. At least one of the first and second parts of the improved apparatus can be arranged to adjust the friction clutch in response to signals denoting changes of at least one variable parameter furnished by at least one sensor which forms part of the control system and is arranged to monitor at least one of (a) the RPM of at least one driven wheel of the motor vehicle embodying the friction clutch, (b) the RPM of at least one non-driven wheel of the motor vehicle, (c) the position of the flap of the throttle valve in the engine of the motor vehicle, (d) the speed of the vehicle, (e) the RPM of the transmission of the motor vehicle, (f) the RPM of the engine, (b) acceleration of the vehicle, (h) transverse acceleration, (i) a signal from wheel blocking means, (j) selected speed ratio of the transmission, (k) the magnitude of the torque being transmitted by the friction clutch, (l) the temperature of the clutch (m) the temperature of lubricant in the transmission, (n) the temperature of lubricant in the engine, and (o) the angular position of the steering wheel.

Another feature of the present invention resides in the provision of an apparatus which is designed to effect or initiate relative axial movements and comprises first and second parts at least one of which is rotatable relative to the other about an axis which is common to the first and second parts, at least one tracking device (follower) which is fixed relative to the first part as seen in the direction of the common axis, a helix non-rotatably associated with the second part and having a plurality of convolutions, and means for rotating the at least one part relative to the other part. A portion of the tracking device extends between at least two convolutions of the helix.

A further feature of the present invention resides in the provision of an apparatus for effecting relative radial movements and comprises first and second parts at least one of which is rotatable relative to the other about a predetermined axis, at least one tracking device which is axially fixed relative to the first part, a helix which is non-rotatably associated with the second part and has a plurality of convolutions, and means for rotating the at least one part relative to the other part. The tracking device has a portion (follower) which extends between at least two convolutions of the helix.

The improved apparatus can also serve as a machine element for continuously maintaining two machine parts in spaced-apart positions. The apparatus can be arranged to move one of the machine parts relative to the other machine part in at least one of a plurality of directions including radially and axially.

The novel features which are considered as characteristic of the invention are set forth in particular in the appended claims. The improved apparatus itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 9 is a sectional view similar to that of FIG. 7 but showing certain details of a sixth apparatus;

FIG. 10 is a developed view of the structure shown in FIG. 9;

FIG. 11 is a fragmentary transverse sectional view substantially as seen in the direction of arrows from the line XI—XI in FIG. 9;

FIG. 11a is a similar fragmentary transverse sectional view but as seen in the direction of arrows from the line XIa—XIa of FIG. 9;

FIG. 12 is a sectional view similar to that of FIG. 7 or 9 but showing certain details of a seventh apparatus;

DESCRIPTION OF PREFERRED EMBODIMENTS

Figure 1:
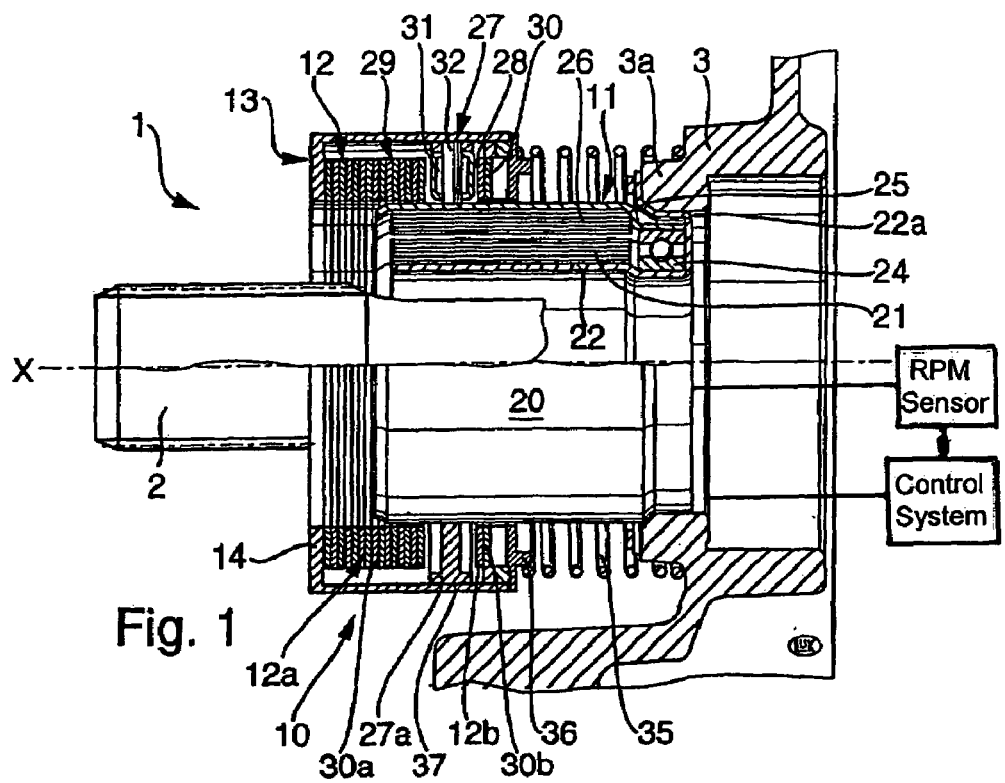
FIG. 1 is an axial sectional view of an apparatus which is used to effect axial movements of at least one of two cooperating parts relative to the other part in accordance with a first embodiment of the invention.

FIG. 1 shows an apparatus 1 which is designed to effect axial movements of a non-rotatable member or part 13 relative to an axially fixed rotary member or part 11. The part 13 surrounds the part 11 and is movable axially toward and away from a stationary housing or support 3 in response to rotation of the part 11 in one of two directions, i.e., clockwise or counterclockwise. Such axial movability of the part 13 enables the latter to move one or more components (e.g., a release bearing for a friction clutch) between two end positions and to a desired number (including zero number) of intermediate positions. Thus, if a component sharing the axial movements of the part 13 is a clutch release bearing (corresponding to the bearing 711a shown in FIG. 15), such bearing can be moved between a first end position (in which the friction clutch is fully engaged) and a second end position (in which the clutch is fully disengaged) as well as to any desired number of intermediate positions in each of which the clutch is partially engaged to a different extent.

The part 11 is a constituent of an axially fixed elongated rotary spindle 10 which further includes the rotor 26 of a reversible electric motor 20. The stator 21 of the motor 20 is mounted on the stationary support or housing which also supports the spindle 10. The apparatus 1 is mounted on a shaft 2. The means for moving the part 13 axially of the shaft 2 in response to rotation of the part 11 includes a preferably composite follower arrangement or assembly 27 which shares the angular movements of the part 11, and a coil spring 12 having or being constituted by a helix 29 which is tracked by the follower assembly 27. In the embodiment of FIG. 1, the follower assembly 27 must orbit about the common axis X of the shaft 2 and motor 20 in order to move the part 13 axially in a direction to the right or to the left, depending upon the setting of the motor 20.

The coil spring 12 is non-rotatably mounted in the part 13 in such a way that its end portions (end convolutions) are affixed to the part 13 but that its intermediate portion or section (normally all or at least some intermediate convolutions 30a+30b) is free to migrate relative to the end portions in the axial direction of the part 3. In other words, the actual axial length of the properly installed coil spring 12 (between its two end convolutions) is greater than the minimum axial length (namely that length which is arrived at if all convolutions of the coil spring are caused to actually abut each other).

When the part 13 is caused to assume (relative to the part 11, the support 3, the shaft 2 and the stator 21 of the motor 20) the axial position which is shown in FIG. 1, the intermediate convolutions of the coil spring 12 form a relatively large (long) package or group 12a of convolutions 30a at one side (to the left) of the follower assembly 27, and a relatively small (short) package or group 12b of convolutions 30b at the other side (to the right) of the follower assembly 27.

The illustrated reversible motor 20 is an electric motor (such motor is preferred in numerous embodiments of the improved apparatus) wherein the stator 21 comprises a cylindrical sleeve-like radially inner portion or section 22 having a radially outwardly extending end portion 22a snugly received in and affixed to an annular receptacle 3a of the support 3. The end portion 22a is configured to define an annular groove or pocket for an antifriction bearing 24 (shown in the form of a ball bearing) which mounts a smaller-diameter end portion of a tubular member 25 confining and rotating with the rotor 26 of the reversible motor 20. The rotor 26 surrounds that portion of the stator 21 which, in turn, surrounds the aforementioned cylindrical section 22.

The tubular member 25 can be said to constitute a component or constituent of the rotor 26. The follower assembly 27 is fixedly mounted on and extends radially outwardly from the tubular member 25 (i.e., from the rotor 26) and between the packages 12a, 12b of convolutions 30a, 30b forming part of the helix 29 which, in turn, forms part of or constitutes the coil spring 12.

The follower assembly 27 in the apparatus 1 of FIG. 1 comprises an annular holder 27a having a T-shaped cross-sectional outline (as seen in a plane including the axis X). The radially inner portion of the holder 27a is welded and/or otherwise affixed to the tubular member 25 (i.e., to the rotor 26 of the motor 20). The radially extending surfaces of the holder 27a are provided with contact portions 28 abutting the adjacent contact portions 30 of those convolutions 30a, 30b of the helix 29 which are separated from each other by the follower assembly 27. The helix 29 is a thin web or strip of resilient metallic or plastic material which is convoluted in such a way that the thickness of its convolutions 30a, 30b (as seen in the direction of the axis X) is small or very small and is a small fraction of the width (as measured radially of the axis X) of such convolutions.

The contact portions 28 of the apparatus 1 of FIG. 1 are provided on the outer races or sleeves of needle bearings 31 or analogous antifriction bearings including or carried by pins or studs 32 affixed to and extending radially from the holder 27a. The bearings 31 reduce friction between the follower assembly 27 and the adjacent convolutions 30a, 30b of the helix 29 when the motor 20 is on to drive the rotor 26 in a clockwise or counterclockwise direction, depending upon whether the part 13 is to move in a direction to the right or to the left (as viewed in FIG. 1). Such reduction of friction between the follower assembly 27 and the coil spring 12 renders it possible to reduce the energy requirements of the motor 20 even if the shifting of the part 13 (and of one or more devices or members or components which share the axial movements of this part in at least one of the two axial directions) necessitates the application of a pronounced force. The pins or studs 32 can constitute rivets which are anchored in the holder 27a of the follower assembly 27.

Figure 5:
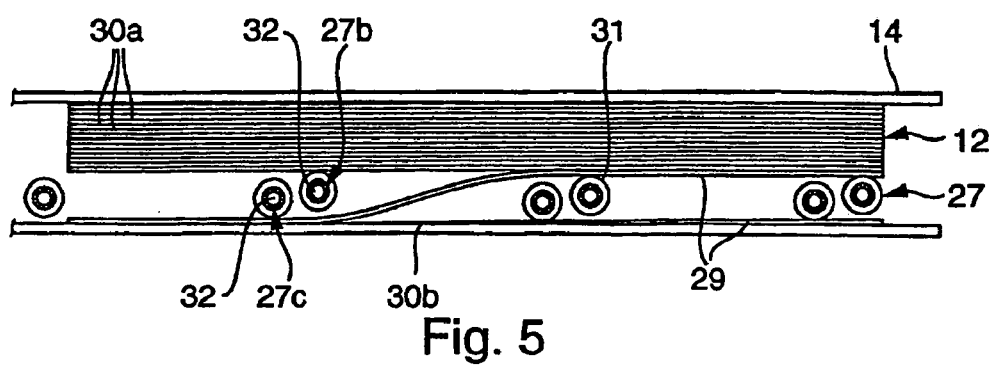
FIG. 5 is a developed view of certain constituents of the apparatus shown in FIGS. 1 and 4.

FIG. 5 shows that the follower assembly 27 comprises three circumferentially spaced-apart pairs of discrete followers 27b, 27c. Each of these discrete followers has a post or stud 32 and a needle bearing or another suitable antifriction bearing 31 surrounding the respective stud 32. The number of pairs of discrete followers 27b, 27c can be less than or can exceed three. The followers 27b track the adjacent convolution 30a of the package 12a, and the followers 27c track the adjacent convolution 30b of the package 12b. To this end, the discrete follower 27b of each pair is axially and angularly offset relative to the discrete follower 27c of the respective pair. The extent of axial displacement of the followers 27b, 27c of each pair relative to each other depends upon the lead or pitch of the convolutions 30a, 30b. For the same reason, the three discrete followers 27b, as well as the three discrete followers 27c, can be shifted relative to each other (as seen in the direction of the axis X).

FIGS. 1 and 5 show that the convolutions 30a of the package 12a, as well as the convolutions 30b of the package 12b, actually abut each other, i.e., each of these packages acts as a solid one-piece body or block (as seen in the direction of the axis X). However, it is also possible to select a helix 29 having characteristics such that the convolutions 30a of the package 12a as well as the convolutions 30b of the package 12b are close to but need not actually contact each other. The presence or absence of clearances between neighboring convolutions 30a and between neighboring convolutions 30b (i.e., between the constituents of the package 12a as well as between the constituents of the package 12b) will depend upon one or more specific parameters of the helix 29, such as the mode of winding a strip or band to form the helix and/or the spring gradient of the helix. Thus, the discrete followers 27b and 27c can bear against axially unyielding blocks of convolutions 30a, 30b constituting the respective packages 12a, 12b or against packages which can yield (normally to a relatively small or extremely small extent) in the direction of the axis X. In other words, the packages 12a, 12b can but need not perform a certain damping action.

The operation of the apparatus 1 is as follows:

Let it be assumed that the electric circuit of the reversible motor 20 is completed in a sense to drive the rotor 26, and hence the follower assembly 27, in a clockwise direction. The part 13 is permanently pushed axially to the left by a coil spring 35 (or by one or more additional coil springs and/or other suitable springs). Thus, the orbiting follower assembly 27 must rearrange the convolutions 30a, 30b in such a way that the thickness of the package 12b increases at a rate at which the thickness of the package 12a decreases. This causes the part 13 (and one or more components sharing the movements of the part 13 in the direction of the axis X) to move axially toward the axially fixed rotating part 11, i.e., toward the support 3.

The coil spring 35 can be replaced or assisted by one or more coil springs and/or other resilient means (not shown) which can pull and/or push the part 13 in a direction to the left, as viewed in FIG. 1.

The just described mode of operation can take place when the apparatus 1 is used to operate an axially shiftable clutch engaging/disengaging bearing (711a in FIG. 15) in the power train of a motor vehicle and the clutch is to be engaged in order to enable the power train to pull a load forwardly. The circuit of the motor 20 must be actuated if the part 13 is to be moved back toward the axial position of FIG. 1) i.e., away from the support 3, e.g., if the clutch is to be disengaged for coasting. The rotor 26 is then driven to rotate in a direction (e.g., counterclockwise) which is necessary to cause the discrete followers 27b to bear upon the package 12a and to transpose successive convolutions 30a from the package 12a to the package 12b. Such axial movement of the part 13 away from the support 3 is assisted by the coil spring 35.

The component(s) which shares or share the axial movements of the part 13 (e.g., the aforementioned release bearing 711a) can be affixed to an annular end wall 14 at the left-hand axial end of the part 13. If necessary, the apparatus 1 of FIG. 1 can employ a ball bearing and/or a friction bearing or any other suitable bearing between the end wall 14 and the adjacent component or components.

The left-hand end convolution of the coil spring 35 bears upon the adjacent end portion of the part 13, either directly, by the interposition of discrete projections (not shown) which are spaced apart from each other in a circumferential direction of the part 13, or by resorting to a circumferentially complete ring-shaped motion transmitting member 36. The member 36 can also serve as a means for centering the axially movable non-rotatable part 13 relative to the axially fixed rotary part 11 and vice versa. One end portion of the spring 35 is affixed to the member 36 or directly to the part 13, and the other end portion of this spring is affixed to the support 3.

Additional centering of the part 13 relative to the part 11 can be achieved by way of the holder 27a of the follower assembly 27. Thus, the radially outermost portion of the holder 27a can be in sliding contact (at 37) with the cylindrical internal surface of the part 13. The radially outermost portion of the holder 27a and the adjacent portion of the part 13 can constitute a friction bearing which centers the part 13 relative to the part 11. In fact, the just mentioned portions of the holder 27a and the part 13 can also serve (or can serve solely) as a means for producing a self-centering action similar to that often resorted to in roller bearings to prevent undue or any axial displacements of the part 13 except when necessary to effect a desired and predetermined axial adjustment of the component(s) sharing the axial movements of the part 13 under or against the bias of the coil spring 35. For example, the portions of the part 13 and holder 27a in the region (37) of contact between them can be designed to compensate for or to prevent any undue or undesirable axial displacements of the parts 11, 13 relative to each other.

Figure 4:
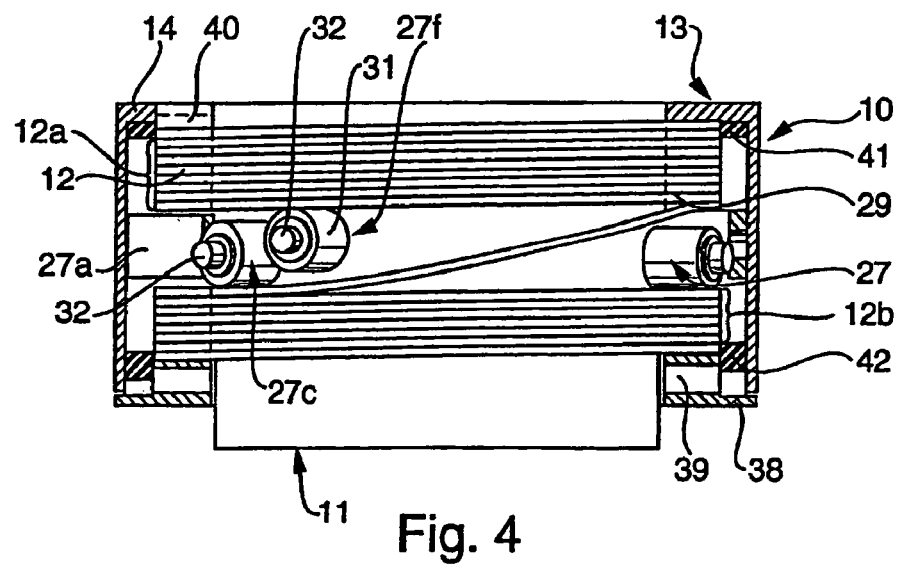
FIG. 4 is a transverse sectional view taken in a plane normal to the plane of FIG. 1.

FIG. 4 shows the spindle 10 of FIG. 1 with the helix 29 in a condition in which the thickness of the package 12a approximates that of the package 12b. Thus, when the helix 29 assumes the condition of FIG. 4, the part 13 is located to the right of the axial position shown in FIG. 1. On the other hand, FIG. 5 is a developed view of the coil spring 12 and the follower assembly 27 with the helix 29 in a condition close to that shown in FIG. 1, i.e., when the part 13 supporting the coil spring 12 of FIG. 5 is held in an axial position very close to that shown in FIG. 1. Since the individual convolutions 30a, 30b are or can be very thin (as seen in the direction of the axis X), it is possible to select for the part 13 any one of a practically infinite number of axial positions relative to the support 3 and part 11; this is highly desirable when the part 13 transmits motion to a component (such as the release bearing of a friction clutch) which should be susceptible of a large (or even an infinite) number of adjustments.

The part 13 constitutes an element of the spindle 10 which further includes the coil spring 12 and is movable axially of the shaft 2. The part 11 is turnable by the rotor 26 and includes the follower assembly 27 which automatically changes the ratio of the axial length of the package 12a to the axial length of the package 12b when the motor 20 is on. The ratio of the length of the package 12a to the length of the package 12b increases or decreases, depending upon the direction of rotation of the rotor 26.

The distribution of the discrete followers 27b, 27c in the circumferential and axial directions of the part 13 can be selected in dependency upon the pitch of the helix 29; this ensures that one of the two sets of discrete followers 27b, 27c invariably engages the adjacent convolution 30a or 30b in each axial position of the part 13 and the helix 29. Each of the discrete followers 27b, 27c is or can be supported by the part 11 at one end, and by the holder 27a (which is affixed to the part 11) at the other end. The exact manner in which the holder 27a is affixed (e.g., welded) to the part 11 is not shown in FIGS. 1, 4 and 5.

The end wall 14 extends radially inwardly from the cylindrical main portion of the part 13 and is connected to the adjacent end convolution of the helix 29. The other end of the cylindrical main portion of the part 13 is permanently or separably connected (e.g., by a bayonet mount, by mating internal and external threads, by a press fit or the like) with a closure or cover 38 which serves as an abutment for the adjacent end convolution of the helix 29. If the cover 38 is detachably affixed to the cylindrical main section of the part 13, e.g., if the cover must be rotated relative to the main section in order to be attached to or detached from the part 13 (such mode of connection is assumed to exist in the apparatus 1 of FIG. 1), the apparatus preferably further comprises a roller bearing 39 or another suitable friction reducing bearing which is interposed between the right-hand end convolution of the helix 29 and the cover 38.

It is also possible to non-rotatably affix (e.g., rivet) the right-hand end convolution of the helix 29 to the cover 38 and to thus omit the bearing 39. Alternatively, the left-hand end convolution of the helix 29 can be riveted or otherwise non-rotatably secured to the end wall 14. Alternatively, the left-hand end convolution of the helix. 29 can extend into a complementary recess 40 in the inner side of the end wall 14; to this end, the left-hand end convolution of the helix can be doubled over prior to insertion into the recess 40 in order to reduce the likelihood of undesirable rotation of the end wall 14 and the adjacent end convolution of the helix relative to each other.

In order to prevent the end wall 14 and/or the cover 38 from abruptly striking upon the rotary holder 27a of the follower assembly 27 with an excessive force, the apparatus 1 preferably further comprises resilient pads 41, 42 (see FIG. 4) which cushion the impact when the part 13 reaches the respective end position relative to the part 11. The pads 41, 42 can be made of a suitable elastic material and their purpose is to reduce (or to prevent the generation of) noise, to reduce the wear upon the holder 27a and the parts 14, 38, and to prevent jamming of the holder (in the end positions of the part 13) against the end wall 14 or against the cover 38.

Figure 2:
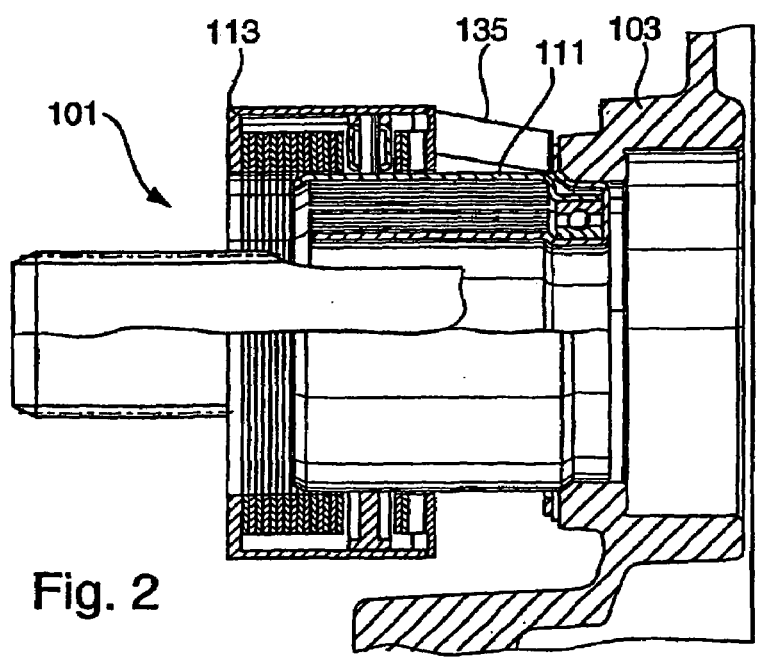
FIG. 2 is a similar sectional view of an apparatus constituting a first modification of the apparatus shown in FIG. 1.

The apparatus 101 of FIG. 2 differs from the apparatus 1 of FIG. 1 in that the helical spring 35 is replaced with a set of preferably three circumferentially spaced apart leaf springs 135 (only one is fully shown in FIG. 2) which axially movably but non-rotatably couple the part 113 to the housing or support 103. One end portion of each leaf spring 135 is fixedly secured (e.g., riveted) to the part 113, and the other end portion is fixedly or articulately affixed to the support 103. The leaf springs 135 can further serve as a means for centering the axially movable part 113 relative to the rotatable but axially fixed part 111 of the apparatus 101. In all other respects, the apparatus 101 is or can be identical with the apparatus 1 including the structure shown in FIGS. 1, 4 and 5.

Figure 6:
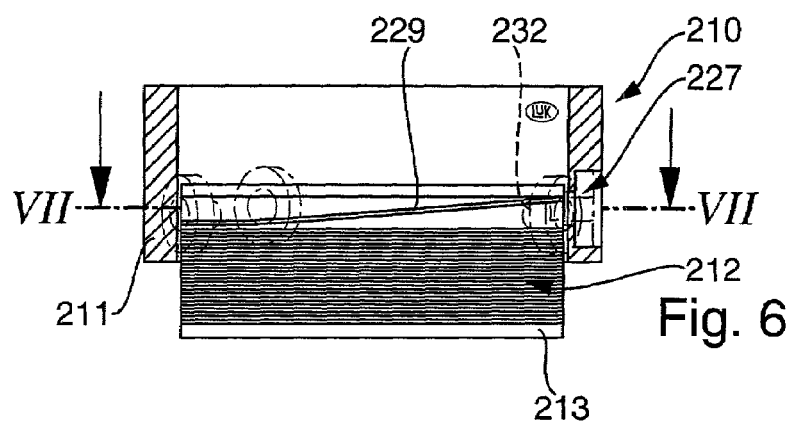
FIG. 6 is an axial sectional view of certain details in a fourth apparatus.
Figure 7:
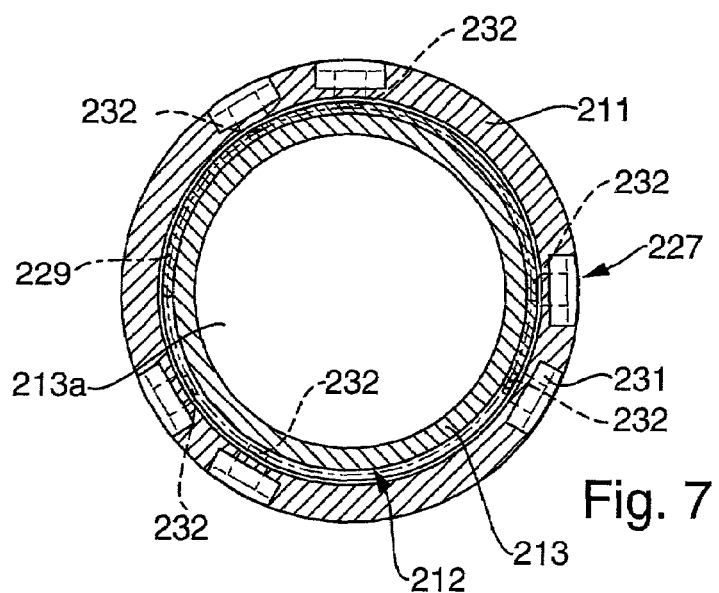
FIG. 7 is a sectional view as seen in the direction of arrows from the line VII—VII of FIG. 6.

FIGS. 6 and 7 show a modified spindle 210 which is utilized in an apparatus wherein the rotary part 211 surrounds the axially movable non-rotary part 213. The coil spring 212 is non-rotatably carried by the part 211; however, this coil spring surrounds the part 213 because the discrete followers of the follower assembly 227 extend radially inwardly between the two neighboring convolutions of the helix 229 forming part of or constituting the coil spring 212.

The follower assembly 227 comprises discrete followers each of which includes a stud or pin 232 and an antifriction bearing 231 surrounding the respective pin 232. The distribution of the two sets of followers of the assembly 227 is or can be identical with or analogous to that of the discrete followers 27*b*, 27*c* shown in FIGS. 4 and 5.

It will be seen that the improved apparatus (1) can employ a part (13) which surrounds the helix (29) and is axially movably mounted to surround a part (11) which carries a radially outwardly extending follower assembly (27) and is rotatably secured to a support (3) in such a way that its axial position remains unchanged. In contrast to the design of the apparatus 1, the apparatus including the structure of FIGS. 6 and 7 employs a part 213 which is surrounded by a helix 229, and a part 211 which has a radially inwardly extending follower assembly 227. The part 213 can rotate relative to the part 211 or vice versa; in either event, the part 213 moves axially of the part 211 as soon as or when the follower assembly 227 orbits about the part 213 and/or the part 213 and the helix 229 rotate relative to the part 211.

The part 213 has a central opening 213*a* which can accommodate a portion of a shaft (not shown), such as a shaft corresponding to the member 2 shown in FIG. 1.

In all other respects, the apparatus including the structure of FIGS. 6 and 7 is or can be identical with the apparatus 1 or 101. This includes, among others, the provision of shock absorbing pads corresponding to the pads 41, 42 shown in FIG. 4.

Figure 3:
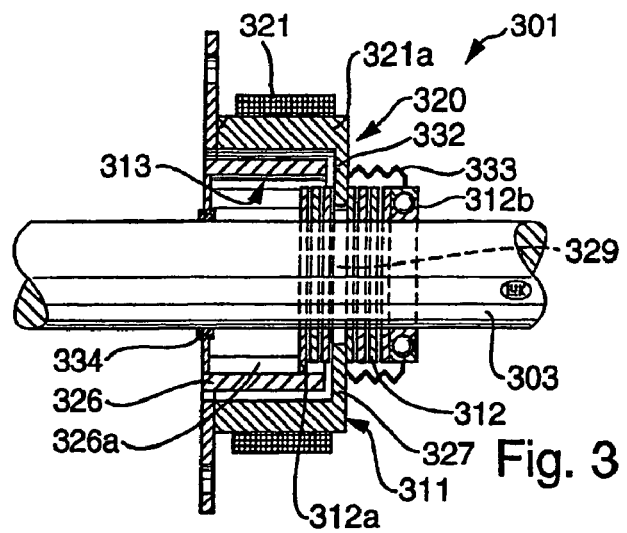
FIG. 3 is a fragmentary axial sectional view of an apparatus constituting a second modification of the apparatus shown in FIG. 1.

FIG. 3 illustrates certain details of an apparatus 301 wherein the stator 321 of the reversible electric motor 320 surrounds the rotor 326 and the rotor parts 312, 313. The rotor 326 can be said to constitute the rotary part 313 or vice versa. This rotary part spacedly surrounds a shaft 303. The stator 321 is affixed to or is of one piece with a stationary support 321*a*, and carries the follower assembly 327 which extends radially inwardly between two convolutions of a helix 329 forming part of a coil spring 312. The studs of discrete followers forming part of the follower assembly 327 are shown at 332.

The support 321*a* including the stator 321 of the motor 320 can be of one piece with the studs 332 of the follower assembly 327. Such one-piece member can constitute a converted blank of sheet metal which has been treated in an upsetting or another suitable forming or shaping machine. However, it is equally possible to form the studs 332 and the stator 321 (with or without the support 321*a*) as separate members which are thereupon welded and/or otherwise secured to each other.

The follower assembly 327 can be provided with antifriction bearings (not specifically shown) and/or with other means for reducing friction between the parts of such assembly and the convolutions of the helix 329 when the motor 320 is caused to drive the rotor 326 and the coil spring 312 relative to the stator 321 and the follower assembly 327. Alternatively, the windings of the helix 329 and/or the studs 332 of the follower assembly 327 can be provided with coats (layers and/or films) of suitable friction reducing material such as grease, fluoropolymers or the like. In addition to or in lieu of such coating, the abutting surfaces of the helix 329 and studs 332 (or at least one of such surfaces) can be hardened by resorting to a heat treatment or the like. It has been found that the wear upon the helix 329 and upon the follower assembly 327 can be reduced considerably by providing the contacting surfaces with layers or films of tungsten carbide on top of layers of copper, chromium, nickel or tantalum and/or other substances which enhance the ability of the tungsten carbide layers to adhere to the material of the members 332 and/or 329.

The part 313 is constituted by the rotor 326 and is non-rotatably but axially movably connected with the coil spring 312. One end convolution of the spring 312 extends radially outwardly, as at 312*a*, to form a tooth which is received in an axially parallel internal groove 326*a* of the rotor 326. In the coasting direction, the improved apparatus functions owing to the blocking action of the coil spring 312; on the other hand, the apparatus acts in the direction of pull due to the spring rate or spring gradient of the coil spring 312.

In accordance with a modification which is not shown in FIG. 3, the rotor 326 can be replaced with an axially movable composite rotor including two trough-shaped sections. The inner trough-shaped section is non-rotatably but axially movably mounted in the outer section by way of rolling elements which are guided in axially parallel grooves of the two sections. If the axially parallel grooves are replaced with helical grooves, such arrangement can enhance the effect of the axial drive if the lead of the helical grooves is the same as that of the coil spring, and such effect can be weakened if the lead is in the opposite direction. In other words, helical grooves can be resorted to in order to increase or reduce the initial stressing of the coil spring.

The coil spring 312 is centered on the shaft 303. That end convolution of this spring which is adjacent to and can bear upon the component(s) which is or which are to be shifted axially of the shaft 303 in response to starting of the motor 320 to drive the rotor 326 and the part 313 clockwise or counterclockwise can be provided with a friction reducing bearing at the end convolution 312*a*. Such bearing is particularly important if the angular velocity of the coil spring 312 differs from that of the aforementioned component(s). FIG. 3 further shows a roller bearing 312*b* at the right-hand axial end of the coil spring 312.

It is often desirable to encapsulate (sealingly confine) the entire axial drive, especially the space within the stator 321. FIG. 3 shows seals 333, 334 which seal the internal space of the stator 321 from the surrounding atmosphere, and such internal space can be filled with a supply of grease or another suitable lubricant. The seal 333 is a bellows which is affixed to the bearing 312*b* and to the follower assembly 327, and the seal 334 is a ring which is installed between the peripheral surface of the shaft 303 and the left-hand end portion of the second part 313 (i.e., between the shaft 303 and the rotor 326).

The bearing 312*b* can sealingly engage the shaft 303 and can be provided with suitable self-centering means serving to compensate for eventual axial displacements of the shaft 303 and the apparatus 301.

Figure 8:
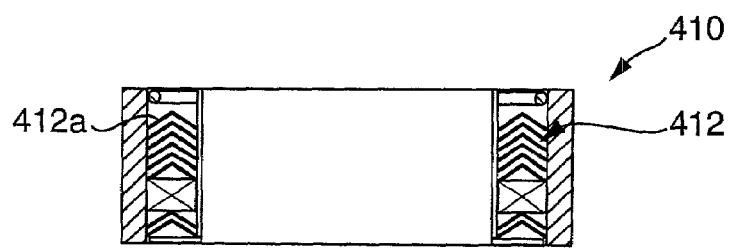
FIG. 8 is an axial sectional view of certain details in a fifth apparatus.

The spindle 410 of FIG. 8 employs a coil spring 412 having convolutions 412*a* with a V-shaped cross-sectional outline. For example, this spindle can be employed with advantage in lieu of the spindle 10 in the apparatus 1 embodying the structure of FIGS. 1, 4 and 5, or in lieu of the spindle 210 in an apparatus which embodies the structure of FIGS. 6 and 7.

An advantage of convolutions 412*a* of the type shown in FIG. 8 is that they facilitate the centering and/or the prestressing of the coil spring 412. Thus, the prestressing can take place in response to the application of an axially oriented force which urges the neighboring convolutions against each other; this causes the individual convolutions to act not unlike dished or diaphragm springs. The convolutions 412a can abut each other so that the corresponding packages act as one-piece block-shaped bodies; this causes the coil spring 412 to exhibit a two-stage spring characteristic including a first stage attributable to the spring constant of the coil spring 412 and a second stage attributable to the spring constant of the dished spring effect of individual convolutions 412a of the spring 412. The latter can be utilized, for example, to optimize the transmission ratio of an axial drive; to this end, the neighboring convolutions 412a of each package can abut each other or they can be prestressed so as to be yieldable in the direction of action of the axial drive.

FIGS. 9 and 10 show a spindle 510 which can be utilized in an axial drive for operation with push or pull. The follower assembly includes followers 527a, 527b installed in a cage 550 (see FIGS. 11 and 11a). The followers 527a, 527b are rolling elements which respectively roll along the convolutions 529a, 529b of the helix 529. The cage 550 is fixedly secured to the first part 511 which, in the embodiment of FIGS. 9 to 11a, receives torque from the motor (not shown) and includes a circumferentially extending portion for the radially inwardly extending rolling elements which constitute the followers 527a, 527b.

The followers 527a, 527b extend into grooves, provided in the part 511, during travel along a predetermined portion of the arcuate path; this ensures that the followers are supported by the part 511 in the axial as well as in the radial direction. The cage 550 extends radially inwardly between the neighboring convolutions of the helix, and the followers 527a, 527b roll along such convolutions.

The followers 527a, 527b are offset radially outwardly during a certain stage of each of their orbital movements so that they extend into the part 511. The helix 529 bypasses the followers 527a, 527b axially during such stage. Reference may be had to the developed view of FIG. 10 which illustrates those transition zones 550a, 550b for the followers 527a and 527b which are provided in the part 511. The zone 550a extends along an arc ($\alpha$) of between 120° and 160°, and the transition zone 550b also extends along an arc ($\beta$) of between 120° and 160°. In a presently preferred embodiment, $\alpha=\beta=140°$. The rolling elements (followers) 527a, 527b are transferred into the part 511 during travel along the arcs $\alpha$ and $\beta$, respectively, and such rolling elements are offset relative to each other to an extent corresponding to the pitch or lead of the helix 529. The rolling elements or followers 527a, 527b are guided in the cage 550 in such a way that the lead of the helix 529 is compensated for in a circumferential direction; in other words, the front part of the cage 550 is offset relative to the rear part by the width of one convolution of the helix 529. Such axial offset is compensated for by a corresponding guidance of the followers 527a, 527b in the part 511. It is clear that the cage 550 can be made of one piece with the part 511, e.g., by resorting to a properly shaped converted sheet metal blank.

FIG. 11a shows the follower 527a already partly in the groove of the part 511 while the entire follower 527b is still confined in the cage 550. The helix 529 is driven by the part 511 which rotates in the direction of arrows shown in FIG. 10, and the convolutions of the helix gather at the one side or at the other side of the path for the followers, depending upon the direction of rotation of the part 511, i.e., in dependency upon the selected mode of operation (with push or pull).

FIG. 12 illustrates a spindle 610 which constitutes a modification of the spindle 510 of FIGS. 9 and 10. The part 613 surrounds the part 611 which latter carries a radially outwardly extending follower assembly having circumferentially distributed rolling elements 627, e.g., needles or needle bearings installed in a cage 650. The motor which drives the part 611 is not shown in FIG. 12.

In order to avoid the need for a multiple-section (composite) cage 650, the latter and the coil spring 612 (which is non-rotatably affixed to the part 611) are rotatable about axes which are offset relative to each other so that the helix 629 is propped axially by an arcuate secton of the cage 650 for the rolling elements 627. The remainder of the helix 629 is free to bypass the cage 650 in order to enable the convolutions of the helix to move from one side to the other side of the followers 627, depending upon the direction of rotation of the rotor.

In order to optimize the running and rolling relationship between the follower(s) 627 and the helix 629, the spring 612 is preferably mounted in the part 613 in such a way that its lead or pitch is compensated for when the spring contacts the follower(s). In other words, the particular convolution of the spring 612 which contacts the followers lies substantially flat or flush. To this end, the axis of rotation or control axis of the coil spring 612 is twisted or turned relative to the rotational axis of the cage 650 and/or relative to the rotational axis of the part 613 in order to compensate for the lead of the spring 612. It will be appreciated that one can also construct or assemble a satisfactory spindle by properly guiding the coil spring 612 from within and by driving the cage 650 from without, as seen in the radial direction of such members.

It is desirable and advantageous to maintain the convolutions (such as 30a and 30b) of the two packages (such as 12a and 12b) of the coil spring or helix (such as 12) in abutment with each other except, of course, where the neighboring convolutions are separated from each other by the follower assembly or tracking device (such as 27). This renders it possible to produce or obtain very high transmission ratios which are dependent primarily upon the diameter or other transverse dimension(s) of the material (such as the diameter of the wire) of which the coil spring or helix is made. At the same time, one can increase the magnitude of the force which is being transmitted by the abutting convolutions of the coil spring.

The utilization of a coil spring or helix wherein the convolutions do not abut each other (or wherein only some of the convolutions in one of the two packages or in each of the packages abut each other) exhibits the advantage that the improved apparatus is capable of effecting an elastic transmission of forces during certain stages or during st least one selected stage of axial movement of one or more parts or components which takes place while the tracking device turns relative to the coil spring and/or vice versa. The axial dimension of the tracking device (i.e., the dimension as measured axially of the coil spring) remains or can remain constant. FIG. 1 shows that embodiment wherein the convolutions 30a, 30b in each of the two packages 12a, 12b abut each other.

The improved apparatus can be utilized as a means for pushing or pulling one or more components in response to movements of the tracking device relative to the coil spring and/or vice versa. When the apparatus of FIG. 1 is utilized to pull, the driven component (e.g., a band which is to be moved axially) is or can be coupled to the component which moves axially for the purpose of pulling the driven component.

In many embodiments (such as in that which is shown in FIGS. 1, 4 and 5), the two ends of the coil spring (12) are non-rotatably and fixedly secured to the second part (13), e.g., in a manner as fully described hereinbefore (i.e., such as by suspension, by rivets or by welding). This ensures that the second part 13 is a functional equivalent of a feed screw (helix) which is provided with an external thread but exhibits the additional advantage that the convolutions of the coil spring can move axially relative to each other in contrast with the fixed thread of a feed screw. Thus, when the convolutions of the package 12a and/or 12b actually abut each other, this entails a pronounced shortening of the "thread", i.e., of the one and/or the other package of convolutions of which the packages consist. Such "shortening" brings about a pronounced increase of the transmission ratio because the neighboring convolutions must be held out of contact with each other only at the location(s) where one or more parts of the follower (tracking device) extend radially between neighboring convolutions of the coil spring. In comparison with a feed screw having a rigid thread (which is replaced by the convolutions of the packages 12a and 12b), the tracking device 27 brings about an axial lengthening of the coil spring 12 only in that region or in those regions where such lengthening is unavoidable due to the fact that one or more portions of the tracking device must extend between the neighboring convolutions; all other parts of the coil spring can assume the positions or conditions of minimal length. Each such part of the tracking device which extends between two convolutions of the coil spring can effect a stretching or lengthening of the spring.

If the coil spring is rather stiff, it is advisable—in order to save expenses—to non-rotatably secure only one end convolution of such spring to the second part of the improved apparatus (reference may be had, for example, to FIG. 4).

In accordance with a further modification which is not specifically shown in the drawings, it is advisable to connect the second part of the improved apparatus with one or both end convolutions as well as with one or more partial or full intermediate convolutions of the coil spring. Such solution is especially desirable when the apparatus is called upon, or is expected to be called upon, to transmit pronounced axial pulling or pushing forces. As a rule, or at least in many instances, it suffices to connect the second part with a single intermediate convolution or with a portion of a single intermediate convolution of the coil spring. When the apparatus is in use, the tracking device normally compresses the one or the other package of convolutions, depending upon whether the apparatus is set up to transmit a pull or a push.

The tracking device of the improved apparatus can act not unlike a rake having several prongs or teeth with tooth spaces some or all of which can receive one, two, three or even more convolutions of the coil spring. Otherwise stated, the tracking device of the improved apparatus can have a configuration which is complementary to that of the adjacent portion of the coil spring. Furthermore, the second part is or can be coaxial with the coil spring.

It is also possible to employ a tracking device which extends at right angles (or close to at right angles) to the central axis of the second part. The central longitudinal axis of the coil spring in such apparatus can be inclined relative to the central longitudinal axis of the second part in such a way, or to such an extent, that the convolutions of the coil spring lie flush against the adjacent portions of the tracking device. Otherwise stated, those portions of the tracking device which engage one or more convolutions of the coil spring can have a lead or pitch corresponding to that of such convolution(s).

The material of which the coil spring is made can be a wire having a circular or other cross-sectional outline. For example, the wire can have a polygonal cross-sectional outline with more or less pronounced longitudinally extending edges between neighboring facets (see, for example, FIG. 8). In many instances, the wire of the coil spring will have a pronounced rectangular cross-sectional outline and will be convoluted in such a way that the longer sides of such outline extend radially and the shorter sides extend axially of the coil spring (see, for example, FIGS. 1 to 6). The wire of such coil spring is actually a flat strip or band. Experiments with such types of coil springs indicate that the ratio of the longer sides to the shorter sides of the convoluted flat strip or band can greatly exceed 1:1 and is preferably between 3:1 and 60:1.

The cross-sectional area and the configuration of the cross-section of the material (wire or band) of which the coil spring consists is important for the determination of the permissible magnitude of the force to be transmitted by the improved apparatus and for the transmission ratio of the improved apparatus. It will be appreciated that such prerequisites are contradictory (conflicting), i.e., that the magnitude of transmissible force increases if the transmission ratio decreases and vice versa. Thus, if the apparatus is to transmit pronounced axial forces, it is advisable to select a wire diameter or the thickness of a band within the range of up to 5 mm or (in special cases) even higher. However, and as presently advised, the diameter or thickness need not or should not exceed 2 mm and will preferably be approximately 1 mm. Such dimensions are presently contemplated if the improved apparatus is to be utilized as a means for engaging, disengaging or changing the extent of engagement of a friction clutch in the power train of a motor vehicle.

If the improved apparatus is to furnish high or very high transmission ratios, it is advisable to reduce the diameter of the wire or the thickness of the strip or band of which the coil spring is made all the way down to 0.1 mm.

The material of the coil spring (helix) is normally a metal (such as spring steel) or a plastic substance. Relatively inexpensive metals or alloys can be utilized in many instances. The selection of the material of the helix is often related to the cross-sectional dimensions of the wire or strip or band and to the diameter of the helix in order to properly select the characteristics of the helix and those of the entire apparatus. When the width of a band- or strip-like starting material for the helix is within a normal range, the ratio of the outer diameter of the helix to the radial width of the convoluted band or strip which forms the helix can be within the range of between 100:1 and 1:1, preferably between 30:1 and 5:1. The ratio of the diameter of the convoluted band (helix) to the thickness of the band can be within the range of between 700:1 and 25:1, preferably between 200:1 and 40:1. The length of the axial drive is dependent upon the intended use and is normally determined by the number of convolutions of the helix and the cross-sectional dimensions of its wire, strip or band. The number of convolutions can be between 3 and 300, normally or often between 5 and 50.

Under certain circumstances (e.g., in apparatus for the transmission of certain types of motion), it might be advisable to design the improved apparatus in such a way that the axial path defined by the helix in conjunction with the tracking device exhibits two or more different slopes or pitches. For example, the helix which is made of convoluted wire or of a convoluted band or strip can have at least two different diameters which follow each other in the axial direction of the helix; the slope of convolutions in that portion of the helix which has a first diameter is or can be different from that of convolutions in that portion of the helix which has a different second diameter. The slopes of convolutions in the two portions of the helix conform to or are dependent upon the respective diameters of such helix.

It is also possible to employ for the helix an elastic band having a trapeziform cross-sectional outline which is converted into a helix in such a way that inclined surfaces of its convolutions are in contact with rolling follower means (e.g., pins) having a spherical or partly spherical outline. In order to achieve different slopes, the band or strip can include two or more portions having different thicknesses. The self-locking action of such helix-follower combination can be varied by way of the reinforcement factor of the axial drive as a function of the covered axial distance. For example, it might be advisable to compensate for force relationships established by the diaphragm spring in a friction clutch by different thicknesses of a band or strip which is converted into the helix of the improved apparatus in order to thus establish a uniform progress of force.

The helix which is made of round wire or of a convoluted band or strip can be utilized with a sensor which monitors the movements, changes of position and/or other parameters of the helix and generates signals. For example, an end face of the helix can be provided with configurations which can be monitored by an incremental distance sensor. The configuration of one end face of the helix can be such that signals generated by the sensor which monitors at least one end face can be processed to permit the ascertainment of the speed and/or the acceleration of the band. The manner in which the signals from the sensor(s) are or can be evaluated and processed can be ascertained by resorting to relevant literature in the fields of incremental distance sensorics and ABS sensorics.

It is frequently advisable to fit two or more bands or strips into each other. For example, two or more bands or strips having different thicknesses can be caused to overlie each other prior to conversion into a helix. It is also possible to interfit or encapsulate two or more different bands or strips in such a way that they are located at different radial distances from the axis of the helix. Such modifications render it possible to achieve more satisfactory rolling-down kinematics, a reduction of surface pressure and/or certain other advantages.

As far as the basic concept of the present invention is concerned, it is immaterial whether the tracking device is connected with the first or second part of the improved apparatus and whether the helix is connected with the second or first part, i.e., which of (a) the tracking device and (b) the helix is caused to turn with the rotary part. In either event, one can achieve an axial distancing in the positive or negative direction. However, and in order to reduce the moment of inertia of the first part, it can be of particular advantage to hold the part which is connected with the helix against rotation and to rotate the part which carries the tracking device. As already mentioned hereinbefore, and as shown in the drawings, the means for transmitting torque to the rotary component can include at least one electric motor.

It is equally within the purview of the present invention to rotate the first and second parts of the improved apparatus but at different rotational speeds. Such difference between the speeds of rotation of the first and second parts can be arrived at by resorting to an acceleration and/or deceleration of the one or the other part. This difference between the rotational speeds of the first and second parts effects an axial acceleration of one part relative to the other part. It will be seen that the improved apparatus can cooperate with and/or can include a brake, e.g., an electromagnet or a slave cylinder, particularly a hydraulic slave cylinder. This will be described in detail with reference to FIGS. 13 and 14. The hydraulic slave cylinder can bring about a braking action by causing the part or parts to be braked to bear upon a stationary housing or the like. Under such circumstances, the rotary movement which is required to effect an axial displacement can be received from a rotary overall system on which the axial drive is or can be mounted.

If the means for rotating includes a shaft which is driven to rotate in a single direction, it is advisable to brake, for example, the first part by urging it against the aforementioned stationary housing and to non-rotatably connect the second part with the shaft. A reversal in the direction of axial movement can be arrived at by non-rotatably connecting the shaft with the second part and/or with the element and by braking the first part, e.g., against the housing. An axial drive of such type can be readily visualized as a rotary screw or bolt which mates with a nut. The screw or bolt is caused to rotate in a single direction, and the screw or bolt and the nut are alternatingly braked by causing them to move against a stationary member. The nut is alternatingly tightened and loosened.

In accordance with a further embodiment of the present invention (not shown in the drawings), a combination of various components can comprise a freewheel and at least one electromagnet or a hydraulic slave cylinder which operates a brake. Two freewheels and two electromagnets or slave cylinders are each mounted on two discrete shafts, and the freewheels are mounted to operate counter to each other (as well as to be coupled to the housing by means of discrete actuatable brakes). Each actuation of the apparatus involves the engagement of a single brake.

If the improved apparatus is to be utilized in the direction of push as well as in the direction of pull, it is often advisable to employ different first and second tracking devices (followers) which enter the space between one and the same pair of neighboring convolutions of the helix and are spaced apart from each other in the axial direction of the helix; one of the tracking devices is effective in the direction of push and the other is effective in the direction of pull (see the sets of studs 27b, 27c in FIG. 4).

The tracking device of the axially operating apparatus is or can be designed and mounted in such a way that the necessary axial support can take place at the helix and the radial engagement—as seen circumferentially of the helix—involves the utilization of at least one recess or cutout or opening for the passage of the wire or band. It can be of advantage to impart to the tracking device the shape of a convolution or that of ramps so that the helix is guided along a relatively long circumferentially extending path; this ensures that the forces developing between the tracking device and the helix are distributed as uniformly as possible. The tracking device can be secured to the first part by resorting to readily available undertakings such as welding, induction welding, riveting, pressing and/or others as well as combinations of two or more of the just enumerated and/or other techniques. Furthermore, at least the first part of the improved apparatus can be formed by resorting to pressing, deep drawing, lateral extrusion and/or other similar procedures; the tracking device can be applied to the first part by embossing, molding or the like, namely by resorting to an undertaking which requires no further finishing or no significant additional treatment.

The above enumerated and related procedures result in an axial shifting of the tracking means relative to the starting and end portions thereof (as seen in the direction of progress of the guide means in the circumferential direction) in such a way that the wire or band exhibits a loop (see FIG. 10) which is disposed between the starting and end portions and one can assume that the tracking device exhibits the progress of a screw thread. It is also desirable, under certain circumstances, that the tracking device include several pins or posts which are distributed (in the circumferential direction) in such a way that the path for the wire or band extending along them has a width corresponding to a single wire diameter or to the thickness of a single strip or band. The axial offset can be selected with a view to enable the tracking device to compensate for the unwinding or development of the wire or band. Otherwise stated, that part of the tracking device which is immediately surrounded by the wire or band (as seen in the axial direction) and the shrinking package of convolutions is preferably offset axially by one wire diameter or one band thickness in the direction of the shrinking package of convoluted wire or band. It is clear that the terms "wire", "band" and "strip" are intended to encompass any and all other types of starting materials which can be utilized as a helix capable of being put to use in the apparatus of the present invention.

To reiterate the definition of the tracking device, this component of the improved apparatus can include or constitute or encompass a host of specific shapes and parts such as a plurality of pin-shaped followers which are spaced apart from each other in the circumferential direction of the helix, which extend radially of the helix, which are borne by the first part of the apparatus and which traverse the adjacent portion or portions of the helix by extending between the neighboring convolutions to perform the function of the internal thread of a nut or the external thread of a screw, feed screw or bolt. It is of advantage to distribute the just discussed pins axially along a path resembling an imaginary screw thread. The number of pin-shaped followers can depend upon the circumstances of intended use of the improved apparatus and can be between two and twelve, normally or often or preferably between three and five. The lengths of the pins can be such that they extend at least substantially all the way between the neighboring convolutions of the helix (as seen radially of such convolutions). It is further clear that the pins or analogous followers which are to be used in an apparatus arranged to pull can be provided in addition to the pins which are to be utilized in an apparatus serving to transmit pushing forces, i.e., the tracking device which is used in an apparatus arranged to push as well as to pull can employ two discrete sets of identical or different pin-shaped followers.

The efficiency of the improved apparatus can be enhanced (e.g., optimized), with attendant reduction (such as minimizing) of friction, by employing a tracking device having rotary followers (refer, for example, again to FIG. 4). If the helix (such as 12) is a coiled band, the followers preferably include rotary cylindrical sleeves each of which is the outer race of an antifriction bearing and can be maintained in extensive (such as full linear) contact with the adjacent surface(s) of one or two convolutions of the band. Other types of bearings (such as friction bearings without annuli of rolling elements in the form of spheres, barrels or the like) can be employed with equal or similar advantage. In order to minimize direct radial engagement of pin-shaped followers with the adjacent convolution(s), the entire followers can be rotatably mounted in the first part of the improved apparatus, i.e., that portion of a follower which extends radially from the first part need not include two or more sections which are rotatable and/or otherwise movable relative to each other. Thus, the bearings for the pin-shaped followers can be located radially inwardly or outwardly of the adjacent convolution(s).

A further advantageous feature of the present invention resides in the provision of a tracking device which includes a plurality of followers disposed at the same level or close to the same level (as seen in the axial direction of the helix) but having different diameters so as to take into consideraton the pitch or lead of convolutions of the helix. For example, the tracking device can include several followers of the type shown in FIG. 4 at 27b, 27c but having different diameters.

This (just discussed) modified tracking device can include a series of four circumferentially spaced apart friction or antifriction bearings having progressively increasing diameters but with their axes in a common plane normal to the axis of the helix; such followers can replace the followers which are shown in FIG. 5.

One of the two parts of the improved apparatus can be fitted into the other part, i.e., the other part can extend radially outwardly beyond the one part. It is particularly advantageous to fit the second part into the first part and to dispose the convolutions of the helix between the first and second parts, as seen in the radial direction of the helix.

In accordance with a further advantageous feature of the present invention, the first part of the improved apparatus can be provided with recesses or grooves which together resemble at least one convolution or segments of at least one convolution and receive rolling elements which extend from the recesses and between the convolutions of the spiral and thus constitute the tracking device (see FIG. 11a). It is advisable to provide at least two circumferentially spaced apart rolling elements which can even be introduced into the otherwise assembled apparatus through a radially outwardly extending inlet opening of the first part (this feature is not shown in FIG. 11a and/or in the other Figures). The inlet opening is closed upon completed insertion of two or more rolling elements. The just described mode of introducing the followers of the tracking device is possible even if the followers are circumferentially spaced apart pins or the like.

A circumferentially extending endless groove or recess or guide can receive a plurality of rolling elements. The rolling elements advance in the guide at a speed which is different from that of the part in which the endless groove is provided or from the speed of the helix. That portion of the groove which establishes a path or connection between its inlet and outlet can be enlarged (widened), as seen in the radial direction, so that the helix can move axially through such portion of the groove without coming in contact with the rolling elements. The rolling elements can be confined in a cage which is connected with the first part of the apparatus and is provided only in that radially increased portion of the recess or groove where the rolling elements bypass the helix in the axial direction. In order to ensure a more satisfactory guidance of the rolling elements and to increase the area of contact between the helix and the rolling elements, e.g., to optimize the Hertzian pressure, the rolling elements can resemble or constitute barrels which roll along the surface bounding the groove as well as along the helix (see FIG. 11).

In order to reduce or even eliminate axial play between the two parts of the improved apparatus, or to establish special characteristic force lines in the direction of action of the drive, the two parts of the apparatus can be assembled in stressed condition. This can be achieved by the helix, e.g., by utilizing (a) a helix which is a compression spring and maintains the first and second parts of the apparatus in axially stressed condition, and/or (b) a helix which is attuned in such a way that, when properly installed, its convolutions abut each other or are maintained at a preselected spacing from one another. At least one bearing can be installed between such helix and the first part of the apparatus. Reference may be had to certain preceding passages of this specification.

The axially effective energy storing device (such as a coil spring, a gas-filled cylinder or the like) can be used to maintain the two parts of the improved apparatus in prestressed condition. For example, this energy storing device can employ at least one coil spring which operates axially between the two components. Alternatively, one can employ a set of circumferentially spaced apart leaf springs (not shown) having end portions connected to the first and second parts. The leaf springs can also serve to center the first and second parts relative to each other. Still further, it can be advisable to employ a compensating spring (not shown) which connects one of the parts, particularly the axially shiftable part, axially with a stationary part of a housing. The compensating spring can further serve to center the one part; such spring can be employed in the power train of a motor vehicle to oppose the force which tends to disengage the friction clutch.

Another desirable and advantageous mode of centering the first and second parts of the improved apparatus (and hence also the helix) relative to each other, especially in embodiments which operate without a compensating or prestressing spring, involves the utilization of self-centering action of the helix regarding its longitudinal axis. To this end, and especially if the helix is a convoluted band or strip, the convolutions of such band can have a V-shaped cross-sectional outline (refer again to FIG. 8) and neighboring convolutions are fitted into and are thus centered by each other (this, too, can be seen in FIG. 8). The tip of the V-shaped cross-sectional outline should point counter to the direction of action of the helix, i.e., such tip should point in the direction of movement of the axial drive. In addition, such design of the helix can exhibit a further spring constant to support the neighboring convolutions by each other in accordance with the so-called diaphragm spring effect when the neighboring convolutions already contact each other and are thereupon subjected to additional axial stresses to thus provide a coil spring with two spring constants which can be put to use in different ways, for example, once as a compensation spring and secondly as a damper of axial movements and the like.

In accordance with an additional inventive concept, the axial drive can operate with a twisting or turning of the two parts relative to each other. This is accomplished by way of a differential angular velocity of the two parts, namely one of the parts can be in a condition of standstill or in a state of angular movement while the other part turns relative to the one part at a different angular velocity. To this end, one of the parts can be rotated by the turning means relative to the other part in that the turning means is supported by the one part or by a component which is secured to the housing. It can be of advantage if the part which is stationary or rotates at an unchanging angular velocity during activation of the axial drive undergoes an axial displacement, for example, in order to ensure that a component which does not rotate or rotates at a corresponding angular velocity need not be provided with an arrangement for compensation of differences in RPM. This is of advantage when the improved apparatus is utilized to disengage a friction clutch in the power train of a motor vehicle. When the component and the axially stressed element rotate at predetermined different speeds, e.g., when the axial drive is designed in such a way that the axially shifted part rotates, it can be of advantage to utilize a roller bearing which permits the two parts to turn relative to each other.

In order to prevent the tracking device from striking upon the spring fastening means, it can be of advantage to provide an abutment or stop (see the parts 41, 42 in FIG. 4) which can act in a circumferential direction and/or axially before the helix turns to a maximum extent and which, due to its configuration, can act as a means for damping or cushioning the angular movement so that, for example, one avoids a jamming of the two parts at the stop or stops.

It is also possible to provide means (not shown) for limiting the extent of angular movement in at least one direction before the tracking device strikes one end convolution of the spiral. To this end, an electric motor (which constitutes or forms part of the turning means) can be electrically limited or controlled, for example, by employing a sensor which monitors the maximum working distance by ascertaining the covered distance and/or a distance sensor which monitors the number of revolutions of the rotor. The thus obtained results are evaluated and utilized to control the electric motor. At least one of the sensors can constitute an incremental distance sensor. Presently preferred sensors include incremental distance sensors, inductive sensors and suitable potentiometers.

Figure 27:
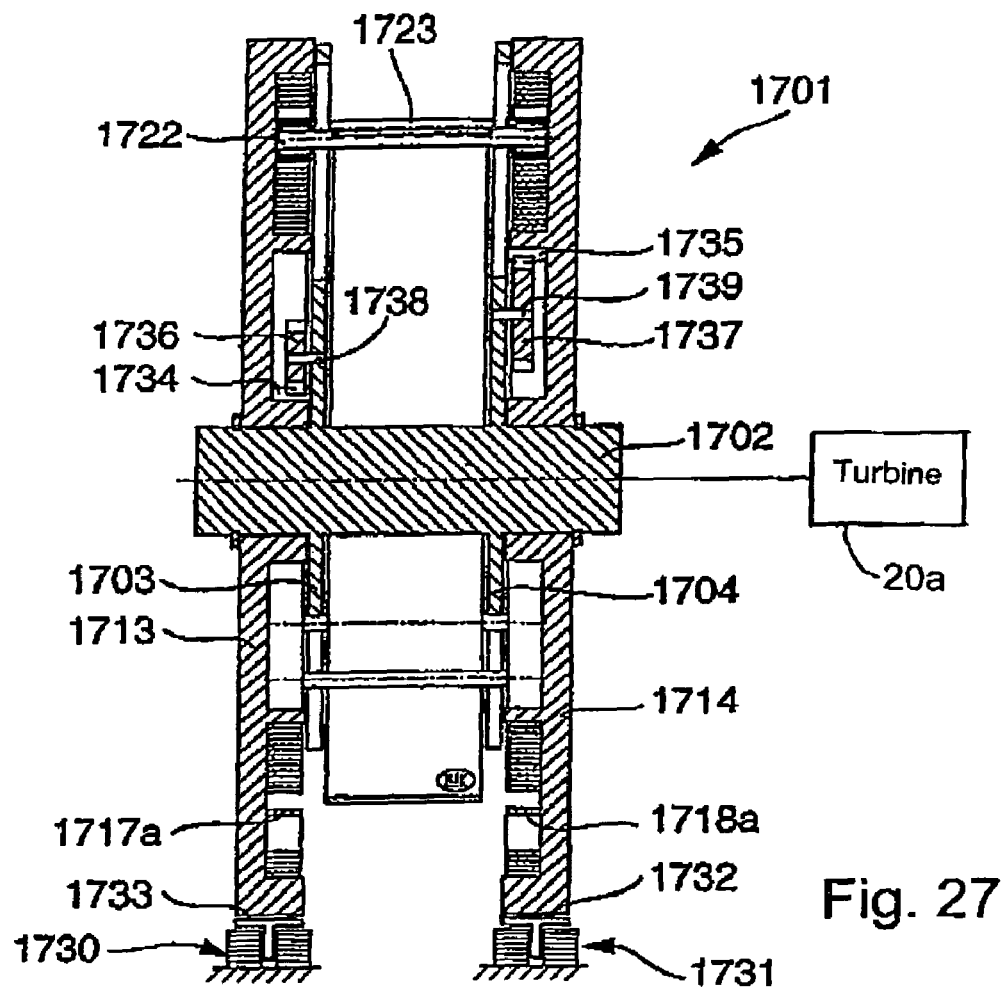
FIG. 27 shows the apparatus of FIG. 26 having a turbine as a turning means.

The turning means of the improved apparatus can include practically any component or device which can rotate one part of the apparatus relative to the other part. Electric motors are presently considered as being particularly suitable as a means for turning the one part relative to the other part of the apparatus. If it is desirable to employ a turning means which need not or should not rely on electrical energy (e.g., because of the danger of explosion), it is possible to utilize a turbine (see turbine 20a of FIG. 27) or a compressed-air turbine (such turbine can be utilized if an inexpensive source of compressed air or another gas is readily available).

Figure 1A:
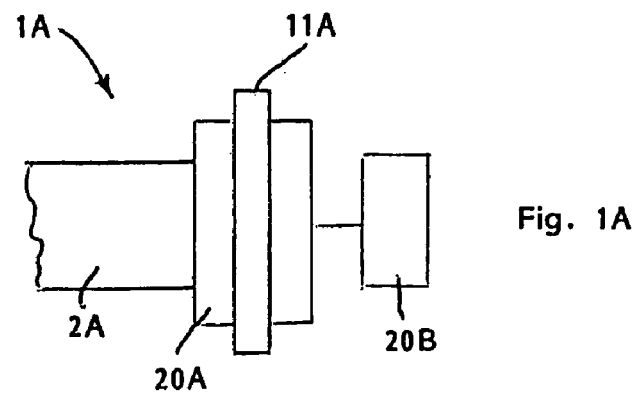
FIG. 1A is a fragmentary elevational view of a combination of parts which can be utilized in the apparatus of FIG. 1 if an electric motor is to be replaced with a turbine.

FIG. 1A shows a part of an apparatus 1A wherein the shaft 2A carries a turbine 20A (such as a compressed-air turbine) which serves to rotate the part 11A. The reference character 20B denotes a source of compressed gaseous fluid which is connected to the turbine 20A.

The turning means is preferably coaxial with the two parts of the apparatus; however, it is also possible (when necessary) to employ a turning means (not shown) having an axis which is parallel to the common axis of the first and second parts. In the latter case, the apparatus further comprises means for transmitting rotary motion from the output element of the turning means to the driven part of the apparatus. The motion transmitting means can include a simple set of mating gears, a planetary transmission, a chain and spur gear transmission, a belt and pulley transmission or the like. The transmission can be a step-up or a step-down transmission.

Figure 17:
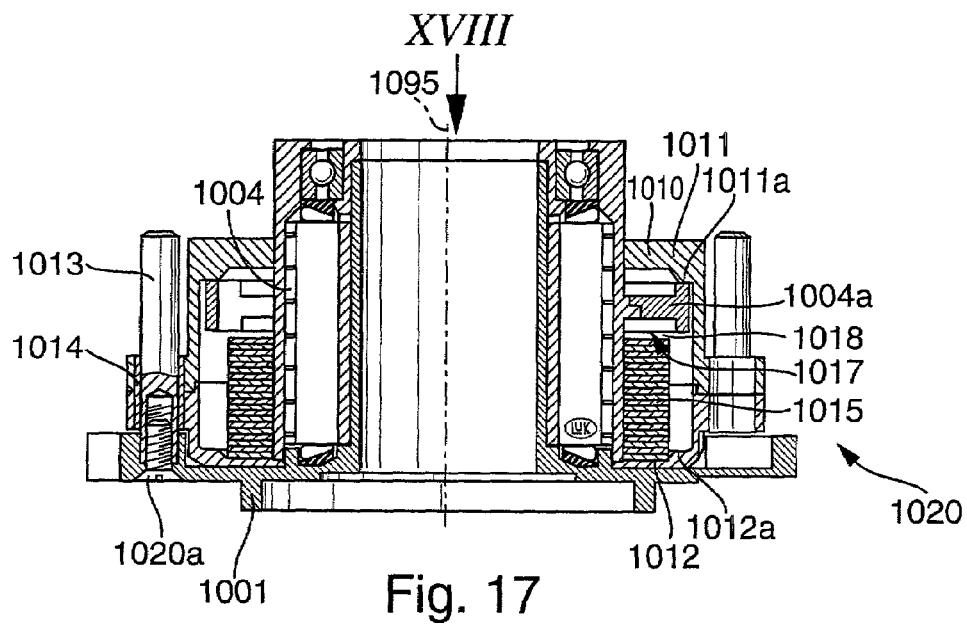
FIG. 17 is an enlarged view of the clutch engaging/disengaging apparatus which is shown in FIG. 16.

The turning means can be designed, selected and installed in such a way that it fits into the improved apparatus without any or without appreciable increase in space requirements of the apparatus. Thus, the turning means (such as the aforediscussed electric motor) can be installed at least within the radial confines of the first and second parts, preferably within the outer one or even within the inner one of the first and second parts if such parts are encapsulated within each other. This is shown in the aforementioned FIGS. 1 and 15 and is also illustrated in FIG. 17 which will be described in full detail hereinafter.

It is often advantageous to drive the radially outer part of the improved apparatus or to drive the radially inner part of such apparatus. It is particularly advantageous to install the turning means (such as a turning means which includes or which is constituted by the aforementioned electric motor) around a rotary shaft which extends through a central opening (e.g., a circular opening) of the inner part of the apparatus; the turning means can be arranged to rotate with the shaft, to rotate relative to the shaft, or to be secured to a housing for rotation with or relative to the housing and/or for rotation with or relative to the shaft.

It will be recalled that, in the embodiment of FIG. 1, the electric motor 20 surrounds the shaft 2 which latter is also surrounded by the entire apparatus (axial drive) 1. The shaft 2 extends through a central opening in the rotor 26 of the electric motor. Mating teeth can be provided to hold the rotor 26 of the motor 20 against angular movement with reference to the housing 3, and the latter can be non-rotatably affixed to one of the first and second parts, such as to the first part 11 or the second part 13 of the apparatus (axial driving assembly) of the character illustrated in the aforedescribed FIG. 1. However, it is also possible to rotatably mount the housing on the shaft.

As already mentioned hereinbefore, the improved apparatus can be utilized with advantage to move a first part axially of a second part in response to rotation of one of the first and second parts relative to the other of these parts. It was also mentioned that such apparatus can be utilized with particular advantage in the power trains of motor vehicles, for example, to engage or disengage a friction clutch by moving a clutch actuating lever, bearing or the like axially of the clutch. Such apparatus can replace a mechanical or a hydraulic drive which is customarily employed in many presently known power trains in order to engage or disengage a friction clutch by causing the prongs of a diaphragm spring to tilt the diaphragm spring relative to the cover or housing of the friction clutch. The improved apparatus can be put to use in conjunction with a manually or automatically operable friction clutch, e.g., a friction clutch which can transmit, or interrupt the transmission of, torque between the output shaft (such as a crankshaft or a camshaft) of the engine and the input shaft of a transmission in the power train of a motor vehicle. The clutch may be provided with means for automatically compensating for wear upon the friction linings of the clutch disc and preferably also for wear upon the axially movable pressure plate and the axially fixed engine-driven counterpressure plate of the clutch. Such automatic wear compensating arrangements are disclosed, for example, in commonly owned U.S. Pat. No. 5,450,934 granted Sep. 19, 1995 to Paul Maucher for "FRICTION CLUTCH". The clutch may be of the type disclosed, for example, in German Patent No. 195 04 847. The clutch which embodies or cooperates with the apparatus of the present invention can be a pull type or a push type friction clutch or a so-called twin clutch. It is often desirable to design the clutch in such a way that it can assume a fully engaged condition, a fully disengaged condition, as well as numerous intermediate conditions in which the pressure plate and the counterpressure plate can slip (to a selected extent) relative to the clutch disc and/or vice versa.

Figure 15:
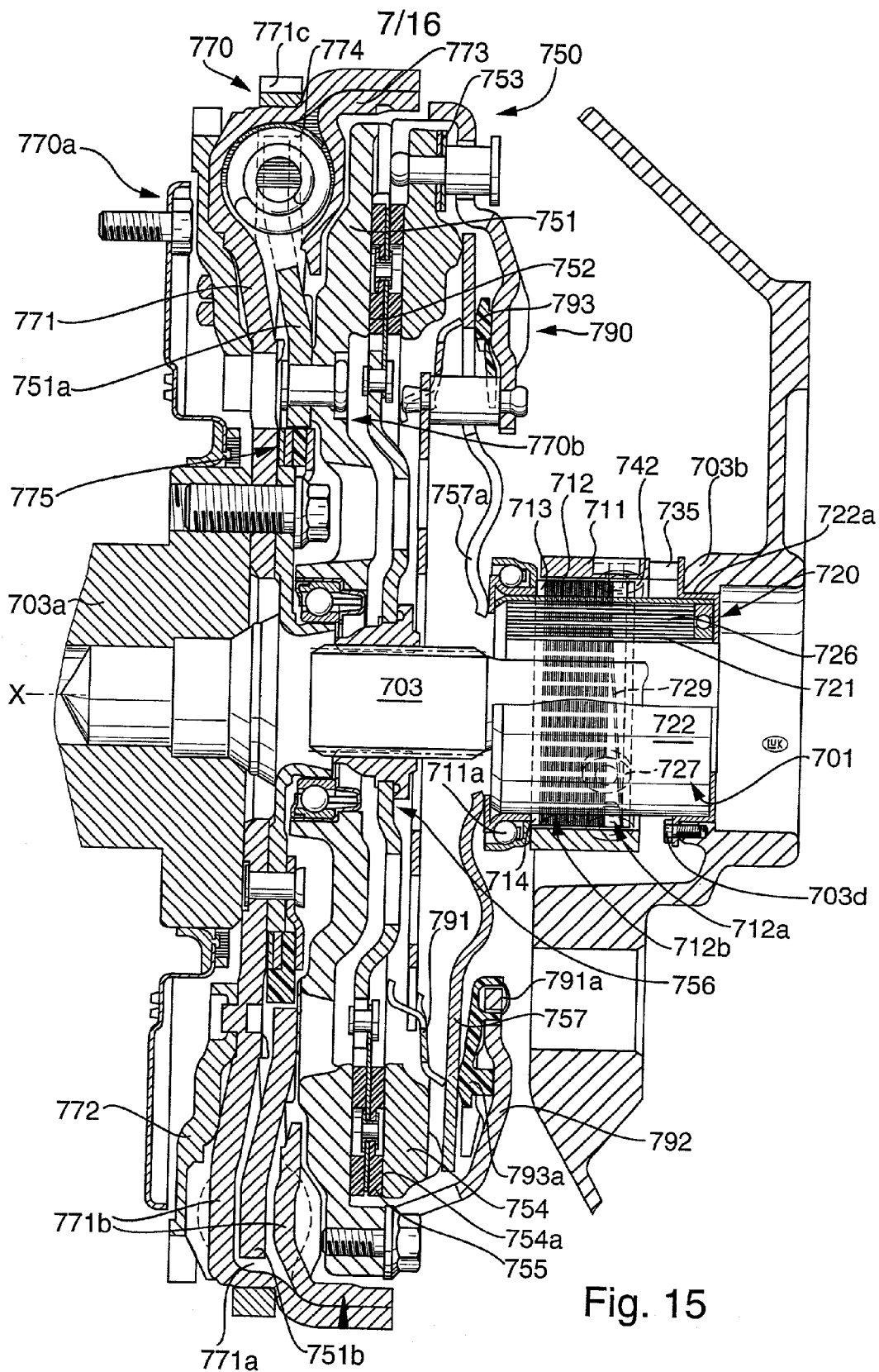
FIG. 15 is a sectional view of a composite flywheel forming part of a friction clutch which is engageable and disengageable by an apparatus constituting a modification of those shown in FIGS. 13 and 14.

FIG. 15 illustrates a friction clutch 750 wherein an apparatus 701 (similar to the apparatus 301 of FIG. 3) is utilized to engage or disengage the clutch, namely to select the magnitude of the torque which can be transmitted between the output shaft (such as a crankshaft or a camshaft) 703a of an internal combustion engine (not shown) and the input shaft 703 of a change speed transmission. The wear at least upon the friction linings 755 of the clutch plate or disc 756 of the clutch 750 is automatically compensated for by an automatic wear compensating arrangement 790.

The clutch 750 comprises a composite or split flywheel 770 having a first mass (primary flywheel) 770a, a second mass (secondary flywheel) 770b coaxial with the first mass 770a, and a damper including coil springs 774 which yieldably oppose rotation of the masses 770a, 770b relative to each other. A radially extending wall 771 of the mass 770a is affixed to and normally receives torque from the output shaft 703a of the engine. The first mass 770a defines an annular chamber 771a which receives the coil springs 774. The chamber 771a is defined by the radially outermost portion of the wall 771 and by an annular member 773 of the first mass 770a.

The radially outermost portion of the wall 771 carries a starter gear 771c and is provided with or defines an ignition regulating and/or indicating ring 772. The damper which includes the coil springs 774 (of which only one can be seen in FIG. 15) further includes a flange 751a which forms part of the second mass 770b, and pockets 771b forming part of the mass 770a. When the masses 770a, 770b are caused to turn relative to each other about their common axis X, each coil spring 774 is caused to store energy because one of its end convolutions bears upon one of several radially outwardly extending projections or arms 751b of the flange 751 (i.e., of the mass 770b) and its other end convolution bears upon the adjacent pockets 771b of the mass 770a. This holds true regardless of whether one of the masses 770a, 770b is caused to turn from a starting position in a clockwise or in a counterclockwise direction. It is normally preferred to install the coil springs 774 in the annular chamber 771a in a prestressed condition.

A friction clutch which employs a composite flywheel with a damper between the masses of such flywheel is disclosed, for example, in commonly owned U.S. Pat. No. 5,980,387 granted Nov. 9, 1999 to Oswald Friedmann et al. for "APPARATUS FOR DAMPING VIBRATIONS".

The counterpressure plate 751 of the friction clutch 750 is riveted to the secondary mass 770b, and the axially movable pressure plate 754 of the friction clutch is non-rotatably secured to a housing or cover 792 of the clutch. The housing 792 is compelled to rotate with the counterpressure plate 751, and the axially movable pressure plate 754 is compelled to rotate with the housing 792 because it is secured thereto by several substantially tangentially extending leaf springs 753.

The action of the damper including the coil springs 774, the projections or arms 751b of the flange 751a and the pockets 771b is assisted by a frictional damper 775 which also operates between the masses 770a, 770b of the composite flywheel 770, i.e., between the output shaft 703a of the prime mover and the counterpressure plate 751 of the friction clutch 750. The frictional damper 775 can be designed to oppose each and every stage of angular movement of the masses 770a, 770b relative to each other or to oppose only certain (e.g., advanced) stages of such angular movement.

The friction linings 755 of the clutch disc 754 (which is non-rotatably mounted on the input shaft 703 of the transmission) are located between an annular friction surface 752 of the counterpressure plate 751 and the annular friction surface 754a of the pressure plate 754. The shaft 703 rotates with the mass 770b without slip when the clutch 750 is fully engaged, namely when the friction surface 754a of the pressure plate 754 bears upon the adjacent friction linings with a force which suffices to ensure that the clutch disc 756 shares all angular movements of the counterpressure plate 751. On the other hand, the plates 751, 754 are free to slide relative to the clutch disc 756 (or vice versa) to a preselected extent when the friction linings 755 are free to slip relative to the friction surface 752 and/or 754a.

The bias of the friction surfaces 752, 754a upon the adjacent friction linings 755 is determined by the condition of a clutch spring 757 here shown as a diaphragm spring which is tiltably mounted at the inner side of the clutch housing 792 and has a circumferentially complete annular radially outer portion bearing upon an annulus of protuberances provided on the pressure plate 754. The diaphragm spring 757 is tiltably mounted in the housing 792 and further includes radially inwardly extending tongues or prongs 757a which can be engaged and tilted by the aforementioned release bearing 711a when the condition of the clutch 750 is to be changed in a sense to (partially or fully) disengage the illustrated (push-type) clutch. Such tilting of the prongs 757a causes the radially outermost portion of the diaphragm spring 757 to relax the pressure upon the axially movable pressure plate 754 so that this pressure plate is pulled axially and away from the counterpressure plate 751 by the aforementioned leaf springs 753. This results in a partial or full disengagement of the clutch 750.

The apparatus 701 is mounted on the transmission shaft 703 and serves to move the prongs 757a of the diaphragm spring 757 in a direction to the left (as viewed in FIG. 15), i.e., to partially or fully disengage the friction clutch 750. The construction of the apparatus 701 is analogous to that of the apparatus 301 shown in FIG. 3, at least to the extent that the axially movable part 711 surrounds the axially fixed part 713. The reversible electric motor 720 of the apparatus 701 can be started in a direction to effect an axial movement of the part 711 toward the friction clutch 750 and to thus at least partially disengage the clutch by way of the bearing 711a. The diaphragm spring 757 performs the function of the coil spring 35 of FIG. 1 or the leaf springs 135 of FIG. 2 in that it opposes the movement of the part 711 toward the friction clutch 750. The bearing 711a is installed between the axially movable part 711 and the prongs 757a and thus carries out a dual function including that of a release bearing as well as of a means for permitting rotation of the diaphragm spring 757 and its prongs 757a relative to the part 711 of the apparatus 701.

The motor 720 of the apparatus 701 has a housing 722 which is mounted on the input shaft 703 of the change-speed transmission receiving torque from the clutch disc 756 when the clutch 750 is at least partially engaged. The housing or support 722 of the motor 720 includes a portion 722a which is secured to the transmission case 703b by bolts 703d or by other suitable fastener means.

The rotary inner part 713 of the apparatus 701 carries the coil spring 712 which is held between the end wall 714 and a stop 742 and is connected with the rotor 726 of the motor 720. The stator 721 of the motor 720 is connected with the motor housing 722. The outer part 711 of the apparatus 701 is nonrotatably but axially movably affixed to the portion 722a of the housing 722 by several (preferably three) leaf springs 735 which are equidistant from each other (as seen in the circumferential direction of the parts 711, 713). The apparatus 701 can constitute a module which is connected to the housing portion 722a and is installed in the transmission case 703b.

The operation of the clutch 750 is as follows:

If the clutch is to be disengaged, the motor 720 is started to rotate the axially fixed part 713 so that the spiral 729 is caused to move relative to the follower assembly 727 of the non-rotatable axially movable part 711. Such axial movement is due to the shifting of at least some convolutions of the helix 729 from the package 712b to the package 712a; this causes the part 713 to move axially to the left (as viewed in FIG. 15) so that the bearing 711a disengages the clutch 750 to a desired extent. Such axial movement of the part 713 is opposed by the diaphragm spring 757.

If the clutch 750 is to be reengaged (or engaged to a greater extent), the motor 720 is started in a direction to move the part 713 in a direction to the right; this enables the diaphragm spring 757 (assisted by the leaf springs 735) to increase the bias of the friction surface 754a of the pressure plate 754 upon the adjacent friction linings 755 of the clutch disc 756, i.e., the left-hand friction linings 755 bear upon the friction surface 752 of the counterpressure plate 751 with a reduced slip or with no slip at all. At such time, the axial length of the package 712a of convolutions of the helix 729 increases and the axial length of the package 712b decreases.

The automatic adjusting device 790 compensates for wear at least upon the friction linings 755 in a manner as disclosed, for example, in the aforementioned U.S. '934 patent to Maucher. FIG. 15 merely shows a force sensor 791 which is installed in stressed condition between the clutch housing 792 and the diaphragm spring 757, and a ring-shaped adjusting or wear compensating member 793 which is biased circumferentially by coil springs and/or other suitable springs 791a. When the sensor 791 yields in the axial direction of the clutch 750, this indicates that the friction linings 755 have undergone a certain amount of initial or additional wear (this is indicated by a determination that the conicity of the diaphragm spring 757 and/or its distance from the inner side of the housing 792 has been changed to a predetermined extent). The device 790 compensates for such wear by causing the diaphragm spring 757 to move axially toward and relative to the pressure plate 754. The actual adjustment involves an angular and a resulting axial movement of the ring-shaped compensating member 793, under the bias of the springs 791a, along suitably inclined circumferentially distributed ramps 793a, all in a manner as fully described and shown in the U.S. '934 patent to Maucher.

Figure 13:
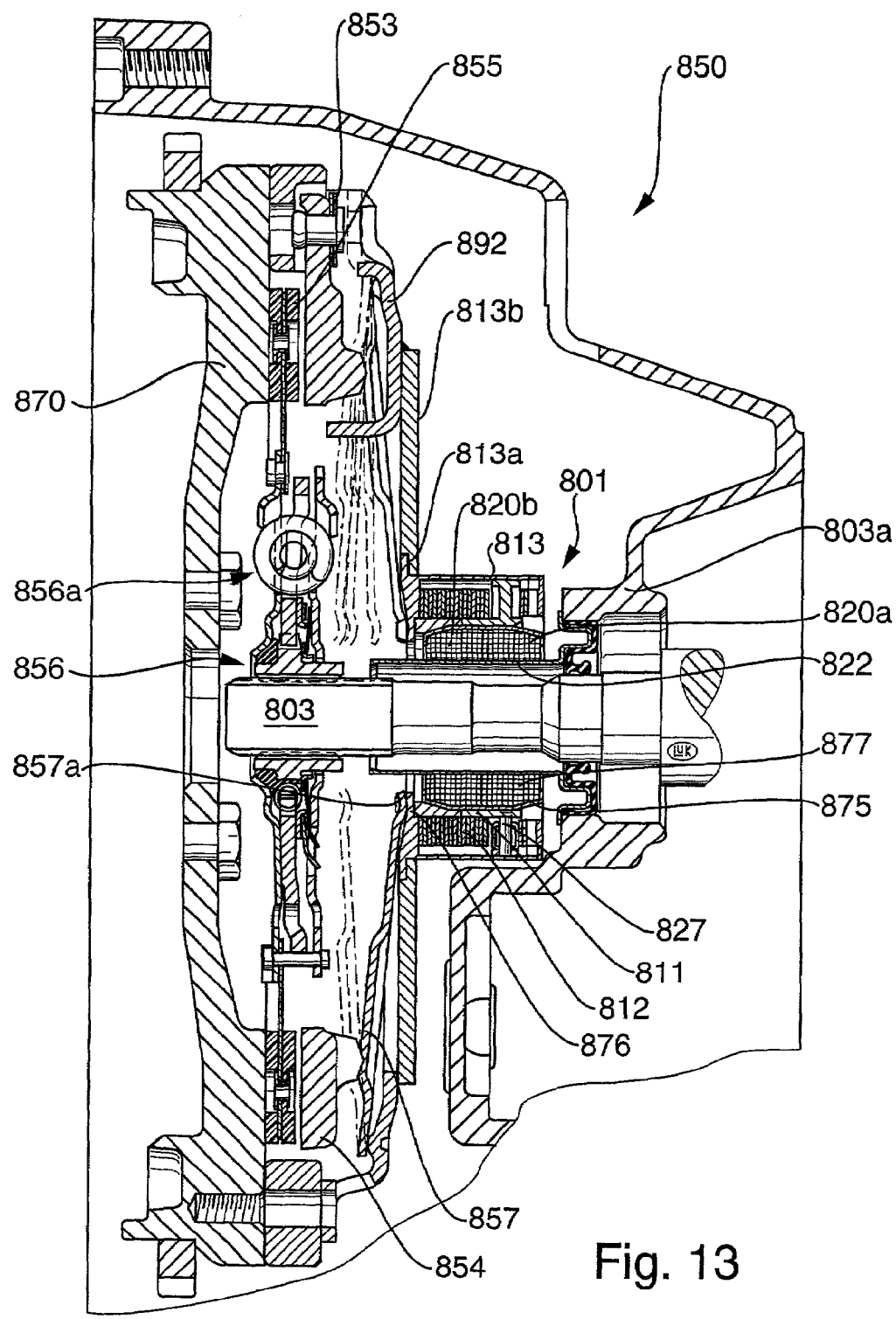
FIG. 13 is an axial sectional view of a friction clutch and of an apparatus embodying the invention and serving as a means for engaging and disengaging the clutch.

FIG. 13 shows certain component parts of a friction clutch 850 which is combined with or embodies an apparatus 801. The arrangement is such that the clutch 850 imparts angular movements to certain elements of the apparatus 801 which latter is integrated into the clutch. The rotary part 813 of the apparatus 801 carries a coil spring 812 and is connected with the housing or cover 892 of the clutch 850 by a friction-operated torque transmitting device 813a (e.g., a friction clutch) at the inner end of a radial wall 813b welded or otherwise non-rotatably secured to the housing 892. It is also possible to make the wall 813b of one piece with the housing, 892 of the clutch 850 and/or with the part 813 of the apparatus 801.

The diaphragm spring 857 and/or the housing 892 of the clutch 850 can be designed in such a way that the apparatus 801 is located within the confines of the housing 892 (as seen in the direction of the common axis of the clutch and the apparatus 801). Such incorporation of the apparatus 801 into the clutch 850 results in the provision of a composite module the space requirements of which in the axial direction of the clutch are well below those of a combination of the type shown in FIG. 15; moreover, the composite module can be transported, stored, installed in or removed from a power train and/or otherwise manipulated with greater ease than two discrete units one of which constitutes a clutch and the other of which constitutes a clutch engaging/disengaging apparatus.

The wall 813b can be in axially prestressed condition in order to more accurately establish or define the extent of frictional engagement between the constituents of the friction clutch 813a. The torque which the friction clutch 850 can transmit exceeds the friction coefficient of the apparatus 801. The housing 822 of the apparatus 801 and the part 813 can be non-rotatably coupled to each other by means of an electromagnet 820a; the latter is non-rotatably but axially movably mounted on the housing 822. When energized, the electromagnet 820a establishes a frictional engagement between the part 813 and the housing 822 by way of a preferably conical friction surface 875.

The part 811 of the apparatus 801 carries the follower assembly 827 and cooperates with a friction disc 876 to constitute or to act as a friction torque regulated or controlled means for biasing the diaphragm spring 857 axially by way of the tongues or prongs 857a. The part 811 is further provided with a preferably conical friction generating connection 877 serving to establish frictional engagement with the case 803a of the transmission upon energization and the resulting axial displacement of an electromagnet 820b. The latter is non-rotatably coupled to the housing 822 by an axial toothing or gearing, not shown.

The clutch 850 is a push-type clutch which is disengaged when the axially movable part 811 of apparatus 801 is retracted, i.e., when such part assumes the axial position shown in FIG. 13. The friction linings 855 of the clutch disc 856 cannot transmit torque from the engine (not shown) to the input shaft 803 of the transmission because the counterpressure plate (one-piece flywheel) 870 and the pressure plate 854 are free to rotate relative to the clutch disc 856 (which is affixed to the transmission shaft 803). The output element (such as a crankshaft) of the engine transmits torque to the one-piece flywheel 870 of the clutch 850. The one-piece flywheel 870 can be replaced with a composite flywheel, e.g., a flywheel corresponding to the flywheel 770 shown in FIG. 15. The clutch disc 856 which includes the aforementioned friction linings 855 further comprises a damper 856a interposed between a radially outer section including the friction linings 855 and a radially inner section including a hub non-rotatably mounted on the input shaft 803 of the change-speed transmission.

When the part 811 of the apparatus 801 is caused to move axially toward the flywheel 870, the free radially inner end portions of the tongues or prongs 857a of the diaphragm spring 857 are moved to the left, as viewed in FIG. 13, and the annular radially outer or main portion of the diaphragm spring 857 increases the axial bias upon the projections of the pressure plate 854 so that the latter cannot be pulled axially and away from the axially fixed counterpressure plate (i.e., the aforementioned flywheel) 870. The means for urging the pressure plate 854 axially and away from the friction linings 855 and flywheel 870 comprises several leaf springs 853 (only one can be seen in FIG. 13) which couple the pressure plate to the housing 892 of the clutch 850.

The clutch 850 is engaged when the diaphragm spring 857 is caused to bias the pressure plate 854 against the adjacent friction linings 855, i.e., when the apparatus 801 shifts the part 811 axially toward the counterpressure plate 870.

The damper 856a constitutes a desirable but optional feature of the clutch disc 856; such damper is or can be omitted if the one-piece flywheel or counterpressure plate 870 is replaced with a composite flywheel which embodies a torsional vibration damper, e.g., with a composite flywheel of the type shown (at 770) in FIG. 15.

The operation of the assembly including the apparatus 801 and the friction clutch 850 is as follows:

When the clutch 850 is disengaged and the engine of the motor vehicle is running to rotate (among other parts) the housing 892, the parts 811, 813 rotate at the same speed. In order to engage the clutch 850, the electromagnet 820a is energized and-thus arrests the part 813 as a result of the establishment of frictional engagement at 875, i.e., the part 813 can no longer rotate relative to the transmission case 803a or rotates at a speed different from the RPM of the part 811. In other words, the part 811 rotates relative to the part 813 with the result that the part 811 is caused to move axially toward the counterpressure plate 870 and that the prongs 857a cause the radially outer portion of the diaphragm spring 857 to bias the pressure plate 854 axially against the adjacent friction linings 855 of the clutch disc 856. The radially outermost portion of the diaphragm spring 857 is pivotally mounted at the inner side of the housing or cover 892 of the clutch 850; this is in contrast to the mounting of the diaphragm spring 757 which includes a radially outermost portion arranged to bear upon the pressure plate 754 and a second portion pivotable (at 793) relative to the clutch housing 792.

When the clutch 850 of FIG. 13 is fully engaged, the condition (extent of energization) of the electromagnet 820a can be regulated (by adjusting the flow of electric current in response to signals from one or more sensors serving to monitor the extent of axial movement of a part of the transmission 850 and/or apparatus 801, the magnitude of transmitted torque and/or the RPM of a rotary component). For example, the current consumption of the electromagnet 820a can be maintained at a constant value or can be caused to assume a specific value which is required to ensure that the part 811 assumes an axial position in which the clutch 850 is set to transmit a preselected torque, namely a torque which is necessary during a particular stage of operation of the motor vehicle embodying the friction clutch 850 of FIG. 13, the engine which drives the flywheel 870 and the transmission including the input shaft 803 and the transmission case 803a.

The force which is required to engage the clutch 850 is proportional to the ratio of the apparatus; for example, the engaging force can amount to about 100N if the disengaging force is in the range of 1000N.

If the clutch 850 of FIG. 13 is to be disengaged, the electromagnet 820b is energized to establish a frictional engagement at the friction surface 877 of the part 811. This again entails the establishment of a difference between the RPM of the part 811 and that of the part 813. However, the difference between the two RPMs is in a direction counter to that which is required to engage the clutch 850. This means that, in the embodiment of FIG. 13, the RPM of the part 811 exceeds that of the part 813 with the result that the part 811 is retracted away from the counterpressure plate 870 and the clutch 850 is disengaged in that the prongs 857a no longer urge the median portion of the diaphragm spring 857 to bear upon the projections of the pressure plate 854.

It is often advisable to affix the radially inner portions (free ends) of the prongs 857a to the axially movable part 811 of the apparatus 801, especially if the part 811 serves as a constituent of or as a means for initiating operation of an automatic adjusting means serving to compensate for wear at least upon the friction linings 855 of the clutch 850. For example, if the part 811 is attached to the prongs 857a, the part 811 can pivot the diaphragm spring 857 against an axially fixed abutment (e.g., against the clutch housing 892) which is indicative of the operating point of the clutch. A force sensor or a distance sensor can be employed to ascertain the presence or absence of a clearance between the diaphragm spring 857 and the pressure plate 854 while the part 811 is retracted; an annular adjusting member (corresponding to the adjusting member 793 shown in FIG. 15) is then induced to perform an angular movement which results in an axial adjustment of the diaphragm spring 857 relative to the housing 892 and relative to the pressure plate 854 to thus compensate for wear upon the friction linings 855. The annular adjusting member can cooperate with one or more springs, which tend to turn the member relative to the housing 892, and with suitable ramps in a manner as outlined in the description of FIG. 15 and as described and shown in U.S. '934 patent to Maucher. The sensor or sensors which monitors or monitor the presence or absence of the aforementioned clearance must ascertain the extent of axial displacement of the pressure plate to the operating point (full engagement of the clutch 850) and/or the spring factor of the biasing means forming part of the clutch disc 856 and bearing upon the friction linings 855 and/or the factor of the leaf springs 853.

The apparatus 801 of FIG. 13 can be modified (e.g., simplified) in a number of ways. For example, the two discrete electromagnets 820a, 820b can be replaced with a single electromagnet having portions provided with the friction surfaces 875 and 877. However, the utilization of two discrete electromagnets 820a, 820b brings about the advantage that the exact axial position of the part 811 can be selected, varied and/or maintained with a higher degree of accuracy and reproducibility. For example, the utilization of two discrete electromagnets (or analogous motors) renders it possible to retract the part 811 to a desired extent by energizing the two motors simultaneously, individually or alternatively.

Figure 14:
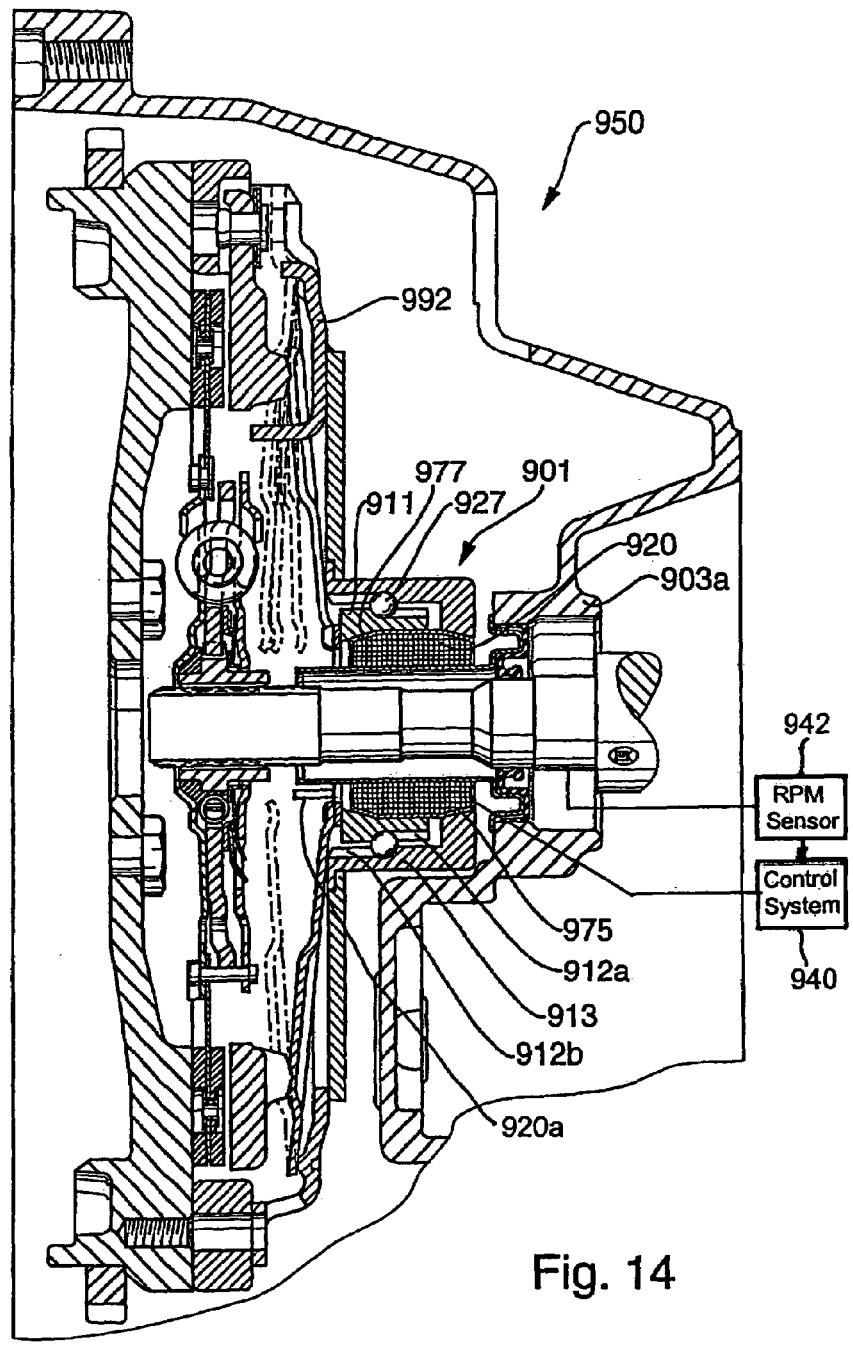
FIG. 14 is a similar axial sectional view of the clutch which is shown in FIG. 13 and of a clutch engaging/disengaging apparatus constituting a modification of the apparatus shown in FIG. 13.

Referring to FIG. 14, there is shown a friction clutch 950 which constitutes a modification of the aforedescribed clutch 850 of FIG. 13. The apparatus 901 employs a single motor 920, namely an electromagnet which is movable axially of the clutch and is non-rotatably affixed to the case 903a of the transmission. This electromagnet can cause a first conical friction surface 975 to engage the part 913 or a second conical surface 977 to engage the part 911.

As noted earlier herein (see paragraph [0066]), relative axial movement of components can be effected by resorting to at least one electromagnet and/or to at least one fluid-operated (i.e., hydraulic or pneumatic) slave cylinder. Thus, instead of electrically-operated electromagnet 920, conical friction surfaces 975, 977 can be shifted axially by a fluid-operated slave cylinder 920a.

The apparatus 901 is a modification of the apparatus 1 of FIGS. 1 and 4–5, of an apparatus including the spindle 210 of FIGS. 6–7, of an apparatus including the spindle 410 of FIG. 8, of an apparatus including the spindle 510 of FIGS. 9–11a, or an apparatus including the spindle 610 of FIG. 12. As shown in FIG. 14, the apparatus 901 comprises at least two circumferentially spaced apart bayonet-shaped ramps 912a each of which includes a radially extending and an axially extending section, and complementary ramps 912b on the part 911. The ramps 912a, 912b of each pair of ramps abut discrete roller followers 927.

When the friction upon the parts 911, 913 of the apparatus 901 is the same, the apparatus is idle. However, if the electromagnet 920 is energized to engage the friction surface 975 with the housing or case 903a, the speed of the part 913 is reduced and the rotating clutch cover or housing 992 causes the parts 911, 913 to turn relative to each other whereby the ramps 912a, 912b also move relative to each other due to the presence of the follower assembly including the spherical rolling elements 927. The axial sections of the ramps 912a, 912b effect an axial displacement of the part 911 which engages the clutch 950. If this clutch is to be disengaged, the part 911 is braked because it is engaged by the friction surface 977.

Figure 16:
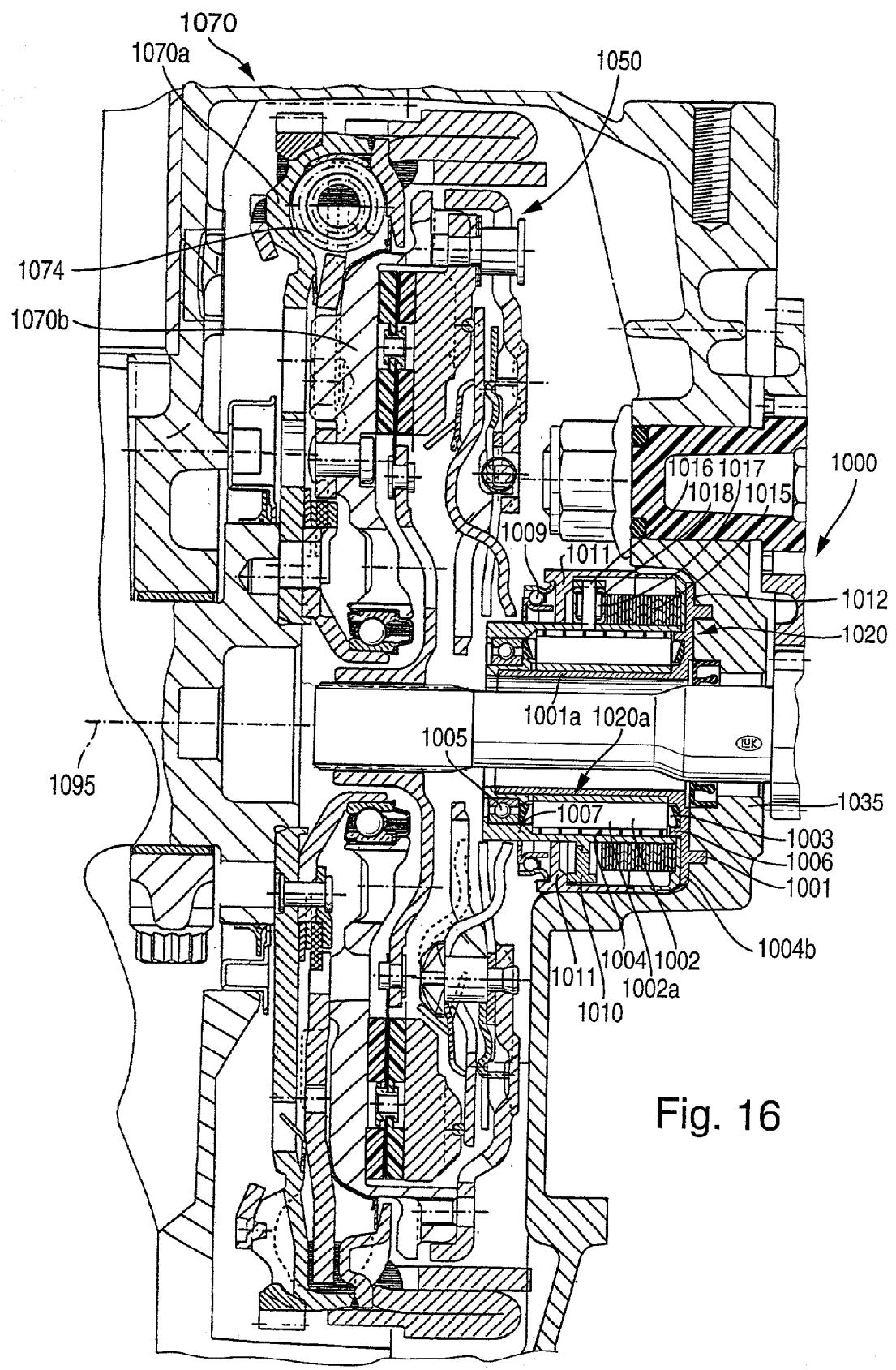
FIG. 16 is a sectional view similar to that of FIG. 15 but showing a modified flywheel, a modified friction clutch and a modified clutch engaging/disengaging apparatus.

FIG. 16 shows a composite flywheel 1070 which includes a primary flywheel or mass 1070a, a secondary flywheel or mass 1070b, and a damper 1074 in an annular chamber of the mass 1070a. The coil springs (only one shown) of the damper 1074 oppose angular movements of the masses 1070a, 1070b relative to each other. The composite flywheel 1070 (and more specifically the mass 1070b) carries a friction clutch 1050 which can be actuated by an apparatus 1000. In many respects, the clutch 1050 and the actuating means therefor are similar to or identical with the clutch 750 and the apparatus 701 of FIG. 15 and, therefore, are denoted (in most instances) by similar reference characters plus 300. The following description will deal primarily with those features of the structure shown in FIG. 16 which are different from and/or are provided in addition to the corresponding features of the structure of FIG. 15.

As noted earlier herein (see paragraph [0066]), relative axial movement of components can be effected by resorting to at least one electromagnet and/or to at least one fluid-operated (i.e., hydraulic or pneumatic) slave cylinder. Thus, instead of electrically-operated electromagnet 920, conical friction surfaces 975, 977 can be shifted axially by a fluid-operated slave cylinder 920a.

Also shown in FIG. 14 is a control system 940 for operating the clutch. Control system 940 receives a signal from a sensor, such as RPM sensor 942, and can, in turn, send a suitable signal to electromagnet 920 to appropriately energize the electromagnet to shift one of friction surfaces 975 or 977 for frictional engagement with respective parts 913 and 911.

The motor 1020 of the structure shown in FIG. 16 comprises an electric driving unit 1020a which constitutes a multiple-pole external rotor motor and includes a stator 1002 which is non-rotatably affixed to (e.g., a press fit on) a flange-like carrier 1001 having a sleeve-like extension 1001a. The carrier 1001 is mounted on a bell-shaped transmission case or housing 1035.

The windings 1003 of the motor 1020a are disposed within and/or externally of a package 1002a of sheet metal laminations and form an annular array. These windings can be designed and arranged in such a way that they establish between themselves a sufficient amount of space for the provision of Hall generators and/or other types of sensors. The purpose of such sensors is to ascertain the number of revolutions, the direction of rotation and/or the angular position(s) of the rotor 1004 relative to the stator 1002. The rotor 1004 surrounds the stator 1002 and preferably comprises permanent magnets, such as rare earth magnets. It is advisable to make the magnets of a material which can stand elevated temperatures and exhibits a pronounced power density. For example, the permanent magnets should stand temperatures in the range of between not less than 200° C. and at least 350° C. It is presently preferred to assemble the magnets of discrete laminations which are secured directly to the rotor casing 1007, e.g., by resorting to a suitable adhesive. Alternatively, one can employ a sintered ring which is magnetized upon completion of the shaping operation; an advantage of such sintered ring is that it can be produced and installed at a fraction of the cost involving the making and installation of numerous discrete laminations.

The rotor 1004 is mounted on the stator 1002 by way of an antifriction bearing 1005 here shown as a bearing employing spherical rolling elements arranged to travel in grooves provided in the inner and/or outer races. The casing 1007 of the rotor 1004 is mounted directly on the outer race of the bearing 1005. In order to ensure accurate centering of the stator 1002 and of the rotor 1004 relative to each other, the apparatus including the motor 1020 preferably further comprises at least one additional antifriction bearing for the rotor. FIG. 16 shows a second bearing 1006 which is spaced apart from the bearing 1005 in the direction of the axis 1095 of the clutch 1050 and can constitute a friction bearing (to achieve savings in initial cost) or an antifriction bearing (such as a needle bearing or a ball bearing). The bearings 1005, 1006 ensure that the radial clearance between the stator 1002 and the rotor 1004 remains within a predetermined range, i.e., that such clearance does not exceed a certain upper limit.

The bearings 1005, 1006 can perform the additional function of serving as a means for preventing penetration of dust and/or other impurities or contaminants between the exterior of the stator 1002 and the interior of the rotor 1004. In order to further reduce the likelihood of penetration of contaminants between the stator 1002 and the rotor 1004, at least one of the bearings 1005, 1006 can be provided with one or more sealing rings (not specifically shown) which intercept eventual impurities prior to penetration of such impurities into the space directly surrounding the stator 1002 between the bearings 1005 and 1006.

An elastic helix 1015 is received in a ring-shaped recess or pocket which is defined by the parts 1011 and 1012 of the apparatus serving to engage and disengage the friction clutch 1050. The bottom part of the recess or pocket (as seen in the direction of the axis 1095) preferably exhibits an axial slope which corresponds to that of the helix 1015. The parts 1011 and 1012 can resiliently or non-yieldably bear against each other, or they can bear upon engaging means 1004*b* with the interposition of the elastic helix 1015. The axial spacing of the parts 1011 and 1012 relative to each other can be selected in such a way that the helix 1015 is confined between them practically without play or without any appreciable play. It is advisable to prevent or to compensate for wear upon the helix 1015 and/or upon the members 1016, 1017 and 1018. The arrangement can be such that the parts 1011, 1012 are yieldably urged against each other in the axial direction to an extent and/or with a force which is necessary to at least prevent any turning play of the axial motor 1020 or to at least oppose the development of such play. This can be of particular advantage if the angular and/or axial movements of the motor 1020 are controlled, regulated and/or guided by resorting to sensors, especially incremental distance monitoring sensors.

Figure 18:
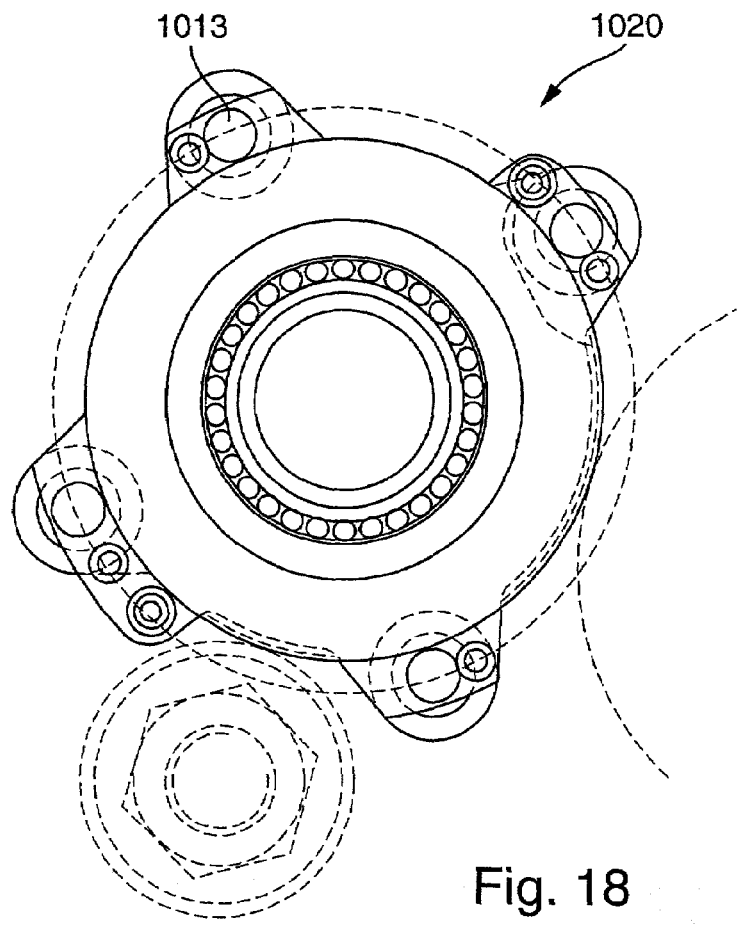
FIG. 18 is an end elevational view as seen in the direction of arrow XVIII shown in FIG. 17.

Additional details of the structure shown in the right-hand portion of FIG. 16 are illustrated in FIGS. 17 and 18. The sectional view of FIG. 18 is taken in a plane which is inclined relative to the plane of the section shown in FIG. 16.

The inclined surfaces or ramps or slopes 1011*a* and 1012*a* of FIG. 17 ensure that the ends of the elastic helix or band 1015 invariably assume the required positions, not only during assembly but also in actual use of the clutch 1050. The helix 1015 is tensioned by tensioning means in the form of countersunk screws 1020*a*. Such tensioning ensures that the parts 1011 and 1012 are biased axially against each other, i.e., that the helix 1015 is maintained in a predetermined position relative to the parts 1011 and 1012. The ramps 1011*a* and 1012*a* further serve to guide (such as support) the needle bearings 1017 and/or the bearing troughs 1018 when the clutch disengaging means resp. the axial drive is operated in the range of the last convolution of the helix 1015.

A ring 1010 is non-rotatably secured to the rotor 1004; to this end, the ring 1010 can be shrunk onto the rotor or, alternatively, it can be secured to the rotor by caulking or by welding. The axially enlarged or expanded outer part of a ring 1004*a* serves as an axial stop for the parts 1010 and 1011. Axial movements of the motor 1020 are limited due to the fact that portions of the parts 1011, 1012 abut the ring 1010.

FIGS. 17 and 18 show that the parts 1011 and 1012 are held against rotation as well as against axial movement relative to the carrier 1001 by pin-shaped guide means 1013 and by tracks 1014 for such guide means. The pin-shaped guide means 1013 are parallel to the axis 1095 and are secured to the carrier 1001. The tracks 1014 are carried by at least one of the parts 1011, 1012.

FIG. 16 further shows a clutch disengaging bearing 1009 which is carried by the part 1011 and is secured thereto by a split ring or the like. The bearing 1009 is preferably of the type known as self-centering bearing.

In order to ensure automatic resetting of the motor 1020 when the latter ceases to transmit torque, it is advisable to (additionally) mount the entire support (including the carrier 1001 and the guide means therefor) in such a way that this support is turnable about the axis 1095. The actuating torque (supporting moment) which is being furnished by the motor 1020 can be taken up (counteracted) by an energy storing device in the form of, for example, a coil spring. Such coil spring can be installed to operate between the carrier 1001 and a non-rotary member such as the bell 1035 or the case of the transmission receiving torque from the clutch 1050. The energy being stored by such spring is utilized to reset the motor 1020.

Further features and advantages of the structure shown in FIGS. 16 to 18 will be appreciated upon perusal of the description of embodiments which are shown in FIGS. 1 to 15 of the drawings.

Figure 19:
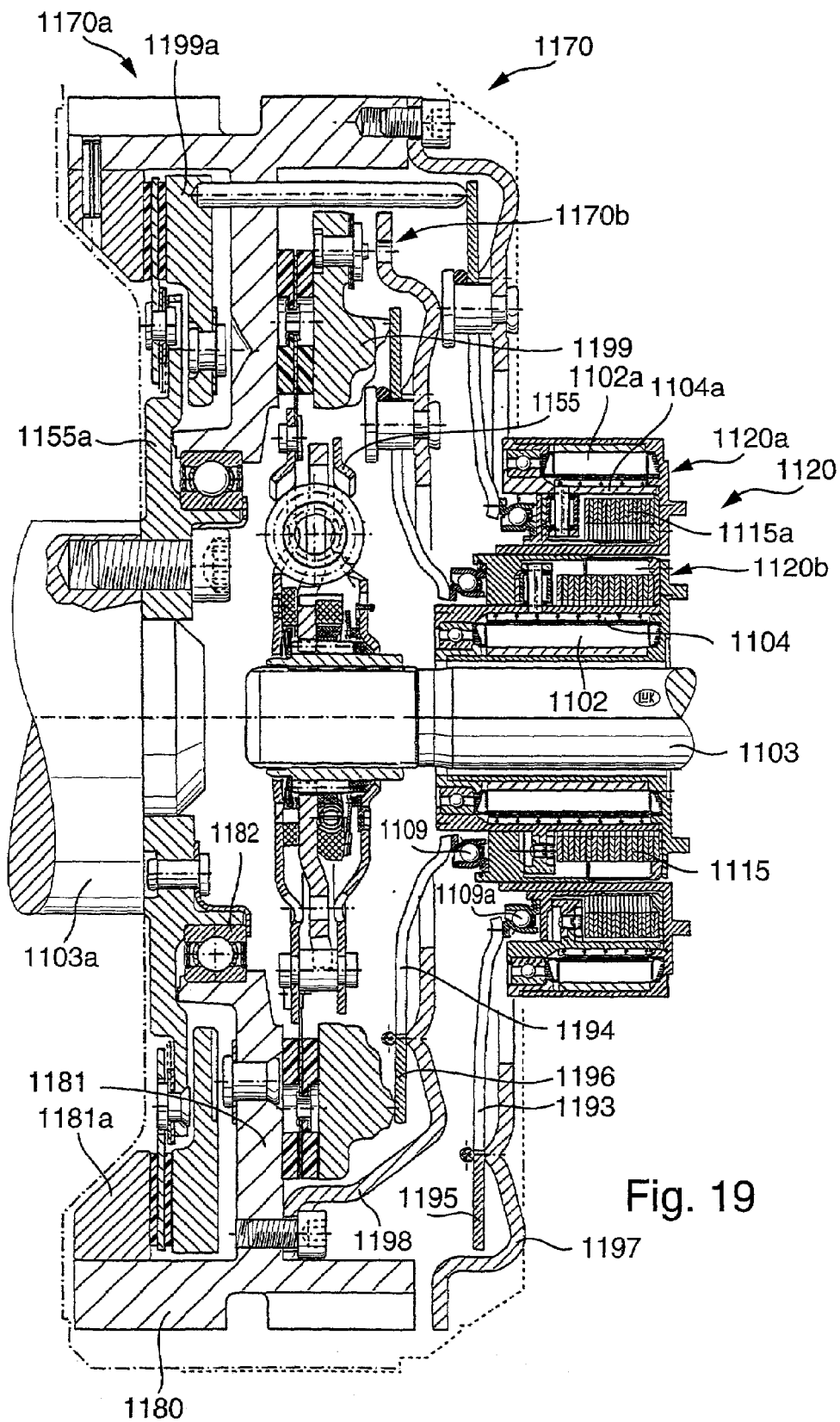
FIG. 19 is an axial sectional view of a composite clutch and of an apparatus embodying another form of the present invention and serving to actuate the constituents of the composite clutch.

FIG. 19 illustrates a composite friction clutch 1170 which includes a first friction clutch 1170*a* and a second friction clutch 1170*b*. The first clutch 1170*a* comprises a clutch disc or clutch plate 1155*a* which is attached directly to the output shaft 1103*a* of a combustion engine or another prime mover. The other or second friction clutch 1170*b* comprises a clutch disc or clutch plate 1155 which can transmit torque to the input shaft 1103 of a change-speed transmission.

The clutch disc 1155 comprises a main damper or primary damper and a so-called idling damper. The clutches 1170*a*, 1170*b* further comprise actuating means 1193 and 1194; the actuating means 1193 comprises radially inwardly extending tongues or prongs forming part of a first diaphragm spring 1195, and the actuating means 1194 comprises radially inwardly extending tongues or prongs forming part of a second diaphragm spring 1196. The diaphragm spring 1195 is tiltable in a first clutch housing or cover 1197, and the diaphragm spring 1196 is tiltable in a second clutch housing or cover 1198. The radially outer portion of the diaphragm spring 1195 normally bears upon an axially movable pressure plate 1199*a* by way of axially parallel posts anchored in the pressure plate 1199*a*, and the radially outer portion of the diaphragm spring 1196 bears directly upon an axially movable pressure plate 1199 of the clutch 1170*b*.

The reference character 1180 denotes a flywheel or mass which includes a counterpressure plate 1181*a* forming part of the clutch 1170*a*, and a counterpressure plate 1181 forming part of the clutch 1170*b*. The mass 1180 is rotatable, on a bearing 1182, relative to the output shaft 1103*a* of the prime mover when the clutch 1170*a* is disengaged. When the clutch 1170*b* is disengaged, the mass 1180 can rotate relative to the input shaft 1103 of the transmission. Thus, if the clutch 1170*a* is disengaged simultaneously with the clutch 1170*b*, the mass 1180 is free to turn relative to the shafts 1103 and 1103*a*. The mass 1180 can form part of a so-called starter generator machine; more specifically, the mass 1180 can form part of the rotor of such machine. The starter generator machine can further serve as a substitute for the engine or as a constituent of a composite prime mover composed of an engine and a starter generator machine. Still further, it is possible to employ the aforementioned starter generator machine as the sole prime mover and to employ a separate starter in addition to such machine. Starter generator machines of the just outlined character are disclosed, for example, in German patents Nos. 198 38 853 A1, 198 01 972 A1, 197 45 995 A1 and 197 18 480 A1.

The clutches 1170*a* and 1170*b* can be engaged and disengaged by an actuating apparatus 1120. This apparatus comprises two actuators 1120*a* and 1120*b* which are mounted on a transmission housing or case in a manner analogous to that described with reference to the motor 1020 for the friction clutch 1050 shown in FIG. 16. The electric driving unit 1020*a* of FIG. 16 can be said to constitute a functional equivalent of the actuator 1120*b* and its construction is practically identical with that of the actuator 1120*b*. The actuator 1120*a* is similar to the actuator 1020*a* and/or 1120*b*.

The actuator 1120*b* is coaxial with and is surrounded by the actuator 1120*a*. Actually, the actuators 1120*a*, 1120*b* are interfitted, i.e., the actuator 1120*b* can be said to be encapsulated within the actuator 1120*a*. The arrangement is such that the right-hand axial ends of the actuators 1120*a*, 1120*b* (i.e., the ends nearer to the non-illustrated transmission) are at least substantially coplanar. However, it is equally possible to assemble the actuators 1120*a*, 1120*b* in such a way that one thereof extends axially beyond the other actuator.

FIG. 19 further shows that the electrical components (including the stator 1102 and the rotor 1104) of the actuator 1120*b* are disposed radially inwardly of the helix (coil spring) 1115 which latter is part of the mechanical drives The mutual positions of component parts of the actuator 1120*a* (as seen in the radial direction) are different, i.e., the rotor 1104*a* and the stator 1102*a* (which latter surrounds the rotor) are disposed radially outwardly of the helix 1115*a*. However, it is also possible to employ an actuator (in lieu of the actuator 1120*a*) which is assembled in the same way as the actuator 1120*b* (as seen radially of the actuating apparatus 1120).

Still further, the apparatus 1120 can be constructed and assembled in such a way that the mechanical axial drives including the helices 1115 and 1115*a* for the disengaging bearings 1109 and 1109*a* flank (i.e., receive between them) the necessary electrical parts including the stator and rotor elements of the electric drive means (as seen in the radial direction). For example, the helices 1115, 1115*a* can have diameters differing from each other to such an extent that they define between themselves an annular space or compartment for a single (common) stator, for a first annular rotor which surrounds the single common stator, and for a second annular rotor which is surrounded by the single common stator. By properly selecting the electric circuitry for such actuators, one can drive a selected one of the two rotors or both rotors simultaneously.

If necessary, the just described actuating apparatus 1120 can further comprise suitable brakes which can be actuated to selectively vary the speeds of and/or to arrest the two rotors. If such brakes are provided, they preferably constitute electromagnetic or electromagnetically operated brakes.

Figure 20:
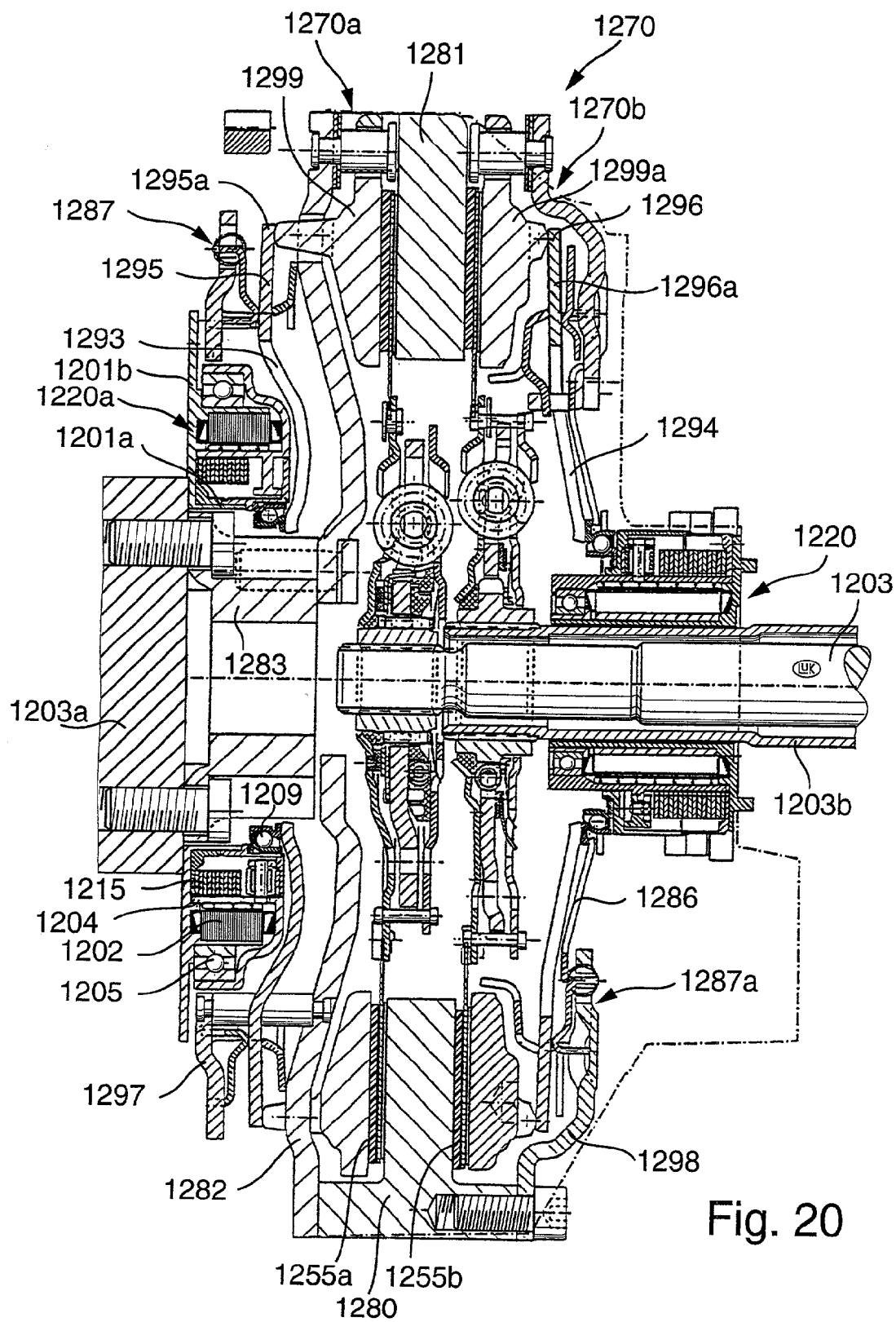
FIG. 20 is a sectional view similar to that of FIG. 19 but showing a modified composite friction clutch and a modified clutch engaging/disengaging apparatus.

FIG. 20 shows a composite friction clutch 1270 which is a so-called dual clutch and can be utilized in conjunction with (a) a manual transmission, (b) a transmission associated with a power takeoff, or (c) a power takeoff. The composite clutch 1270 comprises two independently actuatable clutches 1270*a*, 1270*b* having discrete clutch discs 1255*a*, 1255*b*. These clutch discs are drivingly connected, by way of hubs, with the shafts 1203, 1203*b*, respectively. The shaft 1203*b* is hollow and surrounds the shaft 1203 and receives torque from or forms part of the prime mover.

The clutches 1270*a*, 1270*b* further respectively comprise energy storing devices in the form of diaphragm springs 1295, 1296 pivotably mounted on the respective clutch covers or housings 1297, 1298. The diaphragm springs 1295, 1296 respectively comprise circumferentially complete radially outer energy storing portions or main portions 1295*a*, 1296*a* and radially inwardly extending tongues or prongs 1293, 1294. The radially outer portions 1295*a*, 1296*a* respectively bear upon axially movable pressure plates 1299, 1299*a* which also form part of the clutches 1270*a*, 1270*b*, respectively. The two clutches have a common counterpressure plate 1281 which forms part of an inertia member or mass 1280. This mass 1280 is mounted on a plate-like carrier 1282 which is connected to and can be driven by the output shaft 1203*a*.

The dual clutch 1270 is assembled in a space-saving manner in that the common counterpressure plate 1281 is installed between the clutch discs 1255*a*, 1255*b* of the two discrete clutches 1270*a*, 1270*b*.

The clutch 1270*b* can be engaged or disengaged by an actuator 1220 in a manner similar to that already described with reference to the structure shown in FIG. 16. Reference should be had to the description pertaining to the actuator 1020.

The clutch 1270*a* is located between the prime mover (which includes the output shaft 1203*a*) and the clutch 1270*b*. The clutch 1270*a* can be engaged and disengaged by an actuator 1220*a*. The construction and mode of operation of the actuator 1220*a* are similar or analogous to those of several previously described actuators (reference may be had to the description of the structure shown in FIG. 16, 17, 18 and/or 19). FIG. 20 shows the helix 1215, the stator 1202, the rotor 1204 and bearing 1205 which latter operates between the stator and the rotor, and the clutch disengaging bearing 1209. The disengaging means (actuator 1220*a*) is mounted to surround a tubular distancing element 1283 which is installed between the plate-like carrier 1282 and the output shaft 1203*a* of the prime mover (engine). The rotor 1204 is installed within the stator 1202, i.e., the actuator 1220*a* employs an electric motor of the type known as internal or inside rotor motor.

The axially movable parts including the disengaging bearing 1209 are guided by a tubular member 1201*a* provided on a support 1201*b*.

The friction clutch 1270*b* is further provided with a force compensating unit which serves to optimize the progress of force being applied to actuate this friction clutch. This renders it possible to maintain the maximum force which must be furnished by the actuator 1220 at a relatively low value. In the embodiment of FIG. 20, such force compensating unit employs a compensating spring 1286. As concerns the nature and mode of operation of such springs, reference should be had, for example, to German patent No. 195 10 905 A1.

The clutches 1270*a* and 1270*b* are further respectively equipped with means 1287 and 1287*a* for compensating for wear upon the friction linings of the clutch discs 1255*a*, 1255b. As concerns the construction and mode of operation of such wear compensating means, attention is invited to the aforesaid U.S. Pat. No. 5,450,934 granted Sep. 19, 1995 to Paul Maucher for "FRICTION CLUTCH".

Figure 21:
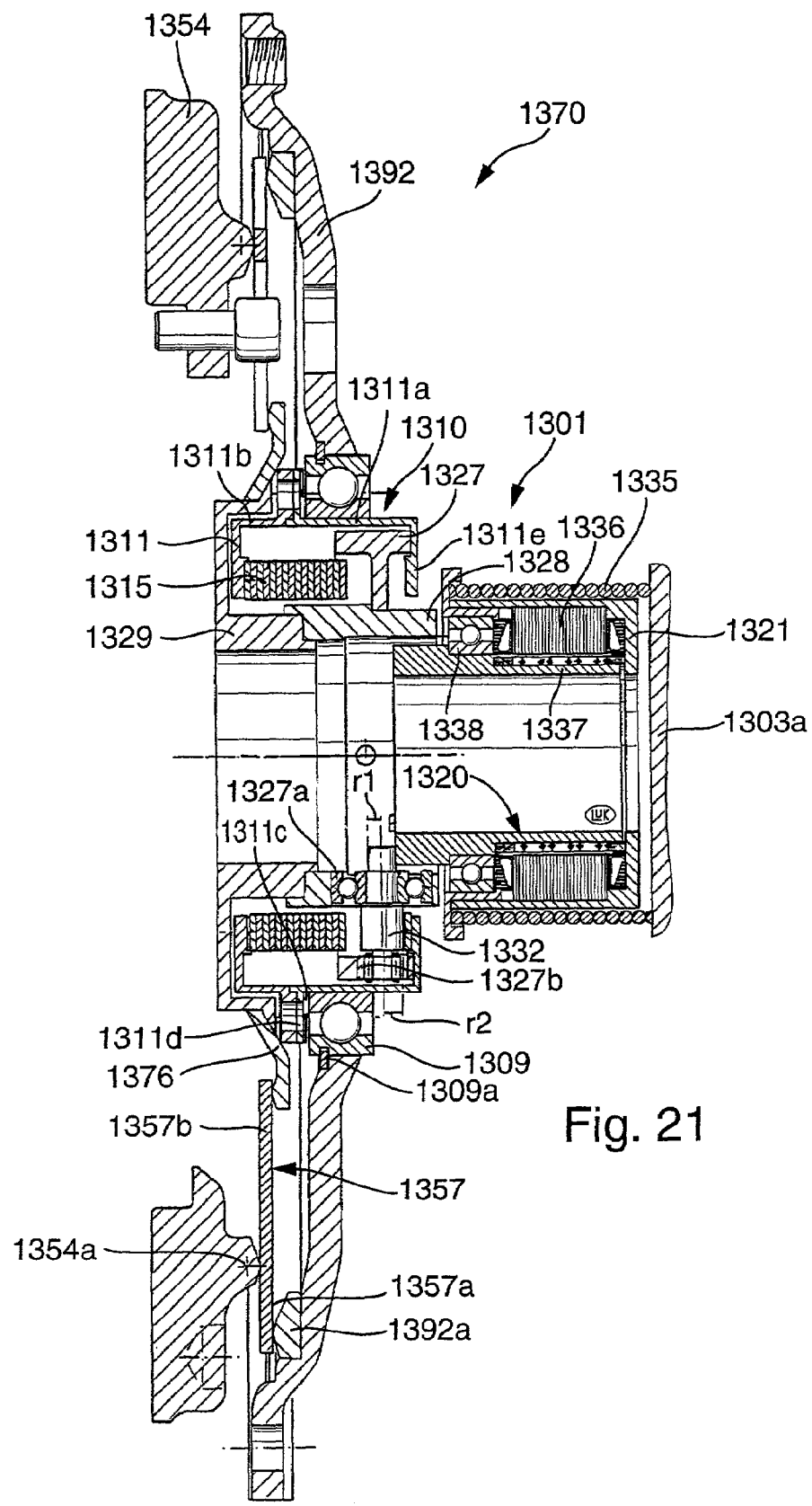
FIG. 21 is a fragmentary axial sectional view of still another friction clutch and of the associated clutch engaging/disengaging apparatus.

Referring to FIG. 21, there is shown a portion of a clutch 1370 with a clutch engaging/disengaging unit 13a1 integrated into the clutch cover or housing 1392. The unit 1301 employs a pressure transmitting ring 1376 adapted to move axially a one-armed energy-storing lever 1357 (shown in FIG. 21 in the form of a diaphragm spring) so that the latter can bear upon an axially movable pressure plate 1354. This pressure plate is non-rotatably but axially movably connected to the clutch cover 1392 by leaf springs (not shown). The leaf springs further serve to center the pressure plate 1354 relative to the diaphragm spring 1357 and the clutch cover 1392. The latter is driven to rotate with the output element (not shown) of the prime mover, such as a combustion engine (not shown). It is also possible to axially movably couple the pressure plate 1354 to another engine-driven part, i.e., to a part other than the cover 1392.

The structure of FIG. 21 can be utilized, for example, in lieu of the friction clutch 750 shown in FIG. 15. More specifically, certain parts of the clutch 1370 can be utilized to replace the pressure plate 754, the housing 792, the diaphragm spring 757 and the electric motor 720 of the clutch 750. It is further clear that the structure shown in FIG. 21 can also be put to use in clutches which employ rigid or flexible flywheels ;and/or in twin-mass (composite flywheel) clutches.

The diaphragm spring 1357 can be replaced with a rigid one-armed lever. The radially outer portion 1357a of this diaphragm spring bears upon a ring-shaped seat 1392a which is installed in the clutch cover 1392. The pressure plate 1354 is contacted by an annular median portion of the member 1357; to this end, the pressure plate 1354 carries an annulus of projections 1354a which are located radially inwardly of the seat 1392a. The radially innermost portion 1357b of the member 1357 is contacted by the aforementioned pressure transmitting ring 1376 which forms part of the clutch engaging/disengaging unit 1301. The projections 1354a can be replaced with a circumferentially complete annular member on the pressure plate 1354.

The pressure plate 1354 is located to the right of a clutch disc or clutch plate (not shown) corresponding to the clutch disc 756 of FIG. 15 and serving to transmit torque to the input shaft of a change-speed transmission (not shown in FIG. 21). Such transmission receives torque from the output shaft (703a) of a prime mover when the clutch 1370 is at least partially engaged so that the pressure plate 1354 cooperates with the counterpressure plate to rotate the clutch disc with or without slip.

The clutch 1370 is a push type clutch. However, the unit 1301 can be utilized with equal advantage in pull type clutches; all that is necessary is to change the nature of the operative connection between the unit 1301 and the member 1357 or an equivalent thereof.

An advantage of the push type clutch 1370 is that the self-locking device 1310 enables the ring 1376 to maintain the clutch in any desired condition in which the clutch 1370 drives the input shaft of the transmission at the exact speed of the output shaft of the engine or another prime mover, or at any desired fraction of such speed.

FIG. 21 further shows that the self-locking device 1310 of the clutch engaging/disengaging unit 1301 is axially separated from the motor 1320 for the purpose of achieving savings in space. This renders it possible to reduce the space requirements of the clutch 1370 in the radial direction. The housing or casing 1311 of the self-locking axial drive 1310 is rotatable relative to the clutch cover 1392 due to the provision of a roller bearing 1309 which is surrounded by the cover 1392. A split ring 1309a is provided to maintain the bearing 1309 in a selected axial position relative to the cover 1392.

The housing 1311 engages an abutment or stop 1311c which is adjacent the bearing 1309 to thus remain in the illustrated axial position; this housing comprises two sections 1311a, 1311b which are secured to each other by fastener means 1311d.

The helix 1315 has convolutions which form two packages of closely adjacent or abutting convolutions; the end convoutions of this helix are affixed to the housing sections 1311a, 1311b. The follower means or tracking device comprises several (e.g., three circumferentially spaced apart) pin-shaped discrete followers 1332 rotatably mounted in bearings 1327a, 1327b installed in a holder or carrier 1327 having a T-shaped cross-sectional outline. The bearings 1327a, 1327b can constitute friction or antifriction bearings. The holder 1327 receives a sleeve 1328 which carries a flange 1329 for the aforementioned ring 1376. The parts 1327, 1329, 1376 are fixedly secured to each other, e.g., by welding, by resorting to rivets or press fits, or in any other suitable manner. However, it is equally possible to combine two or all three of these parts into a single part. The parts 1327, 1329, 1376 are centered relative to the clutch cover 1392 or relative to the housing 1311; such centering can be carried out by resorting to circumferentially spaced-apart centering lobes or, as shown in FIG. 21, by a circumferentially complete centering member 1311e.

The motor 1320 is axially movably but non-rotatably secured to the transmission case 1303a only a portion of which is shown in FIG. 21. The connection is established by an energy storing member in the form of a coil spring 1335 which urges the housing 1321 of the motor 1320 axially against the transmission case 1303a. The housing sections 1311a, 1311b are provided with suitable receiving means (not specifically shown) which are designed to prevent a turning of the coil spring 1335; for example, the receiving means can include recesses which receive the respective end convolutions of the spring 1335. Such end convolutions can be provided with suitable hooks, or they can be tightly fitted into the respective recesses. Another possibility of axially movably but non-rotatably securing the coil spring 1335 and of simultaneously centering this spring is to employ a set of leaf springs.

The illustrated motor 1320 is an electric motor (which can be replaced by hydraulic or pneumatic turbines or the like) having a stator 1336 which is fixedly secured to the housing 1321. The rotor 1337 is rotatable in a roller bearing 1338 which is installed in the stator 1336. An end face of the rotor 1337 abuts the follower pins 1332.

The operation of the structure which is shown in FIG. 21 is as follows:

When the motor 1320 is idle, the rotor 1337 contacts the pins 1332 and rotates with the flange 1329 at the RPM of the clutch 1370. Owing to the provision of the self-blocking axial drive 1310, the axial position of the lever 1357 remains unchanged until and unless the drive 1310 is activated by the motor 1320. In response to such activation, the rotor 1337 (which has been accelerated or decelerated to a speed exceeding or being less than the speed of the clutch cover 1392) drives the pins 1332 to thus select the force with which these pins bear upon the helix 1315. The extent of frictional engagement can be optimized by providing the abutting surfaces of the pins 1332 and rotor 1337 (e.g., only the surfaces of the pins 1332) with coats of a material (such as a synthetic plastic substance) having a high coefficient of friction. It is also possible to employ friction rings (of rubber or a suitable plastic material) which are placed around the pins 1332; the extent of frictional engagement can be increased by roughening those surfaces of the pins 1332 which contact the friction rings. Roughening can involve grooving, knurling, fluting or the like.

The pins 1332 cause a transfer of convolutions of the helix 1315 from one of the two packages to the other package in such a way that the ratio of radii r1 of the pins 1332 at the contact surfaces with the rotor 1337 and r2 of the contact surface with the helix 1315 can establish a first or preliminary transmission ratio. Owing to a shift of convolutions of the helix 1315 from one package to the other (the helix abuts axially the pins 1332), the ring 1376 is shifted axially and the clutch 1370 is engaged against the opposition of the lever (diaphragm spring) 1357, i.e., the condition of the clutch is changed from that which is actually shown in FIG. 21 to the engaged condition. If the direction of rotation of the motor 1320 is changed, the convolutions of the helix 1315 are transferred in the opposite direction by means of a second set of follower pins (not shown in FIG. 21) which are axially offset relative to the illustrated follower pins 1332. The follower pins of the second set need not be positively driven because the support 1327 is already driven by way of the illustrated pins 1332. The clutch 1370 is being disengaged under the bias of the lever (diaphragm spring) 1357.

Figure 22:
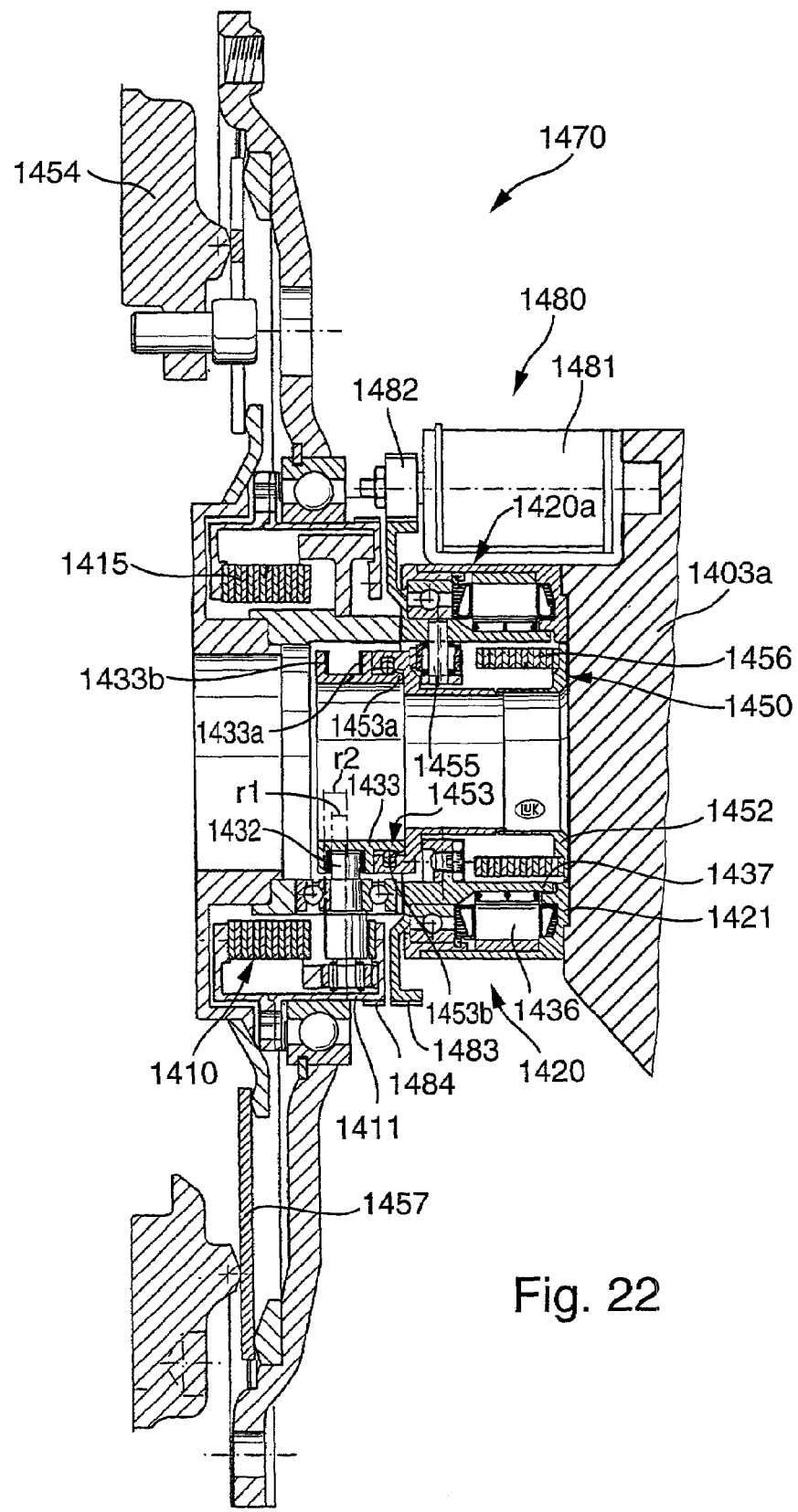
FIG. 22 is a sectional view of a structure constituting a modification of that shown in FIG. 21.

FIG. 22 shows a clutch assembly 1470 which, save for the disengaging means and the drive 1420, is identical with or plainly analogous to the clutch 1370 of FIG. 21. The drive 1420 is associated with an axial drive 1450 so that the output of the electric motor 1420a (which includes a rotor 1437 and a stator 1436) can be made lower. The housing part 1421 of the drive 1420 is centered in a housing part 1403a of the transmission and is received therein without any freedom of axial and/or radial movement. The spring housing 1452 is installed radially within the housing part 1421 so that it cannot rotate therein but is free to move axially. The housing 1452 fixedly receives the spring 1456 of the axial drive at both sides. Furthermore, the spring housing 1452 is connected with the disengaging ring 1433, which surrounds the follower pins 1432 at both sides, by means of a separable rotation preventing snap-on connection 1453. The latter comprises an undercut radial extension 1453a which is secured to the ring 1453b by snap action. Such arrangement renders it possible to detach the electric motor 1420a from the clutch 1470 during assembly. The disengaging ring 1433 can serve to pull or to push, depending upon the direction of rotation of the motor 1420a, so that the engaging as well as the disengaging operation can be carried out positively, i.e., neither of these operations must be assisted by springs. The force which the pressure plate 1454 transmits can be determined in advance by the force being furnished by the rotating motor 1420 by taking into consideration the amplification or reinforcement factors of the axial drives 1410, 1420. The self-locking action of the axial drive 1420 can remain substantially unchanged upon completed setting of the clutch.

The mode of operation of the clutch assembly 1470 departs from that of the clutch assembly 1370 of FIG. 21 due to the provision of the preamplifying axial drive 1450 as follows: FIG. 22 shows the clutch 1470 in the disengaged condition. When the electric motor of the drive 1420 is started, the rotor 1437 turns relative to the stator 1436 and moves the follower pins 1455 in a circumferential direction. This causes a shifting of convolutions of the coil spring 1456 so that the housing 1452 is moved axially with the disengaging ring 1433 in a direction toward the pressure plate 1454. Consequently, the follower pins 1432 can be braked by the contact surface 1433a which confronts the drive 1420; this enables the axial drive 1410 to operate in the customary way. The drive 1410 engages the clutch 1470 in that the pressure plate 1454 is shifted axially to the left, as viewed in FIG. 22.

When the direction of rotation is reversed, the convolutions of the helix 1456 are shifted from one of the packages to the other package and bear upon the pins 1455; this causes the follower pins 1432 to frictionally engage the contact surface 1433b which faces the pressure plate 1454. Such engagement produces a braking action so that the drive 1410 moves axially back toward the drive 1420. This movement can be assisted by the lever 1457 if the latter constitutes or includes an adequately stressed diaphragm spring or another suitable energy storing device.

If the clutch 1470 should not be engaged (i.e., in the neutral position), the drive 1450 moves the disengaging ring 1433 to an axial position in which the follower pins 1432 are not frictionally engaged. The energy which is required to actuate the clutch is supplied primarily or essentially by the combustion engine. The disengaging ring 1433 merely initiates the adjustment; this renders it possible to employ a relatively weak electric motor 1420a, i.e., a motor the energy equirements of which are relatively low.

The axial drives 1310 and 1410 and the actuating means therefor are merely examples, i.e., two presently preferred embodiments, of means for effecting the necessary axial movements. The exact nature of such drives or of their equivalents will depend, for example, upon the design of the friction clutch or clutches, i.e., whether the clutch (such as 1370 or 1470) is a pull type, a push type, pushed-driven or pulled-drawn clutch.

FIG. 22 further shows an adjusting arrangement 1480 for the idle condition of the friction clutch 1470. When this clutch is idle, there is no movement of the disengaging ring 1433 and of the follower pins 1432, i.e., the axial drive cannot disengage the clutch 1470. For example, such relative movement can be effected by separably connecting the housing section or portion 1411 with the rotor 1437 of the drive 1420a. The section 1411 confines the helix 1415 of the axial drive 1410. Such separable connection can be established by resorting to one of several suitable connecting or coupling means, for example, to an electromagnet 1481 which is shown as being secured to the transmission case 1403a. A locking element 1482 is used to non-rotatably connect the rotor 1437 with the housing 1411 for the helix, 1456 when the clutch 1470 is idle. The locking element 1482 can constitute an axially shiftable gear which is rotatably mounted on a shaft of the electromagnet 1481. The teeth of such gear mate with the external teeth 1483 on the rotor 1437 and the teeth of the gear 1482 also mate with the teeth of a gear 1484 when the clutch 1470 is idle. The gears 1482, 1483, 1484 and the electromagnet 1481 constitute or form part of the illustrated adjusting arrangement 1480.

It is also possible to provide rotation preventing means directly on the rotor 1437 or on the housing 1411; this renders it possible to employ a non-rotatable locking element 1482. It is often advisable to employ an adjusting arrangement which replaces the illustrated arrangement 1480 and is operated by centrifugal force; this can be accomplished in that, when the clutch 1470 is idle, the parts 1411, 1437 are connected to each other but are separated from one another at a particular (remaining) RPM of the clutch.

Adjustment of the idling condition is carried out in such a way that, when the rotor 1437 is attached to the housing 1411, the drive 1420 is activated so that the rotor changes the distribution of convolutions of the helical spring 1456 and drives the housing 1411; this causes the helix 1415 of the axial drive 1410 to change the distribution of its convolutions in the same axial direction as the helical spring 1456. The follower pins 1432 merely orbit but without any results, i.e., such pins are kept out of frictional engagement with the disengaging ring 1433. This entails an axial shifting of the drive 1410 and a disengagement of the clutch 1470.

Engagement of the clutch 1470 necessitates a change in the direction of rotation of the drive 1420.

A prerequisite for a satisfactory operation of the adjusting arrangement 1480 is that the transmission ratio of the axial drive 1410 matches or at least approximates that of the axial drive 1450. If such transmission ratios are different, one can compensate, for example, by an appropriate selection of the ratio of radii r1 and r2 of the follower pins 1432. The output of the electric motor 1420a can be selected (for adjustment of the idling condition of the friction clutch 1470) in that it is normally operated above the nominal output. The duration of an adjusting operation during idling can be lengthened in comparison with the clutch adjustment interval in normal operation of less than 0.3 second, preferably less than 0.1 second.

Figure 23:
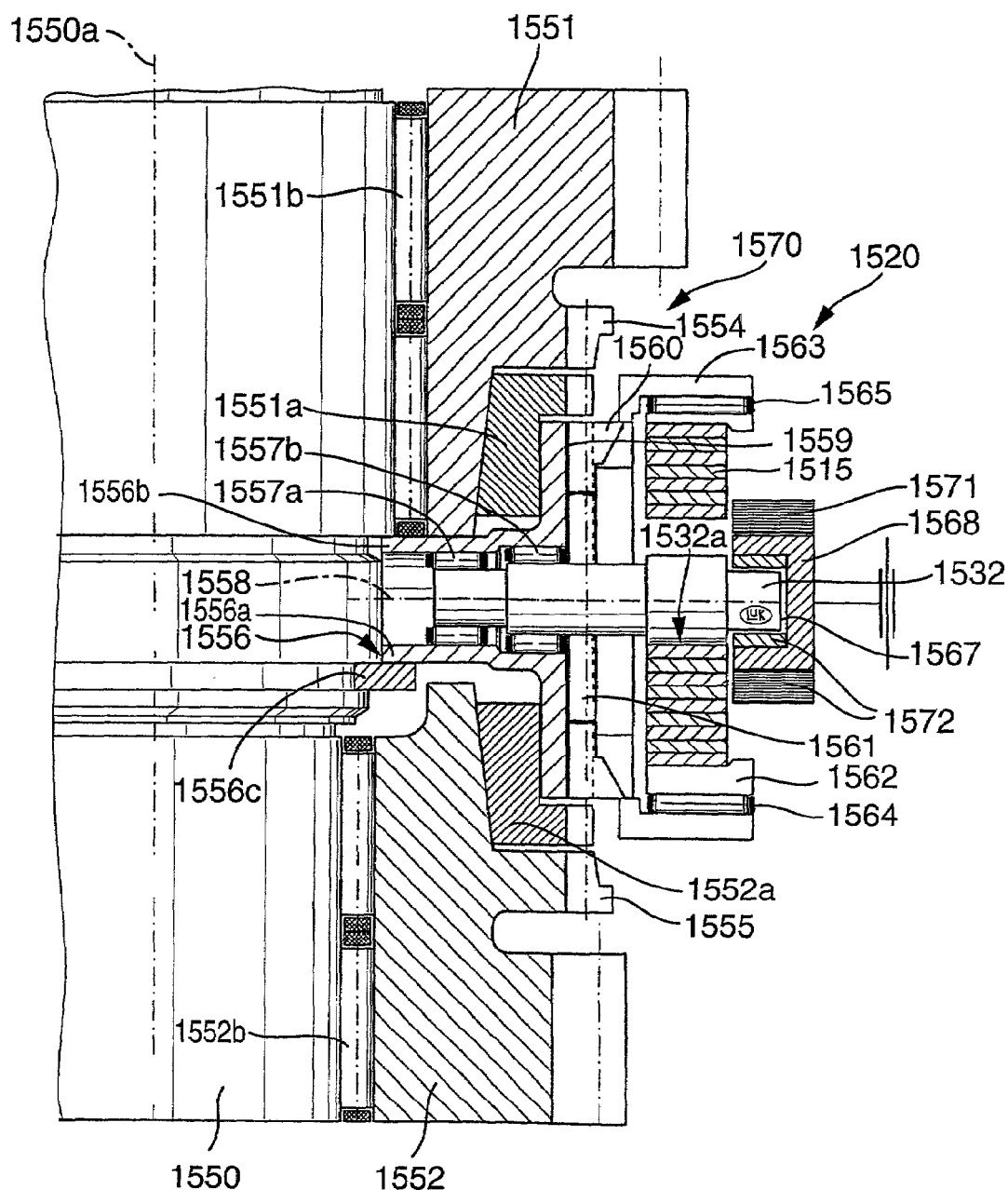
FIG. 23 is a fragmentary axial sectional view of a further friction clutch and of an apparatus which cooperates with the clutch and embodies still another form of the present invention.

FIG. 23 illustrates an axial drive for a friction clutch 1570 which is utilized in a change-speed transmission to establish or to terminate a torque transmitting connection between a rotary shaft 1550 (having an axis 1550a) and two gears or wheels (rotary elements) 1551, 1552. The illustrated rotary elements 1551, 1552 are spur gears which are respectively mounted on antifriction bearings 1551b, 1552b surrounding the shaft 1550. Those end faces of the gears 1551, 1552 which confront each other are respectively provided with synchronizing rings 1551a, 1552a having annuli of gear teeth 1554, 1555.

A further gear 1556 is non-rotatably secured to the shaft 1550 by one or more tongues or in any other suitable way and includes two sections 1556a, 1556b surrounding three pairs of roller bearings 1557a, 1557b, one pair for each of three pin-shaped followers 1532 having axes 1558 extending radially of the axis 1550a. The number of followers 1532 can be less than or can exceed three, and each of these followers is compelled to rotate with the shaft 1550.

The sections 1556a, 1556b of the further gear 1556 are fixed against axial movement relative to the shaft 1550 by a split ring 1556c. The radially outer portion of the gear 1556 has gear teeth 1559 which mate with the internal teeth of a sleeve (internal gear) 1560 which is movable in the axial direction of the shaft 1550. The sleeve 1560 has axially parallel cutouts 1561 for the followers 1532; this enables the sleeve to move (within limits) back and forth in the direction of the axis 1550a, i.e., relative to the shaft 1550.

The sleeve 1560 shares axial movements with two axially spaced apart annular flanges 1562, 1563 which are separably mounted on antifriction roller bearings 1564, 1565. These flanges form-lockingly and nonrotatably receive a helix 1515 which is engaged by the radially extending followers 1532. The contact surfaces 1532a of the followers 1532 bear upon the surfaces of adjacent convolutions of the helix 1515. Only one side of each follower 1532 is in contact with the adjacent convolution of the helix 1515. This is possible because the structure of FIG. 23 further comprises a second set of pin-shaped followers (not shown) each of which also engages only one of the adjacent convolutions (reference should be had again to FIGS. 4 and 5).

The followers 1532 of each of the two sets need not extend radially well beyond the convolutions of the helix 1515. Those (free) end portions of the followers 1532 which do extend beyond the convolutions of the helix 1515 are received in the groove 1567 of a ring-shaped member 1568 which latter is carried by the case of the transmission, e.g., by a bracket for the shaft 1550 or in another stationary part, and is movable in the direction of the axis 1550a. The means for moving the member 1568 axially of the shaft 1550 comprises two annular electromagnets 1571, 1572 which spacedly surround the shaft 1550. Energization of the electromagnets 1571, 1572 entails a shifting of the respective sets of followers 1532 into frictional engagement with the adjacent surface of a friction ring which performs the function of a brake.

FIG. 23 shows the parts of the friction clutch 1570 in their starting positions. Thus, neither of the gears 1551, 1552 is engaged with the gear 1556, the internally toothed sleeve 1560 is held in a neutral position, and the electromagnets 1571, 1572 are deenergized. If the shaft 1550 is rotated, all rotary parts rotate or orbit therewith at the same speed, i.e., these parts do not turn relative to each other because the axial drive 1520 is self-locking.

If one of the gears 1551, 1552 is to be force-lockingly attached to the gear 1556, the corresponding electromagnet 1571 or 1572 is energized with the result that the ring-shaped member 1568 is moved axially and one side of each follower 1532 of one of the two sets of such followers is caused to engage the aforementioned friction ring or braking ring. This ensures that the thus engaged followers 1532 can no longer turn about their respective axes 1558. Consequently, the followers 1532 which no longer rotate about their respective axes 1558 start to drive the helix 1515 to thus move the sleeve 1560 axially. Upon synchronization by the respective ring 1551a or 1552a, there is established a form-locking connection between the sleeve 1560 and the corresponding gear teeth 1554 or 1555.

The thus established form-locking connection can be terminated by deenergizing the then energized electromagnet 1571 or 1572 and by energizing the other electromagnet.

Figure 24:
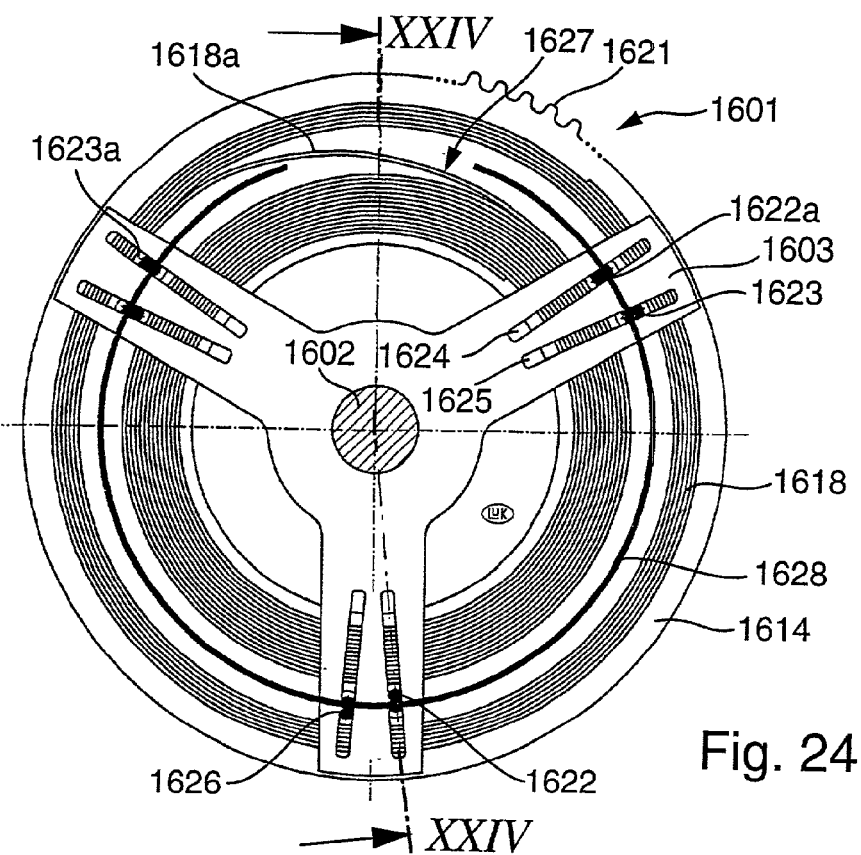
FIG. 24 is a transverse sectional view of an adjustable pulley wherein the adjusting means comprises a radial movement effecting apparatus embodying a further form of the present invention.
Figure 25:
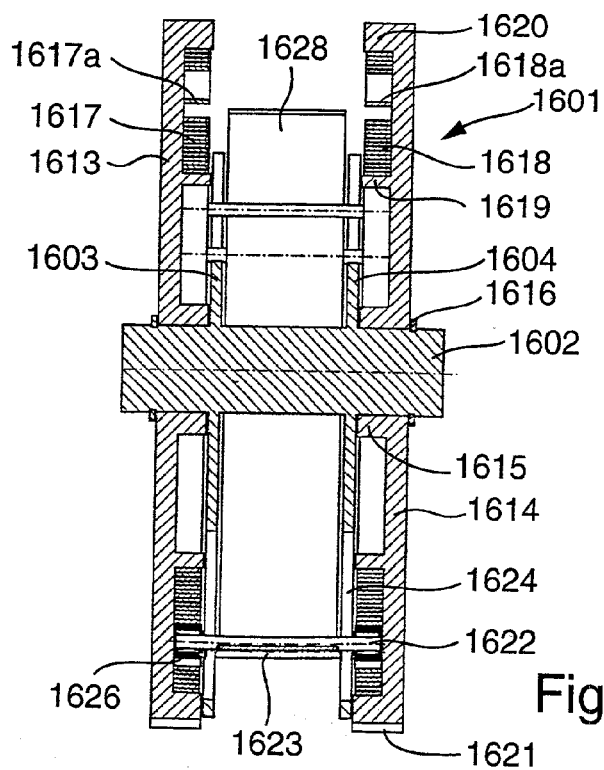
FIG. 25 is a sectional view substantially as seen in the direction of arrows from the line XXV—XXV in FIG. 24.

FIGS. 24 and 25 show a radial drive in the form of a pulley or sheave 1601 which is adjustable to vary the radius of that arcuate portion of a belt, chain or another endless flexible element (hereinafter called chain for short) which is trained over the pulley and is confined between the portions 1613, 1614 of two sidewalls or flanges 1603, 1604. In FIG. 24, the detachable portion 1613 of the flange 1603 is omitted in order to reveal certain details of the structure which is installed between the two flanges.

The flanges 1603, 1604 have radially inner portions which are fixedly secured to the shaft 1602, e.g., by welding, form-lockingly, by tongues and grooves and/or in another suitable manner. The portions 1613, 1614 are rotatable relative to and are detachable from the fixed portions of the two flanges 1603, 1604; such movable portions 1613, 1614 are located at the outer sides of those portions of the flanges 1603, 1604 which are rigid with the shaft 1602. The radially inner parts 1615 of the rotary portions 1613, 1614 constitute hubs which surround the adjacent portions of the shaft 1602. The hubs 1615 abut the fixed portions of the respective flanges 1603, 1604, and the pulley 1601 can be provided with standard friction bearings, roller bearings and/or other suitable bearings (not shown) which (if provided) are interposed between the shaft 1602 and the hubs 1615 of the rotary portions 1613, 1614. Split rings 1616 or the like are provided to hold the hubs 1615 of the portions 1613, 1614 in desired axial positions relative to the axially and angularly fixed portions of the respective flanges 1603, 1604.

Those sides of the portions 1613, 1614 which confront each other are provided with recesses for helices (coil springs) 1617, 1618. These helices surround annular collars 1619 and are, in turn, surrounded by annular collars 1620 of the respective rotary portions 1613, 1614. At least one end convolution of each of the helices 1617, 1618 is fixedly secured to the respective collar 1619 and/or 1620, e.g., by welding, by riveting, by means of hooks or in any other suitable manner. Thus, the helices 1617, 1618 are compelled to share the angular movements of the respective rotary portions 1613, 1614 relative to the shaft 1602.

The drive means for rotating the portions 1613, 1614 relative to the shaft 1602 and relative to those portions of the flanges 1603, 1604 which rotate with the shaft 1602 is not shown in FIGS. 24 and 25. Such drive means can include an electric motor which is mounted on a stationary part of the device (e.g., a continuously variable transmission) embodying the structure of FIGS. 24 and 25. FIGS. 24 and 25 show that the portions 1613, 1614 constitute spur gears having annuli of peripheral gear teeth 1621 immediately outwardly adjacent or forming part of the respective collars 1620. The motor can drive gears which mesh or which can be brought into mesh with the teeth 1621 of the rotary portion 1613 and/or 1614.

The helices 1617, 1618 cooperate with sets of followers 1622, 1623. The followers of each of the two sets are spaced apart from each other in the circumferential direction of the respective rotary portions 1613, 1614. As shown in FIG. 24, the followers 1622, 1623 are respectively guided in radially extending slots 1624, 1625 of the fixed portions of the two flanges 1603, 1604. Each of the followers 1622, 1623 can comprise a suitable friction reducing bearing 1626 which actually engages the surfaces of convolutions of the respective helix 1617, 1618 as well as the surfaces bounding the respective guide slots 1624, 1625.

The followers 1622 engage the adjacent radially outer convolutions of the helix 1617 whereas the followers 1623 engage the adjacent radially inner convolutions of the helix 1618, or vice versa. This can be seen in FIG. 24. The followers 1622 and 1623 are radially offset relative to each other. The character 1627 denotes a transfer zone where a portion 1617a or 1618a of a convolution of the helix 1617 or 1618 advances from the inner side of a follower 1622a or 1623a to the outer side of the next follower belonging to the same set or group of followers. Reference may be had again to FIGS. 4 and 5 which show that the convolutions of a helix can be caused to come into contact with the one or the other set of the respective followers.

The arrangement of FIGS. 24 and 25 ensures that, when the annular portions 1613, 1614 are caused to turn relative to the shaft 1602 and relative to those portions of the flanges 1603, 1604 which are non-rotatably secured to or of one piece with the shaft 1602, the followers 1622, 1623 are caused to migrate radially inwardly or outwardly, depending upon the direction of rotation of the portions 1613, 1614 and the shaft 1602 relative to each other.

A resilient guide ring 1628 is disposed radially between the sets of followers 1622, 1623 and axially between the fixed portions of the flanges 1603, 1604. The arrangement is such that each of the followers is guided between a convolution of the respective helix 1617, 1618 and the guide ring 1628.

The aforementioned endless chain serves to transmit torque between the pulley 1601 and at least one other pulley (not shown). That portion of such endless flexible chain which is trained over the pulley 1601 engages at least the followers 1623 to thus receive torque from or to transmit torque to the pulley 1601. Some torque can be received or transmitted by the ring-shaped guide member 1627. Those portions of the followers 1623 and/or of the ring 1627 which contact the endless chain can be roughened by the provision of microscopic teeth, by notching and/or in another suitable manner.

Figure 26:
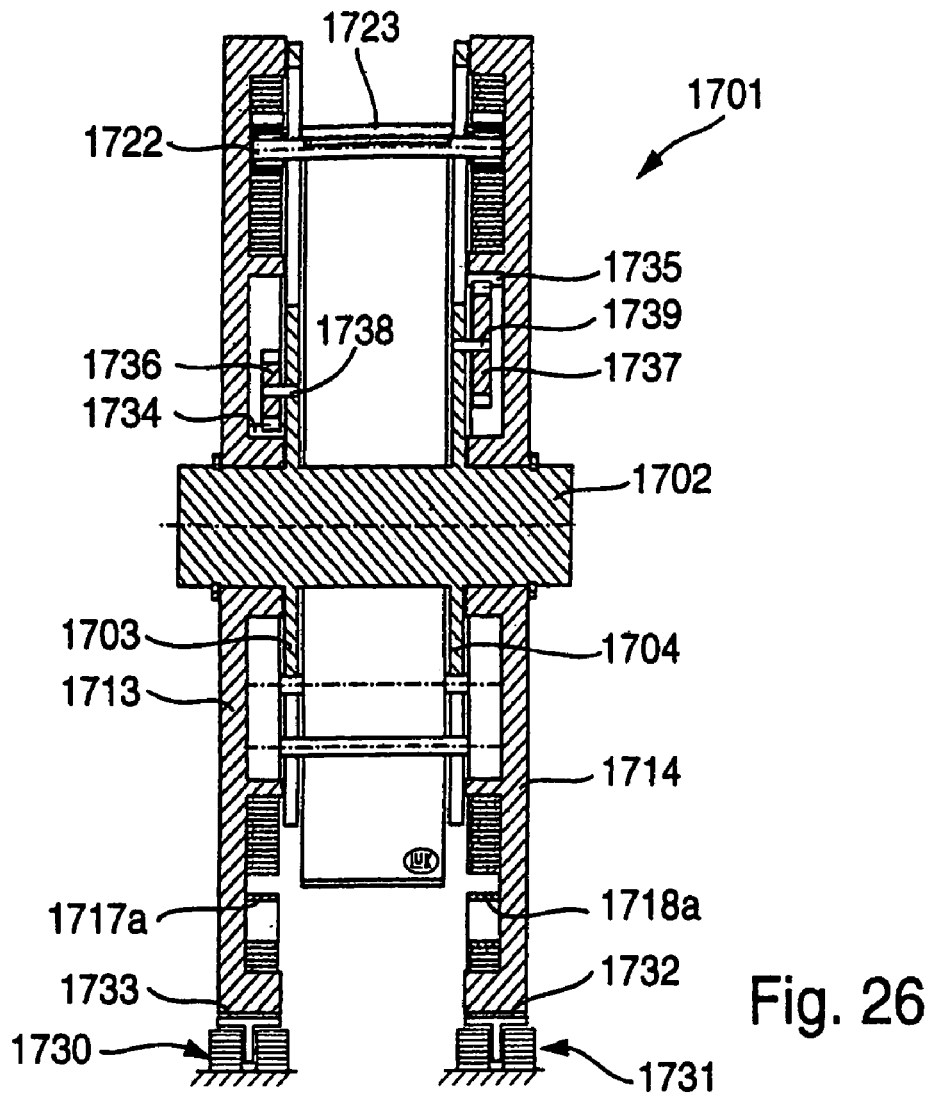
FIG. 26 is a sectional view similar to that of FIG. 25 but showing the details of a modified pulley and of a modified radially acting adjusting apparatus therefor.

FIG. 26 shows certain details of a modified radial drive which is embodied in an adjustable pulley or sheave 1701; the latter differs from the pulley 1601 of FIGS. 24–25 in that it need not be positively driven by a motor or the like in order to carry out a desired adjustment. Instead, the diameter of that portion of the pulley 1701 between the rotary portions 1713, 1714 of the respective flanges 1703, 1704 which is contacted by an endless belt or chain can be varied (to thus vary the ratio of the continuously variable transmission (CVT) employing the pulley 1701) by resorting to the energy of the driven pulley.

The pulley 1701 employs two electromagnets 1730, 1731 which are mounted on or in a stationary part of the transmission and respectively have friction surfaces 1733, 1732. These friction surfaces can respectively engage the rotary portions 1713, 1714, namely in such a way that only one of the electromagnets is energized at a time to brake the portion 1713 or 1714 while the shaft 1702 rotates. This causes the followers 1722 or 1723 to transmit the braking action to the other rotary portion 1714 or 1713. These rotary portions are respectively provided with gear teeth 1734, 1735 which respectively mesh with the teeth of gears 1736, 1737. These gears are rotatably mounted on those portions of the flanges 1703, 1704 which are non-rotatably associated (welded to, a press fit on or of one piece) with the shaft 1702.

The gear teeth 1734 are disposed radially inwardly of the shaft 1738 for the gear 1736, and the gear teeth 1735 are disposed radially outwardly of the shaft 1739 for the gear 1737. This guarantees that, when the shaft 1702 is driven, and the portion 1713 is braked by the electromagnet 1730, the portion 1713 trails or overtakes the shaft 1702 (depending upon the direction of rotation of the shaft 1702). The resulting angular displacement between the shaft 1702 and the portion 1713, as well as between the portion 1713 and the portion 1714 (which latter is caused to turn, by way of the followers 1722, 1723, for reasons fully described with reference to FIGS. 24 and 25), entails a radial shifting or migration of the followers 1722, 1723.

If the portion 1714 is braked by the electromagnet 1731, the arrangement of the gear teeth 1735 complementary to the shaft 1739 (while the shaft 1702 is driven in the same direction and compared with a braking of the portion 1713) entails a radial shifting of the followers. Thus, the radius of that portion of an endless belt or chain which is trained over the pulley 1701 is increased or reduced.

It will be appreciated that the radii of the gears 1736, 1737 relative to each other and relative to the thicknesses of the convolutions 1717a, 1718a are selected in such a way that the gears cannot initiate a change of transmission ratio between the portions 1713, 1714 and those portions of the flanges 1703, 1704 which are affixed to the shaft 1702. Otherwise stated, the gears 1736, 1737 merely effect a change in the direction of rotation whereas the extent of angular displacement between the portions 1713, 1714 is determined in dependency upon the thicknesses of the resilient convolutions 1717a, 1718a.

The adjustable pulley 1601 or 1701 can be put to use in lieu of adjustable pulleys disclosed, for example, in commonly owned U.S. Pat. No. 5,711,730 granted Jan. 27, 1998 to Friedmann et al. for "TORQUE MONITORING APPARATUS". Alternatively, the structure of FIGS. 24–25 and/or FIG. 26 can be embodied in the pulleys of the CVT disclosed in the U.S. '730 patent to Friedmann et al. to replace certain features of pulleys in the patented continuously variable transmission.

The following is a summary of certain additional features and advantageous applications of the improved apparatus some of which are shown in the drawings and are described, at least to a certain extent, in the preceding passages of this specification. Furthermore, the following passages enumerate and explain several additional embodiments of the present invention, in part with reference to the drawings, in part with reference to the preceding part of this specification, and in part with reference to patents and patent applications owned by the assignee of the present application.

The apparatus of FIG. 19 can be modified by incorporating therein more than two axial drives which are radially encapsulated into each other to thus save substantial amounts of space. The actuator (1120) remains radially inwardly and actuates the diaphragm springs 1193, 1194 of the two illustrated friction clutches, 1070*a* and 1070*b* as well as the diaphragm spring(s) of the additional friction clutch (es). The two axial drives can be mounted in parallel (as actually shown in FIG. 19) or in series by resorting to a single prime mover or to discrete prime movers (e.g., to several electric motors (see FIG. 19).

If the savings in space are an important prerequisite, e.g., in a motor vehicle or elsewhere, particularly as regards the space requirements of the axial drive, it is of advantage to integrate one of the two parts of the improved apparatus (preferably the axially shiftable part, such as the part 13 in the apparatus 1 of FIG. 1) directly into the rotor of the turning means (20). It is also possible to integrate the other part of the apparatus into the housing of the rotation imparting or turning means (see FIG. 3). To this end, the rotor of the electric motor (320) can be provided with an extension which acts axially upon an element adapted to constitute a helix (329) or which is non-rotatably secured to the helix, e.g., by extending into a recess or groove of the rotor (326). The axial extension can be axially movable relative to the rotor of the electric motor, and such rotor can resemble or constitute a sleeve which axially movably receives the axial extension so that, when in the starting position (without axial displacement), the extension is fully or nearly fully received in the sleeve-like rotor. The tracking device can be mounted on the housing of the electric motor and can extend radially inwardly between neighboring convolutions of the helix.

It is often advisable to utilize an axial drive which exhibits a self-locking feature. In certain other embodiments, the self-locking feature is neither necessary nor desirable. A parameter which can influence such characteristics is the selection of slope or lead of the helix; such lead is small or very small in an apparatus exhibiting the aforediscussed self-locking feature but is more pronounced in an apparatus which does not exhibit the self-locking feature. The drawings show the self-locking feature.

It is also possible to resort to embodiments which are prestressed in response to the application of a pronounced axial force (e.g., by the helix before the convolutions of the helix begin to abut each other) but move back (at least in part) in the opposite direction (i.e., they expand) in response to a termination of application of such force. The return movement can take place in the axial or in the radial direction. This feature is not shown in the drawings but can be put to use by resorting to an apparatus wherein the axial drive comprises first and second parts that are turnable relative to each other, e.g., against the opposition of at least one energy storing device. For example, a projection or abutment of the drive can serve to cause a spring to store energy. The spring dissipates such energy in response to rotation in the opposite direction. Thus, the resilient element can dissipate energy during rotation toward a stop and by way of a freewheel. When the motor is brought to a halt, the spring is caused to unwind while the motor is idle (e.g., because of the provision of the freewheel) to achieve a resetting in the axial direction.

It is also possible to provide an axially acting energy storing device between the helix and a part of the housing in such a way that the rotary drive acts against the force constant for the purpose of ensuring that, when the force furnished by the rotary drive decreases, a possibly existing self-locking action of the axial drive is taken up in the opposite direction and is weakened (reduced). A reversal of the axial forward movement can be achieved without it being necessary to activate the rotary drive in the opposite direction (this is not specifically shown in the drawings). Still further, the direction of operation of the axial drive can be reversed by resorting to an elastic suspension of the entire drive (in the circumferential direction) upon a part of the housing or upon a shaft. It can also be of advantage to cause the engaging means to turn and to thus run against a non self-locking ramp; when the rotary device is turned off, the engaging means is caused to turn back in the opposite direction to thus achieve an axial shifting in a direction counter to the axial forward movement initiated by the rotary drive.

The just described embodiments are intended to provide an axial drive which returns to its starting or initial position subsequent to an axial displacement from the starting position; such return movement is effected by an energy storing device which is caused to store energy (or additional energy) during movement of the axial drive from its starting position. The operation of such modified apparatus will be readily appreciated upon perusal of the detailed description of the embodiments which are illustrated in the drawings.

The axial drive can form part of a machine or a machine component wherein two sections of the machine must be moved axially against or toward each other, for example, in manually operable devices or apparatus, robots, gripping devices, presses, turning machines, milling machines, feeding apparatus and/or others. Furthermore, and as aleady described with reference to FIGS. 24 and 25, the novel apparatus can be embodied in or combined with adjustable pulleys which are utilized in transmissions of the type known as CVT. Still further, the improved apparatus can be put to use in the power trains of motor vehicles (refer, for example, again to FIG. 23) to serve as a means for operating an automatic or automated friction clutch and/or transmission, as a synchronizing means or the like. Still further, the improved apparatus can be incorporated in many types of linear drives such as sheet or panel lifters, slide roof structures and many others.

Upon termination or upon interruption of the self-locking action which is attributable to the existing force relationship, one can also employ the improved apparatus for a reversal of the direction of movement. Still further, an axial stressing of the proposed design can result in a conversion into a rotary movement. At the least, a clutch can be disengaged by resorting to a drive which is active in one direction and is automatically reengaged in response to termination of the self-locking action.

The improved axial drive can also serve to effect an automatic adjustment in order to compensate for wear upon the parts of a friction clutch, e.g., in the power train of a motor vehicle. The clutch is engaged in the push mode, i.e., counter to the action of an energy storing device serving to furnish a force which urges the pressure plates of the clutch toward each other. A reduction of the stress upon the energy storing device entails a disengagement of the clutch and, upon such disengagement, the energy storing device is pulled in the opposite direction in the pull mode to leave its state of equilibrium and to engage an abutment or stop. An eventual axial play in the clutch can be eliminated by resorting to a system of ramps which abut each other and are biased in a circumferential direction to turn relative to one another and to thus compensate for wear, e.g., upon the friction linings of the clutch disc. Reference may be had to one or more of the previously identified and discussed US and foreign patents and patent applications owned by the assignee of the present application.

As already described with reference to FIG. 22, the improved axial drive can also serve as a means for disengaging a friction clutch which acts between two shafts, such as the output shaft of an engine or another prime mover in the power train of a motor vehicle and the input shaft of the change speed transmission. The major part of the friction clutch is normally mounted on the output shaft, and the clutch disc of the friction clutch is or can be mounted directly on the input shaft. The clutch disc is flanked by an axially fixed engine-driven counterpressure plate and an axially movable engine-driven pressure plate. A diaphragm spring or another suitable resilient element can be caused to bias the pressure plate against the friction linings of the clutch disc to thus urge such friction linings against the counterpressure plate which latter is then capable of rotating selected or all wheels of the motor vehicle. The improved apparatus can serve to change the bias of the diaphragm spring, and it can be mounted on and can surround the input shaft of the transmission.

In accordance with a modification, a self-blocking or self-locking axial drive can be utilized to maintain the friction clutch in engaged condition and to disengage the clutch against the opposition of the self-locking means. The axial drive can but need not be active (or remain active) in the engaged condition of the clutch.

As far as the kinematics of the improved apparatus are concerned, it might be of advantage to furnish or assist the clutch disengaging force by an energy storing device which is active in the axial direction. For example, one can resort to a servo spring (e.g., of the type shown at 35 in FIG. 1) whose action is superimposed upon the disengaging action of the axial driving assembly (1) and which stores energy when the friction clutch is engaged; this facilitates the disengagement of the clutch and, owing to a reduction of the required force, accelerates the disengagement. The spring constant can be linear, progressive or degressive and can conform to the force play of the disengaging mechanism in dependency at least upon the diaphragm spring, upon the resiliency of the friction linings, and upon the stiffness of component parts of the friction clutch in order to be capable of operating with small clutch disengaging forces but with a highly satisfactory operability or operativeness of the clutch.

It goes without saying that the experiences gained in connection with push type friction clutches are equally valid in connection with pull type clutches (not specifically shown in the drawings). It is of advantage in this connection if one resorts to a snap-over type spring which, during disengagement of the clutch, is caused to store energy to a maximum value and to thereupon assist the rotary drive by dissipating energy in the axial direction in order to assist or compensate for the characteristic curve of the diaphragm spring.

It is often desirable to integrate into the axial drive a release bearing (such as the bearing 711a in the friction clutch 750 shown in FIG. 15) which can be attached to one part of the axial drive by snap action and, in addition, can compensate for eventual radial offset between the output shaft (703a) of the prime mover and the input shaft (703) of the change-speed transmission. The coil spring of the axial drive can serve as a prestressing component for the fixing of radial alignment or balancing (not shown).

The axial drive can also serve as a means for disengaging a composite (such as dual) friction clutch, e.g., a friction clutch of the type shown in FIG. 19. This is of advantage in starter generators and/or in hybrid drives in which two clutches can be operated independently of each other. For example, it is now possible to turn off an internal combustion engine while the motor vehicle is being driven or braked by an electric motor and simultaneously supplies electrical energy by recuperation. In this connection, it can be of advantage to operate the axial drive in the push and pull modes. Reference may be had, for example, to German patent application Ser. No. 199 25 332.2 which describes a twin clutch in full detail and the entire disclosure of which, together with that of each US and foreign patent and patent application identified in the specification of the present application (including the priority documents) is incorporated herein by reference.

It is further of advantage, at least under certain circumstances, to design one or more clutches of a composite clutch (e.g., both clutches of a dual clutch) in such a way that, as far as the bias of the diaphragm spring is concerned, they are designed to transmit only a portion of the torque which is furnished by the combustion engine or another prime mover. In order to transmit maximal torque of the prime mover, for example, in the maximum load range, the actuator can act upon the diaphragm spring in the pull mode with a tractive force which results in the generation of a pressing force upon the thus actuated clutch which corresponds to the entire torque that requires transmission. It is to be understood that, for this purpose, the diaphragm spring is connected with the axial drive in such a way that the tongues or prongs of the diaphragm spring can be acted upon axially in both directions. Such embodiments can be of particular advantage in so-called SACs (self-adjusting clutches) which automatically compensate for wear at least upon the friction linings of the clutch disc. Such clutches often employ a force sensor serving to detect the extent of wear by monitoring the magnitude of the clutch disengaging force and permitting when necessary, an adjusting ring to carry out the necessary wear compensation work. By utilizing the improved apparatus, one can simplify the wear compensating means in such friction clutches.

It is also possible to employ the improved axial drive to damp angular vibrations or oscillations in a combustion engine by ensuring that the clutch can be readily disengaged in response to the development of corresponding amplitudes of non-uniformity of rotary movement. Thus, the clutch can slip at the corresponding maximum torque. The axial drive can be regulated in such a way that it is effected by way of the rotary drive which receives a corresponding control signal from the engine management. For example, an ignition signal in an Otto engine or a signal pertaining to fuel injection in a Diesel engine can be utilized to regulate the rotary drive. Additional parameters can be evaluated for the purpose of correlation with the amplitude which is to be expected; for example, one can evaluate the RPM, the position of the flap of the throttle valve in the combustion engine, a torque sensor signal and/or others.

In accordance with a further embodiment of this invention, the improved axial drive can be utilized in friction clutches which employ a split or composite flywheel, e.g., as shown in and as already described with reference to FIG. 16. The parts of the composite flywheel can turn relative to each other against the opposition of a yieldable damper. The friction clutch which can couple the composite flywheel with the input shaft of the transmission is actuatable by an apparatus which embodies the present invention.

It is of advantage to regulate the operation of the improved rotary drive by a control unit which is connectable with the drive by a CAN bus or the like. It is advisable to evaluate the signal or signals furnished by at least one sensor so that the axial drive is operated in dependency upon at least one of numerous parameters including the temperature of the clutch, changes in distance covered by a moving part, changes of RPM and/or others. The evaluated signal(s) can be furnished by one or more sensors, e.g., an RPM sensor which monitors the speed of the rotary drive, a distance monitoring sensor of the rotary drive, an acceleration monitoring sensor, a force sensor and/or others. The utilized parameters can be arrived at by combining, evaluating, calculating, processing and/or otherwise utilizing signals supplied by two or more sensors.

If the invention is to be embodied in the power train of a motor vehicle, the operation of the clutch can be automated by the axial drive. One can utilize a control unit which transmits at least one signal in addition to or in lieu of signals generated by one or more of the sensors which monitor the RPM of at least one driven and/or non-driven wheel, the position of the flap of the throttle valve in the combustion engine, the speed of the motor vehicle, the RPM of the driving unit, acceleration of the motor vehicle, the selected gear of the transmission, transverse acceleration, a wheel blocking signal, the magnitude of torque being transmitted by the clutch, the temperature of the clutch, the temperature of fluid in the transmission, the temperature of fluid in the engine, the steering angle and others.

It is also possible to equip an automated clutch with an axial drive in such a way that it can be operated as a push—or pull-type clutch by a hydraulic slave cylinder which is actuated by a master cylinder by way of a hydraulic connection in a manner as disclosed in numerous U.S. and foreign patents and patent applications of the assignee of the present application. The master cylinder can be activated by the novel axial drive. The master cylinder, the axial drive, the control unit and/or possibly the required or necessary compensating springs or the like can be integrated into a module or an analogous assembly. This exhibits numerous advantages including that the entire module can be installed (e.g., in a motor vehicle) in a simple and time-saving manner which is of advantage in connection with the final assembly of motor vehicles because the overall number of parts which must be separately installed and assembled is reduced accordingly.

As already described with reference to and as shown in FIGS. 24 to 26, the basic principle of utilizing two parts (such as 1602 and 1613) which can be caused to turn relative to each other, a helical spring, and a tracking or follower device which cooperates with the helical spring by extending between the convolutions of the spring, can also be put to use with advantage in adjustable pulleys, sheaves and analogous devices. If one of the parts is held against rotation and the other part is rotated, the tracking device is moved radially and/or axially relative to the helical spring. Such mode of operation can be resorted to in tongs, in clamps, in turning machines or the like. If used in a pulley, the improved apparatus can render it possible to alter the radius of that portion of a belt, band, strap or the like which is trained over such pulley. Two or more adjustable pulleys can be used in a CVT to vary the transmission ratio by reducing the diameter of one pulley while simultaneously increasing the diameter(s) of one or more other pulleys without the need to assemble each pulley of pairs of conventional axially movable flanges so that the belt or chain can penetrate deeper between or is compelled to move further away from the common axis of the flanges.

The above are but a few examples of possible utilizations of the improved apparatus in various devices, machines, vehicles and/or other units.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of motion transmitting apparatus and, therefore, such adaptations should and are intended to be comprehended within the meaning and range of equivalence of the appended claims.

What is claimed is:

1. Apparatus for effecting relative movements of first and second parts at least one of which is turnable relative to the other, comprising:
    at least one tracking device fixed relative to said first part;
    a helix non-rotatably associated with said second part and having a plurality of convolutions including first and second packages of neighboring convolutions, each of said packages comprising abutting convolutions and said tracking device having a portion extending between at least two of said convolutions; and
    means for turning said one part relative to said other part.

2. The apparatus of claim 1, wherein said means for turning comprises means for rotating said one part clockwise and counter-clockwise.

3. The apparatus of claim 1, wherein said helix has a first axis and said second part has a second axis intersecting said first axis within said second part.

4. The apparatus of claim 1, wherein said helix has a first axis and said second part has a second axis coinciding with said first axis.

5. The apparatus of claim 1, wherein said first part is coaxial with said second part.

6. The apparatus of claim 1, wherein said helix has first and second end convolutions, at least one of said end convolutions being non-rotatably secured to said second part.

7. The apparatus of claim 1, wherein said helix comprises first and second end convolutions and an axis, and further comprising an axial abutment provided on said second part to hold one of said end convolutions against movement in the direction of said axis.

8. The apparatus of claim 1, wherein said helix has an axis and two end convolutions, and further comprising means for holding at least one of said end convolutions against movement relative to said second part at least substantially radially of said axis.

9. The apparatus of claim 1, wherein said helix has an axis and said tracking device includes at least one follower abutting at least one of said at last two convolutions In at least one of a plurality of directions including radially of and in the direction of said axis.

10. The apparatus of claim 1, wherein said first package includes one and said second package includes the other of said at least two convolutions.

11. The apparatus of claim 1, wherein said helix includes a convoluted band.

12. The apparatus of claim 1, wherein said helix has an at least substantially polygonal cross-sectional outline.

13. The apparatus of claim 1, wherein said convolutions have a common axis and said helix has an at least substantially rectangular cross-sectional outline.

14. The apparatus of claim 13, wherein said cross-sectional outline has a width and a thickness as measured, respectively, radially of said axis and in the direction of said axis, said width exceeding said thickness.

15. The apparatus of claim 14, wherein said width is between about three and sixty times said thickness.

16. The apparatus of claim 1, wherein said convolutions have a common axis and a thickness less than 5 mm as measured in the direction of said axis.

17. The apparatus of claim 16, wherein said thickness is less than 2 mm.

18. The apparatus of claim 1, wherein said helix, said device and said turning means form part of an axial drive, said helix having an outer diameter and each of said convolutions having a width, as measured radially of a common axis of said convolutions, the ratio of said outer diameter to said width being in the range of between about 100:1 and 1:1.

19. The apparatus of claim 18, wherein said ratio is between about 30:1 and 5:1.

20. The apparatus of claim 1, wherein said parts, said helix, said device and said turning means form part of an axial drive, said helix having an outer diameter and each of said convolutions having a thickness as measured in the direction of a common axis of said convolutions, the ratio of said outer diameter to said thickness being in the range of between about 700:1 and 25:1.

21. The apparatus of claim 20, wherein said ratio is between 200:1 and 40:1.

22. The apparatus of claim 1, wherein the convolutions of said helix have one of a plurality of cross-sectional outlines including a polygonal and an at least substantially circular outline.

23. The apparatus of claim 1, wherein said helix consists of a resilient material.

24. The apparatus of claim 23, wherein said resilient material is selected from the group consisting of spring steel, a plastic substance and a ceramic substance.

25. The apparatus of claim 1, wherein said helix has between three and 300 convolutions.

26. The apparatus of claim 25, wherein the number of said convolutions is between about five and fifty.

27. The apparatus of claim 1, wherein said helix and said tracking device cooperate to move at least one of said first and second parts axially of the other of said first and second parts in response to turning of said one part relative to said other part.

28. The apparatus of claim 1, wherein said device is arranged to track said helix by contacting successive increments of successive convolutions of said plurality of convolutions in response to turning of said one part relative to said other part.

29. The apparatus of claim 1, wherein said turning means includes means for rotating said one part clockwise and counterclockwise, said device Including at least one first follower arranged to track the convolutions of said helix in response to clockwise rotation of said one part and at least one second follower arranged to track the convolutions of said helix in response to counterclockwise rotation of said one part.

30. The apparatus of claim 1, wherein said device includes at least one first follower and at least one second follower, said helix including a portion disposed between said first and second followers.

31. The apparatus of claim 1, wherein said convolutions have a common axis and said device Includes at least one first follower and at least one second follower spaced apart from said at least one first follower as seen in the direction of said axis, said helix having a portion disposed between said first and second followers.

32. The apparatus of claim 1, wherein said convolutions have a common axis and said device includes a plurality of followers including first and second helix-contacting followers spaced apart from each other in the direction of said axis, said helix being in simultaneous contact with said first and second followers.

33. The apparatus of claim 1, wherein said convolutions have a common axis and a predetermined thickness as measured in the direction of said axis, said device including first and second followers arranged to track said helix and being spaced apart from each other in the direction of said axis a distance at least approximating said thickness.

34. The apparatus of claim 33, wherein said helix has a portion contacting said followers and dividing said convolutions into said first and second packages of neighboring convolutions, the number of convolutions in one of said packages Increasing and the number of convolutions in the other of said packages decreasing in response to turning of said one part relative to said other part.

35. The apparatus of claim 1, wherein said means for turning includes means for selectively rotating said one part clockwise and counterclockwise, said device including a first set of followers tracking said helix in response to clockwise rotation of said one part and a second set of followers tracking said helix in response to counterclockwise rotation of said one part.

36. The apparatus of claim 1, wherein said convolutions have a common axis and said device includes a plurality of substantially pin-shaped followers spaced apart from each other in the direction of said axis and circumferentially of said helix.

37. The apparatus of claim 36, wherein said device comprises between three and twelve followers.

38. The apparatus of claim 1, wherein said convolutions have a common axis and said device includes a plurality of followers carried by said first part and extending across the width of said at least two convolutions as seen radially of said axis.

39. The apparatus of claim 1, wherein said device comprises at least one follower including a bearing contacting at least one of said at least two convolutions.

40. The apparatus of claim 1, wherein said bearing is one of bearings including friction bearings and roller bearings.

41. The apparatus of claim 1, wherein said device includes at least one pin-shaped follower rotatably mounted in said first part.

42. The apparatus of claim 1, wherein said device includes at least one substantially pin-shaped follower arranged to engage at least one of said at least two convolutions and at least one bearing rotatably mounting said at least one follower in said first part.

43. The apparatus of claim 1, wherein one of said parts is at least partially surrounded by the other of said parts.

44. The apparatus of claim 1, wherein said second part is surrounded by said first part.

45. The apparatus of claim 1, wherein said helix is at least partially surrounded by one of said parts and at least partially surrounds the other of said parts.

46. The apparatus of claim 1, wherein said device comprises at least one ramp provided in said first part and extending circumferentially of said helix.

47. The apparatus of claim 46, wherein said at least one ramp has a recess for a portion of said helix.

48. The apparatus of claim 46, wherein said helix has a first lead and said at least one ramp has a second lead at least approximating said first lead.

49. The apparatus of claim 1, wherein said second part has at least one segment-shaped or circumferentially complete thread-shaped recess, said at least one tracking device comprising a plurality of rolling elements disposed in said recess and said recess having an end portion at which said rolling elements are introduced into a starting point of said thread-shaped recess.

50. The apparatus of claim 49, wherein said thread-shaped recess further comprises a starting portion and said rolling elements are guided, in the region of transition from the starting and end portions, into a path extending radially outwardly of the radius of said spiral.

51. The apparatus of claim 49, wherein the paths of said helix and said recess cross each other.

52. The apparatus of claim 49, wherein at least one of said rolling elements is barrel-shaped.

53. The apparatus of claim 49, wherein said rolling elements have peripheral surfaces in rolling contact with one of said helix and a surface surrounding said recess.

54. The apparatus of claim 1, wherein said first and second parts have a common axis, and further comprising means for biasing said parts axially against each other.

55. The apparatus of claim 1, further comprising means for biasing said parts in the direction of action of the apparatus.

56. The apparatus of claim 1, wherein said parts have a common axis, and further comprising energy storing means arranged to bias said parts in at least one of the directions including axially and radially of said axis, said parts being prestressed counter to the direction of bias of said energy storing means.

57. The apparatus of claim 1, further comprising energy storing means for biasing one of said parts relative to the other of said parts, said energy storing means comprising one of a spiral and a helix.

58. The apparatus of claim 1, wherein said helix cooperates with said tracking device to move one of said first and second parts axially in response to turning of said one part, said helix being prestressed and being affixed to said first and second parts, said tracking device dividing the convolutions of said helix into said first and second packages of convolutions.

59. The apparatus of claim 1, wherein said helix cooperates with said tracking device to move one of said first and second parts axially in response to turning of said one part, and further comprising a plurality of energy storing elements arranged to bias said parts relative to each other, each of said energy storing elements including a leaf spring having a first end portion connected to one of said parts and a second end portion connected to the other of said parts, said leaf springs being spaced apart from each other in a circumferential direction of said helix.

60. The apparatus of claim 1, further comprising at least one coil spring arranged to bias one of said parts axially of the other of said parts.

61. The apparatus of claim 60, wherein said coil spring has a longitudinal axis and is self-centering in the direction of said longitudinal axis.

62. The apparatus of claim 1, wherein said helix, said tracking device and said means for turning are arranged to move one of said parts axially and said helix has an axial profile.

63. The apparatus of claim 62 wherein said profile is an at least substantially V-shaped profile.

64. The apparatus of claim 63, wherein said profile has a ridge facing counter to the direction of action of said helix.

65. The apparatus of claim 1, wherein said turning means cooperates with said helix and with said tracking device to effect an angular displacement of said parts relative to each other.

66. The apparatus of claim 1, wherein said turning means comprises means for rotating said one part relative to said other part.

67. The apparatus of claim 1, further comprising a housing having a third part which is stationary relative to said one part.

68. The apparatus of claim 1, wherein said one part has an axis and said turning means includes means for rotating said one part about said axis.

69. The apparatus of claim 1, wherein said means for turning comprises at least one electric motor.

70. The apparatus of claim 1, wherein said means for turning comprises a turbine.

71. The apparatus of claim 1, wherein said one part has a first radial dimension and said means for turning has a second radial dimension less than said first dimension.

72. The apparatus of claim 1, wherein said parts Include a radially inner part and a radially outer part, said means for turning being disposed within said radially outer part.

73. The apparatus of claim 72, wherein said one part is one of said radially inner and radially outer parts.

74. The apparatus of claim 1, wherein said second part is movable to and from at least one end position, and further comprising an abutment arranged to arrest said second part in said at least one end position.

75. The apparatus of claim 74, wherein said abutment includes at least one cushion effective in at least one of a plurality of directions including axially and circumferentially of said second part.

76. The apparatus of claim 1, further comprising at least one stop arranged to limit the extent of turnability of said one part relative to said other part.

77. The apparatus of claim 76, wherein said means for turning includes an electric motor and said stop forms part of said motor.

78. The apparatus of claim 1, further comprising at least one sensor arranged to monitor the extent of axial displacement of one of said parts.

79. The apparatus of claim 78, wherein said sensor is an incremental sensor.

80. The apparatus of claim 78, wherein said sensor is arranged to monitor the maximum extent of axial movement of one of said parts.

81. The apparatus of claim 1, wherein said first part is surrounded by said second part and has a central opening.

82. The apparatus of claim 81, further comprising a shaft received in said opening, said means for turning being mounted on said shaft.

83. The apparatus of claim 1, wherein said one part includes a rotary shaft and said turning means Is non-rotatably associated with said shaft, said one part being braked by a stationary housing.

84. The apparatus of claim 1, wherein said one part is force-lockingly connectable with a rotary element and said other part is force-lockingly connectable with a fixed housing.

85. The apparatus of claim 1, further comprising a shaft rotatable in a single direction and connected with said one part.

86. The apparatus of claim 1, wherein said means for turning has a central opening and further comprising a shaft extending through said opening and being associated with one of said first and second parts.

87. The apparatus of claim 1, wherein said means for turning comprises a rotor and one of said first and second parts is integrated into said rotor.

88. The apparatus of claim 87, wherein the other of said first and second parts is integrated into a housing of said means for turning.

89. The apparatus of claim 87, further comprising a shaft, said means for turning being rotatably or non-rotatably mounted on said shaft.

90. The apparatus of claim 1, wherein said one part is arranged to act upon an axially movable component at a variable angular speed, and further comprising an antifriction bearing between said one part and said component.

91. The apparatus of claim 90, wherein said antifriction bearing is mounted on said one part.

92. The apparatus of claim 1, further comprising first and second machine components, at least one of said first and second parts being arranged to move one of said components relative to the other of said components in at least one of directions including (a) in the direction of an axis of said one component and (b) at least substantially radially of said axis.

93. The apparatus of claim 1, further comprising first and second shafts and first and second pulleys non-rotatably mounted on said first and second shafts, respectively, at least one of said pulleys having a variable diameter and at least one of said first and second parts being arranged to vary the diameter of said at least one pulley.

94. The apparatus of claim 93, further comprising a variable-length endless flexible element trained over said pulleys, and means for varying the length of said flexible element.

95. The apparatus of claim 1, further comprising an engageable and disengageable friction clutch having a first rotary shaft coaxial with said parts, first and second pressure plates non-rotatably mounted on said first shaft, one of said pressure plates being movable axially of said shaft and further comprising a second rotary shaft coaxial with said first-shaft, a clutch disc between said pressure plates, and adjustable resilient means carried by said second shaft and arranged to bias said one pressure plate against said clutch disc and thus against said other pressure plate, one of said first and second parts being arranged to adjust said resilient means to thus select the extent of engagement of said clutch.

96. The apparatus of claim 1, further comprising a combustion engine having an output shaft, a second shaft coaxial with said output shaft, and an engageable and disengageable friction clutch between said shafts, said clutch being coaxial with said parts and including a component movable in the direction of the common axis of said shafts by at least one of said parts to thus change the extent of engagement of said clutch.

97. The apparatus of claim 96, wherein said parts are mounted on said second shaft.

98. The apparatus of claim 1, further comprising a first rotary shaft, a prime mover arranged to drive said first shaft about an axis, a split flywheel including a first flywheel mounted on said first shaft, a second flywheel coaxial with and rotatable relative to and jointly with said first flywheel, means for yieldably opposing rotation of at least one of said first and second flywheels relative to the other of said first and second flywheels, a second shaft coaxial with said first shaft, and an engageable and disengageable friction clutch between said second flywheel and said second shaft, one of said parts being arranged to change the extent of engagement of said clutch.

99. The apparatus of claim 1, further comprising control means for said turning means.

100. The apparatus of claim 99, wherein said control means includes at least one sensor arranged to transmit signals and means for adjusting said turning means in response to said signals.

101. The apparatus of claim 100, wherein said at least one sensor is arranged to transmit signals in response to changes of at least one of a plurality of parameters including (a) the RPM of a rotary component, (b) a distance covered by a rotary component, (c) changes of speed of a rotary component. (d) a change of force, and (e) at least one further parameter derivable from at least one of said parameters (a) to (d).

102. The apparatus of claim 1, further comprising an automated friction clutch for use in a motor vehicle and a control system for said clutch, at least one of said parts being arranged to adjust said clutch in response to signals denoting changes of at least one variable parameter furnished by at least one sensor forming part of said control system and arranged to monitor at least one of (a) the RPM of at least one driven wheel of a motor vehicle embodying said clutch, (b) the RPM of at least one non-driven wheel of the vehicle, (C) the position of the flap of the throttle valve in the engine of the vehicle, (d) the speed of the vehicle, (e) the RPM of the transmission In the vehicle, (f) the RPM of the engine, (g) acceleration of the vehicle, (h) transverse acceleration, (i) signal from wheel blocking means, (j) selected speed ratio of the transmission, (k) the magnitude of torque being transmitted by the clutch, (l) the temperature of the clutch, (m) the temperature of lubricant in the transmission, (n) the temperature of lubricant in the engine, land (o) the angular position of the steering wheel.

103. Apparatus for effecting relative axial movements, comprising:
    first and second parts at least one of which is rotatable relative to the other about an axis common to said first and second parts;
    at least one tracking device fixed relative to said first part as seen in the direction of said axis;
    a helix non-rotatably associated with said second part and having a plurality of convolutions including first and second packages of neighboring convolutions, each of said packages comprising abutting convolutions and said tracking device having a portion extending between at least two of said convolutions; and
    means for rotating said at least one part relative to said other part.

104. Apparatus for effecting relative movements of first and second parts at least one of which is turnable relative to the other, comprising:
    at least one tracking device fixed relative to said first part;
    a helix non-rotatably associated with said second part and having a plurality of convolutions, said tracking device having a portion extending between at least two of said convolutions; and
    means for turning said one part relative to said other part, said other part being non-rotatably affixed to a shaft and the one pad being braked against a housing for the purpose of actuating the apparatus in a first axial direction whereas, for the purpose of actuating the apparatus in a second axial direction, said one part being non-rotatably affixed to the shaft and the other part being braked against the housing.

105. The apparatus of claim 104, wherein at least one of said affixing and said braking is effected by a braking component for axially shifting the one part.

106. The apparatus of claim 105, wherein the braking component is actuated by an electromagnet.

107. The apparatus of claim 105, wherein the braking component is actuated by at least one fluid-operated slave cylinder.

* * * * *